United States Patent [19]

Bhanu et al.

[11] Patent Number: 4,969,036

[45] Date of Patent: Nov. 6, 1990

[54] SYSTEM FOR COMPUTING THE SELF-MOTION OF MOVING IMAGES DEVICES

[76] Inventors: Bir Bhanu, 1889 29th NW., New Brighton, Minn. 55112; Wilhelm Burger, Hagenstrasse, 61/5, A-4040, Linz, Austria

[21] Appl. No.: 332,320

[22] Filed: Mar. 31, 1989

[51] Int. Cl.$^5$ ............................................. H04N 7/18
[52] U.S. Cl. .................... 358/105; 358/103; 358/125; 358/903; 364/443; 901/47
[58] Field of Search ................. 358/93, 103, 105, 125, 358/903; 901/47; 364/443

[56] References Cited

U.S. PATENT DOCUMENTS

| | | | |
|---|---|---|---|
| 4,805,018 | 2/1989 | Nishimura | 358/105 |
| 4,853,775 | 8/1989 | Roovrais | 358/105 |
| 4,872,051 | 10/1989 | Dye | 358/103 |

OTHER PUBLICATIONS

"Intelligent Target Recognizers," by H. Nasr, W. Au, and S. Mader, in Scientific Honeyweller, Summer 1988.
"Machine Vision for the Battlefield," by B. Bhanu, in Scientific Honeywell, Summer 1988.
"Triple: A Multi-Strategy Machining Learning Approach to Target Recognition," by B. Bhanu and J. Ming, in Image Understanding Workshop, Apr. 6-8, 1988.
"Dynamic Model Matching for Target Recognition from a Mobile Platform," by H. Nasr and B. Bhanu, in Image Understanding Workshop, Apr. 6-8, 1988.
"Qualitative Motion Detection and Tracking of Targets from a Mobile Platform," by B. Bhanu and W. Burger, in Image Understanding Workshop, Apr. 6-8, 1988.
"Qualitative Reasoning and Modeling for Robust Target Tracking and Recognition from a Mobile Platform," by B. Bhanu and D. Panda, in Image Understanding Workshop, Apr. 6-8, 1988.
"Drive—Dynamic Reasoning from Integrated Visual Evidence," by B. Bhanu and W. Burger, in Image Understanding Workshop, Feb. 23-25, 1987.
"Interpretation of Terrain Using Hierarchical Symbolic Grouping for Multi-Spectral Images," by B. Bhanu and P. Symosek in Image Understanding Workshop, in Feb. 23-25, 1987.
"Guiding an Autonomous Land Vehicle Using Knowledge-Based Landmark Recognition," by H. Nasr, B. Bhanu and S. Schaffer, in Image Understanding Workshop, Feb. 23-25, 1987.
"Honeywell Progress on Knowledge-Based Robust Target Recognition and Tracking," by B. Bhanu, D. Panda and R. Aggarwal, in Image Understanding Workshop, Feb. 23-25, 1987.

*Primary Examiner*—Howard W. Britton
*Attorney, Agent, or Firm*—John G. Shudy, Jr.

[57] ABSTRACT

Determining the self-motion in space of an imaging device (e.g., a television camera) by analyzing image sequences obtained through the device. Three-dimensional self-motion is expressed as a combination of rotations about the horizontal and vertical camera axes and the direction of camera translation. The invention computes the rotational and translational components of the camera self-motion exclusively from visual information. Robust performance is achieved by determining the direction of heading (i.e., the focus of expansion) as a connected region instead of a single location on the image plane. The method can be used to determine when the direction of heading is outside the current field of view and when there is zero or very small camera translation.

10 Claims, 44 Drawing Sheets

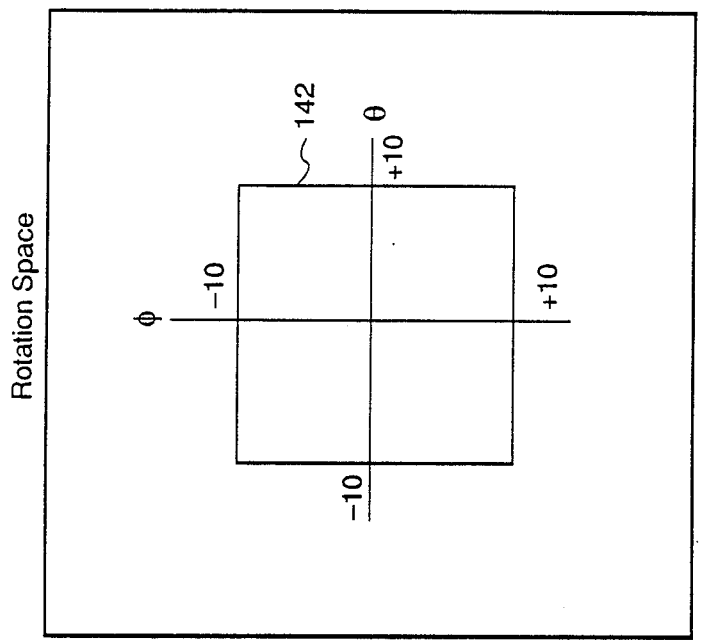
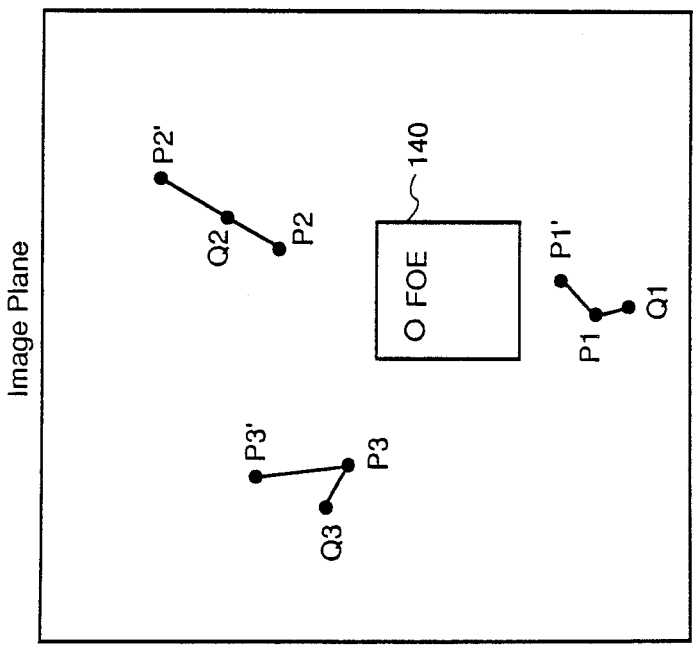
*Fig. 9b*
*Fig. 9a*

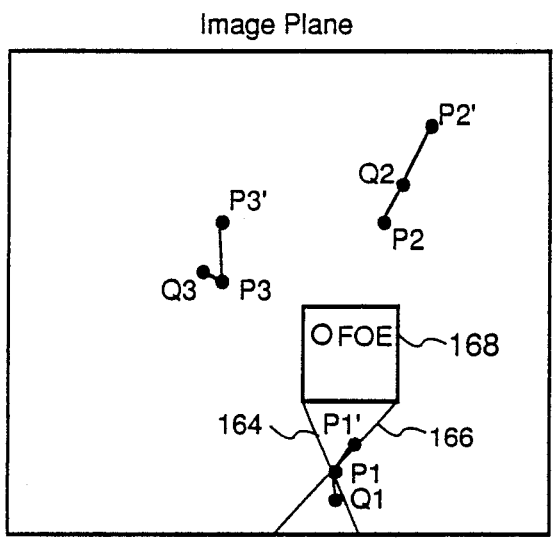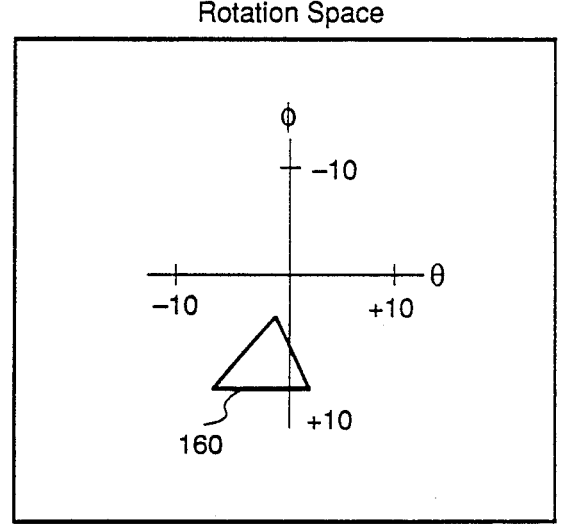
*Fig. 11a*  *Fig. 11b*
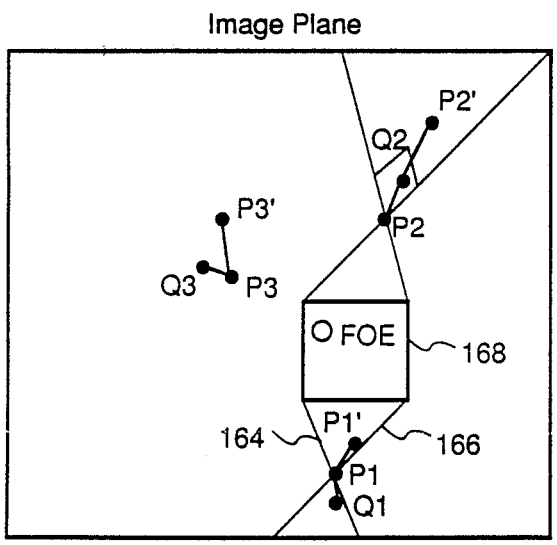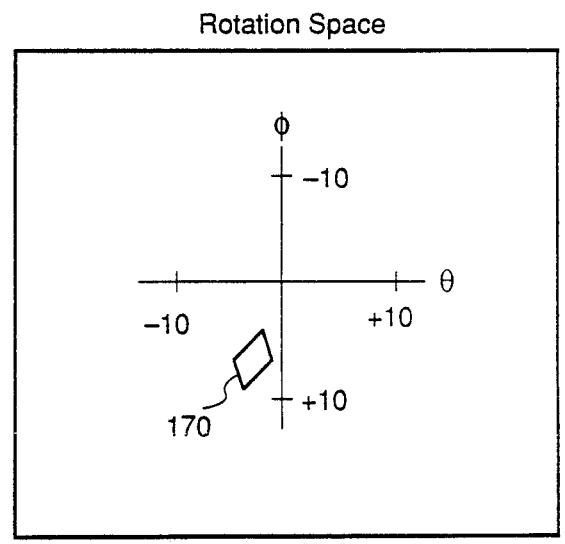
*Fig. 11c*  *Fig. 11d*

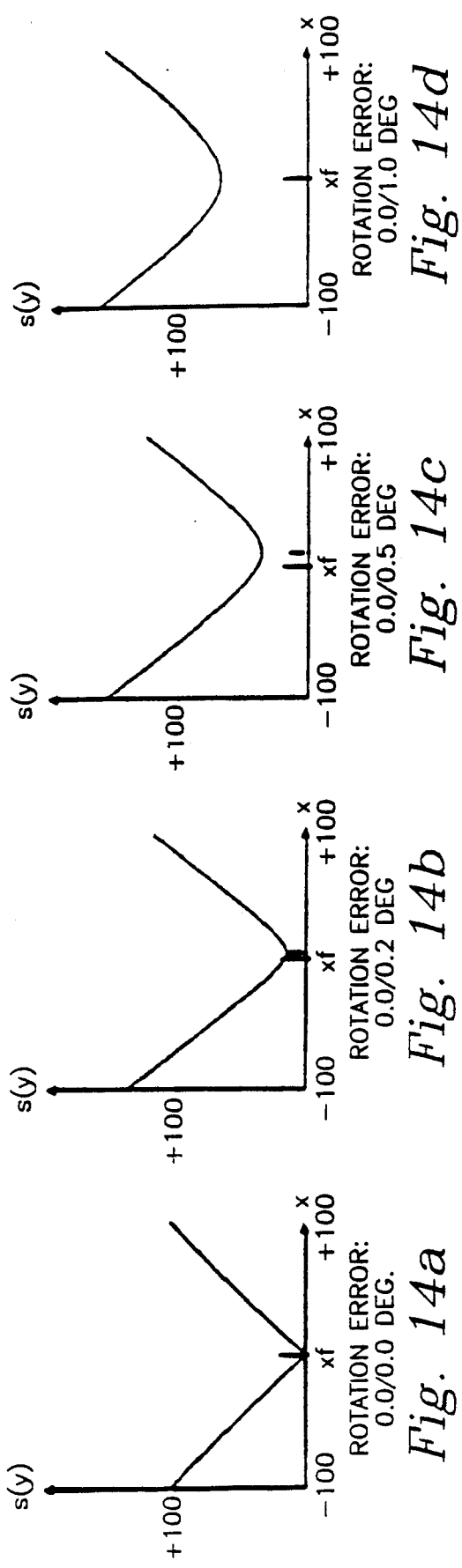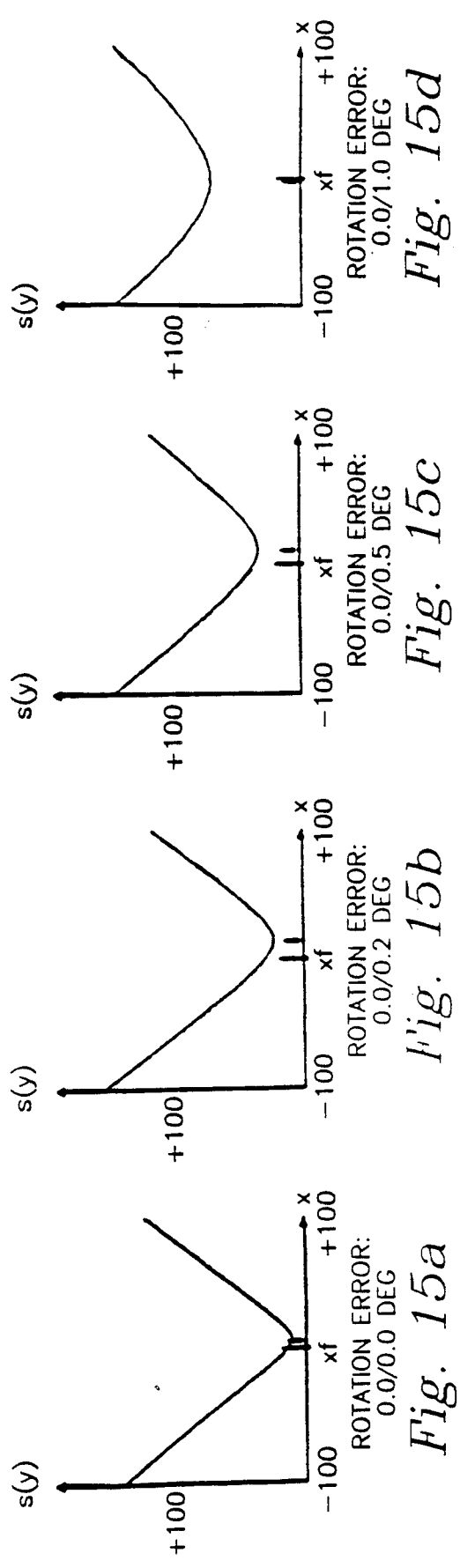

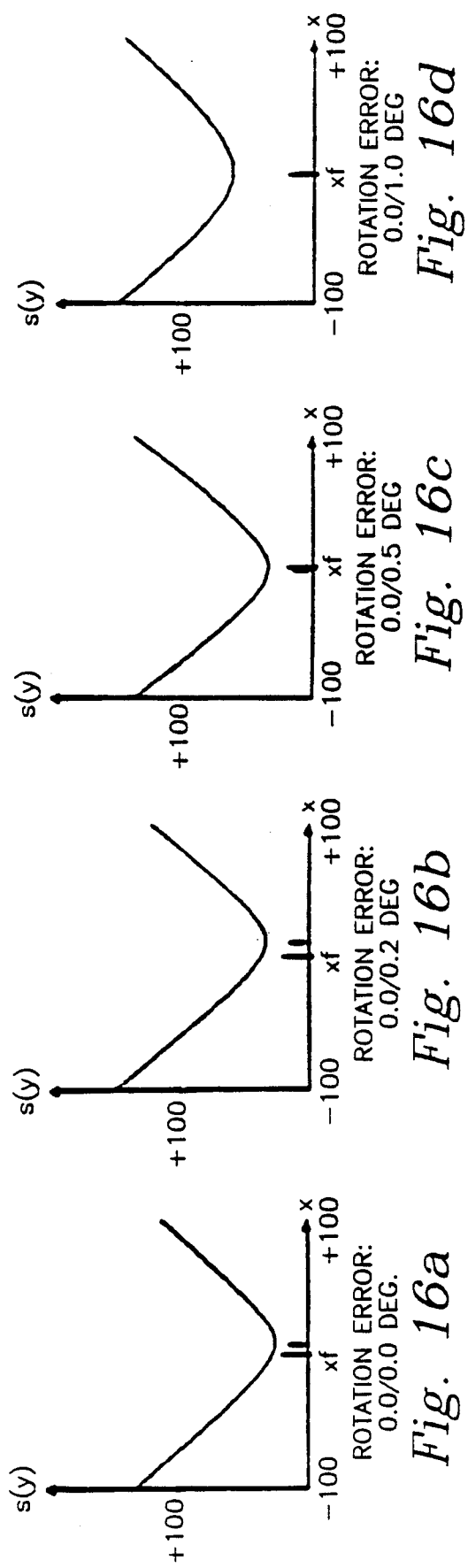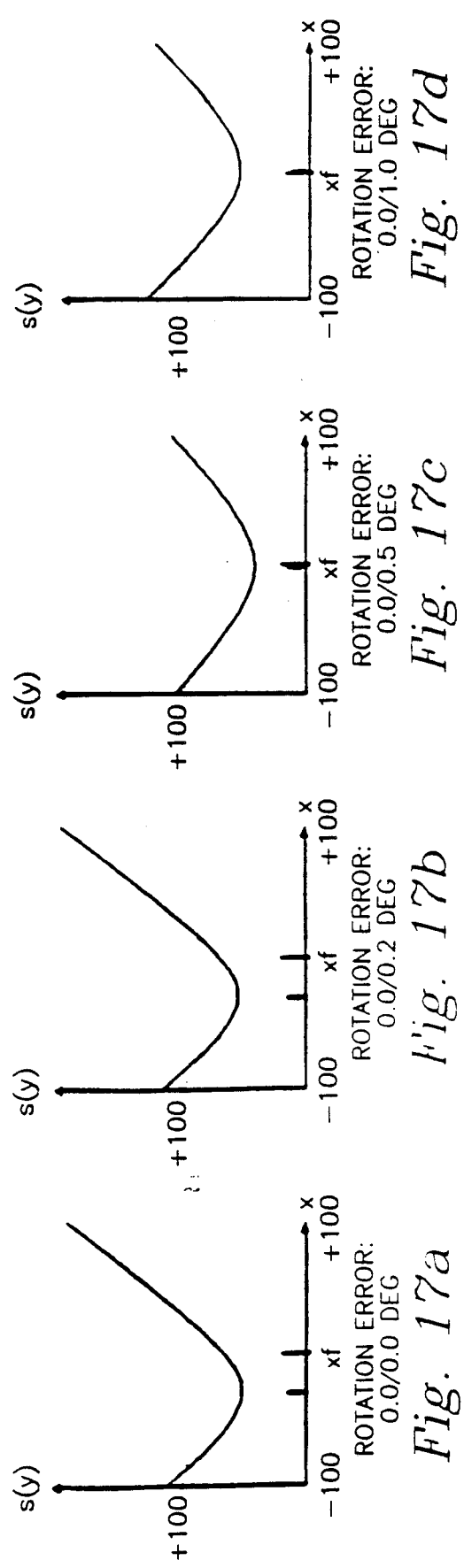

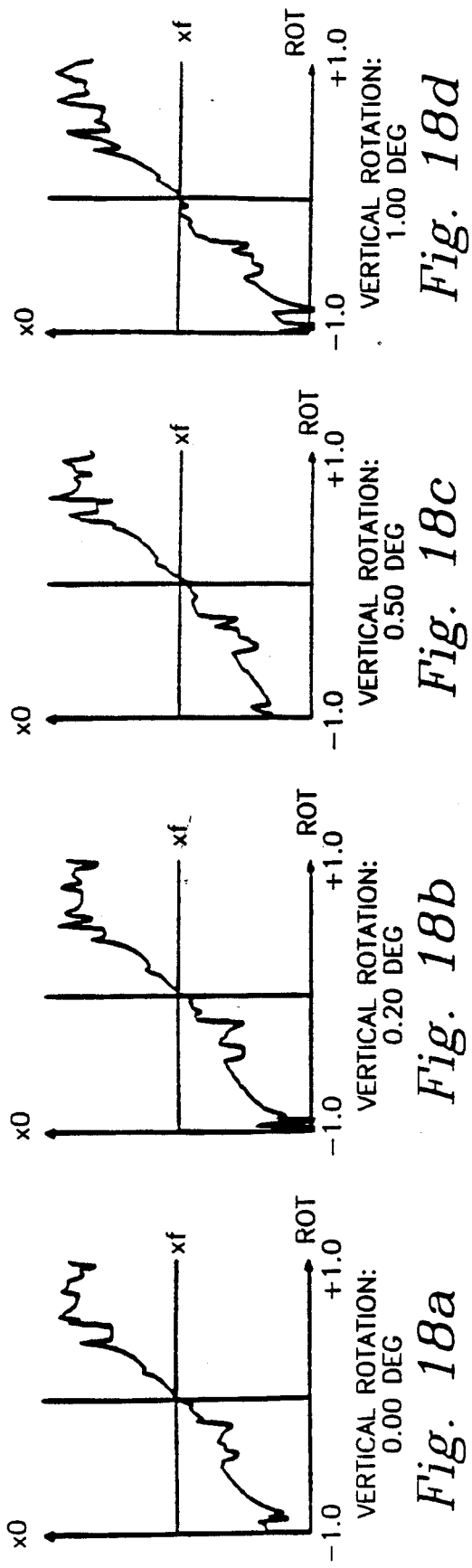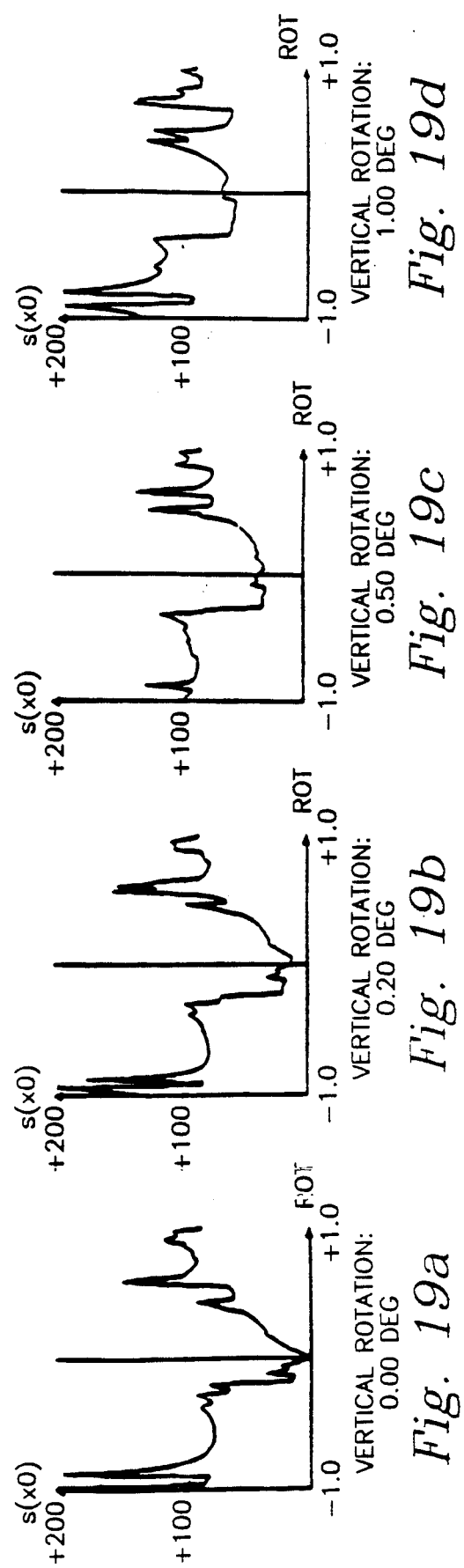

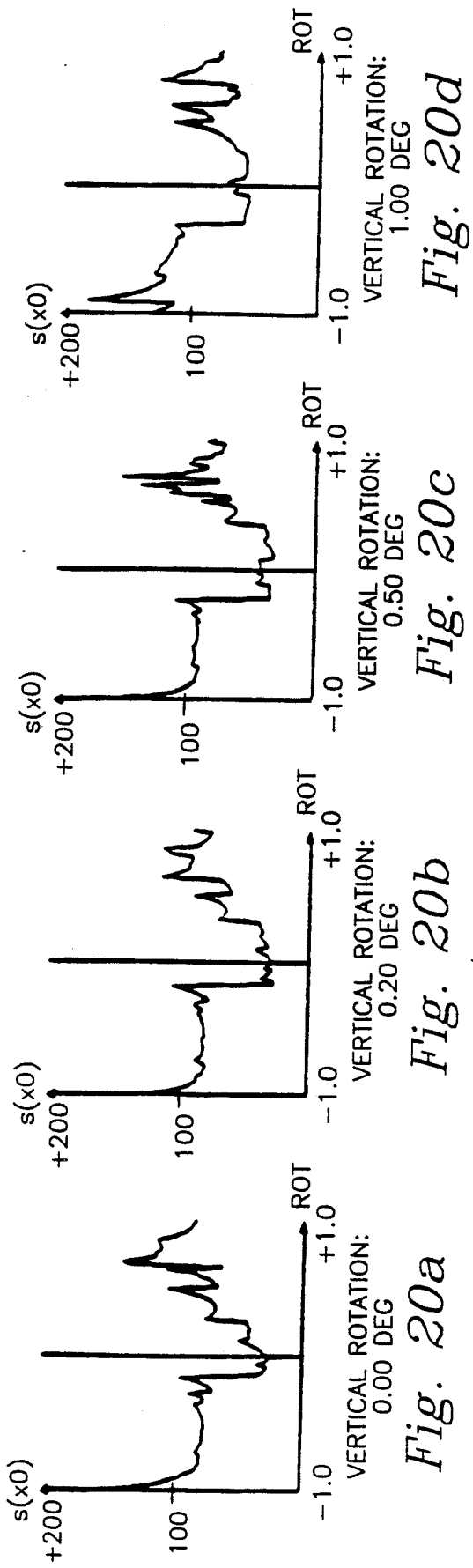
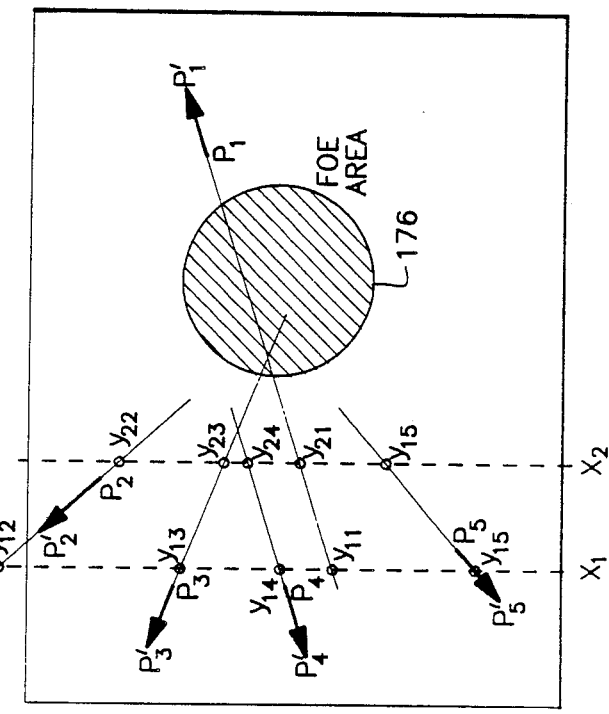

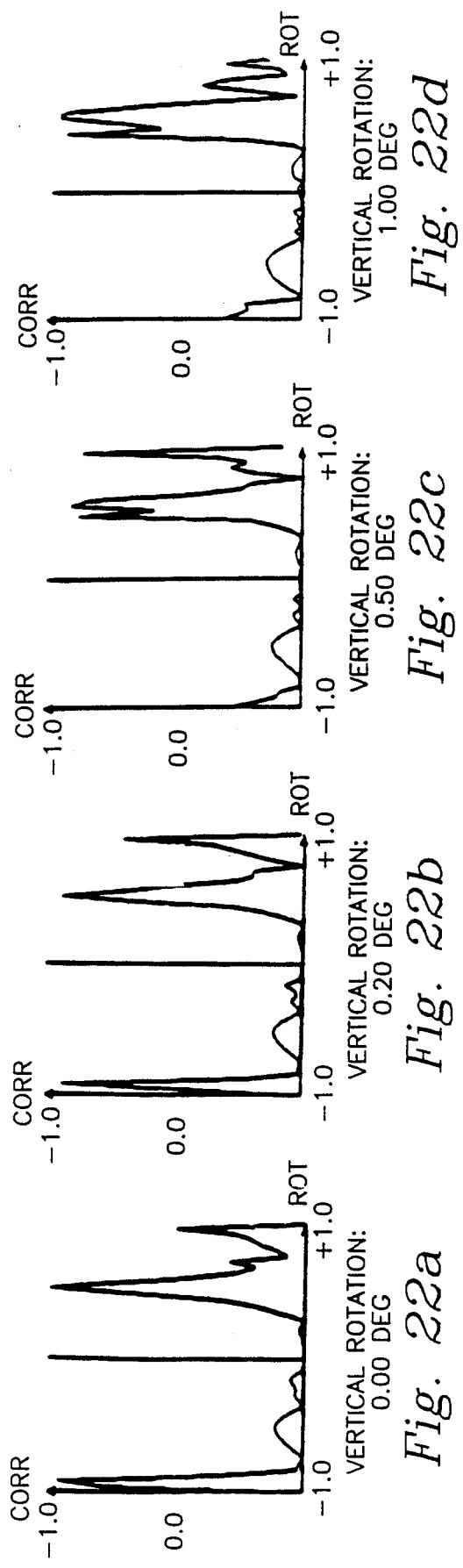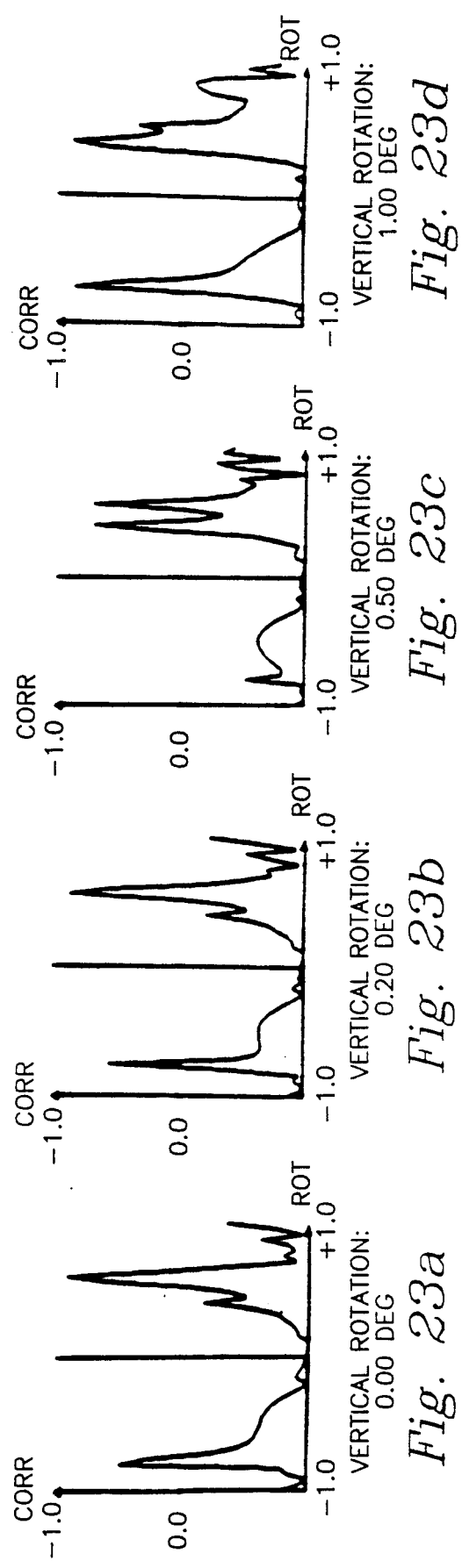

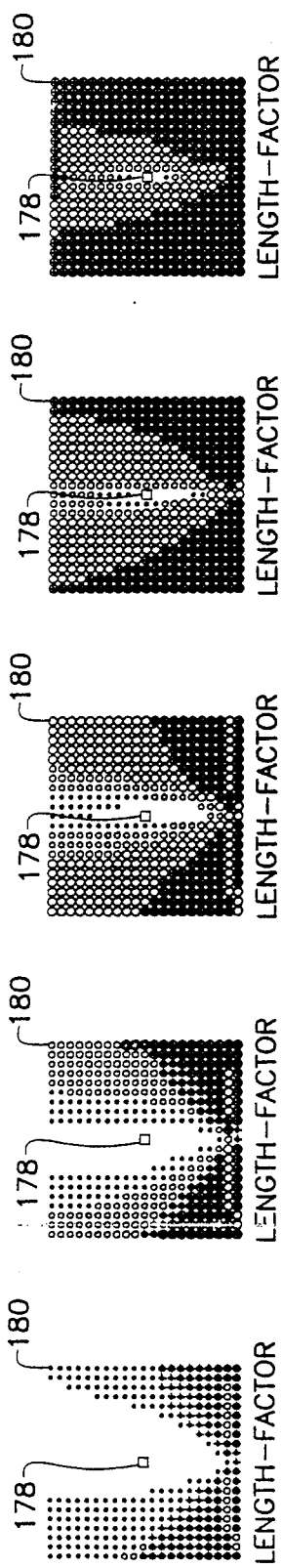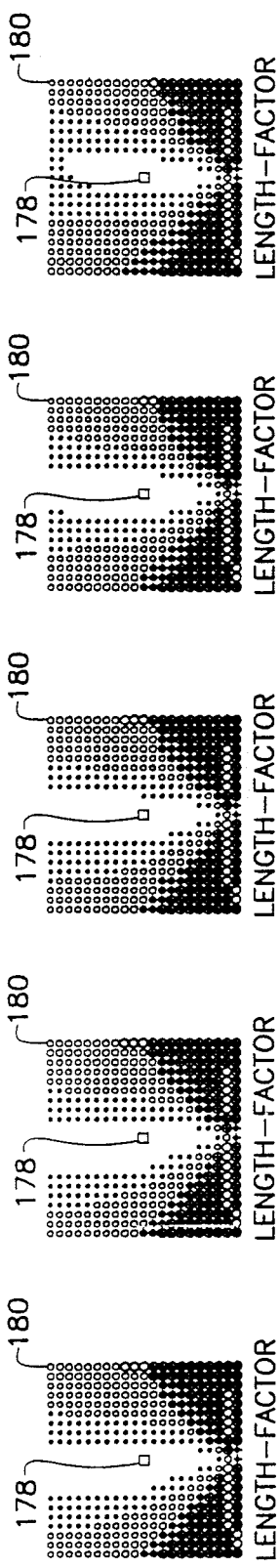
ERROR < 1.0  · ERROR = 1.0  ∘ ERROR = 2.0  ○ ERROR = 3.0  ⊙ ERROR = 4.0  ● ERROR > 4.0  + PROHIBITED

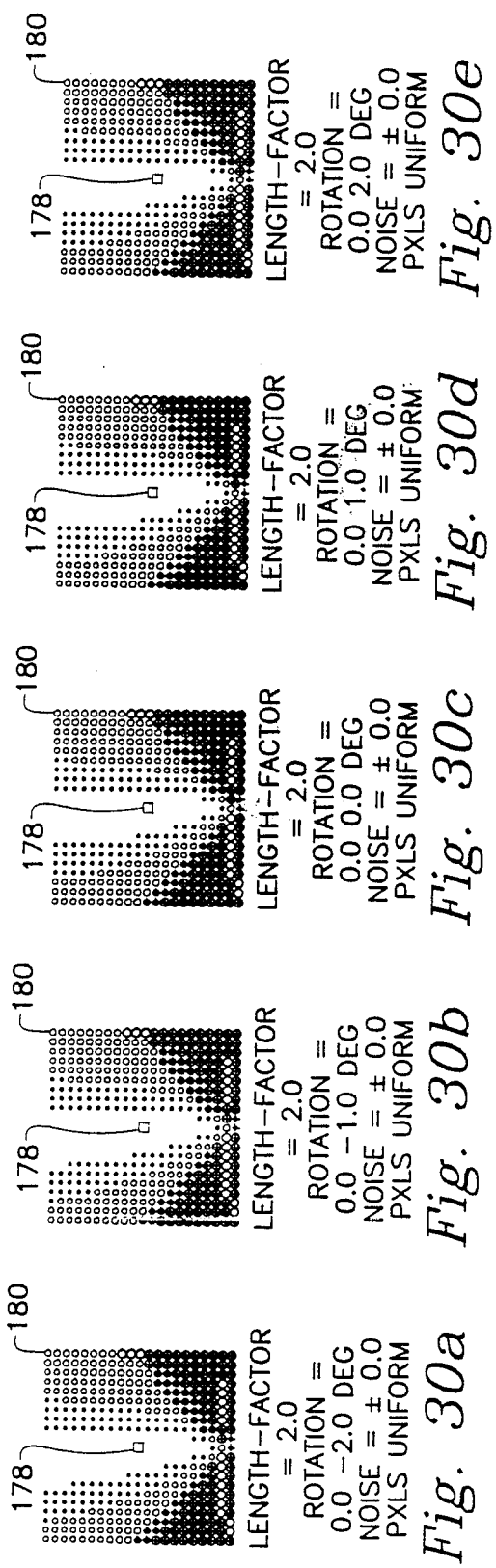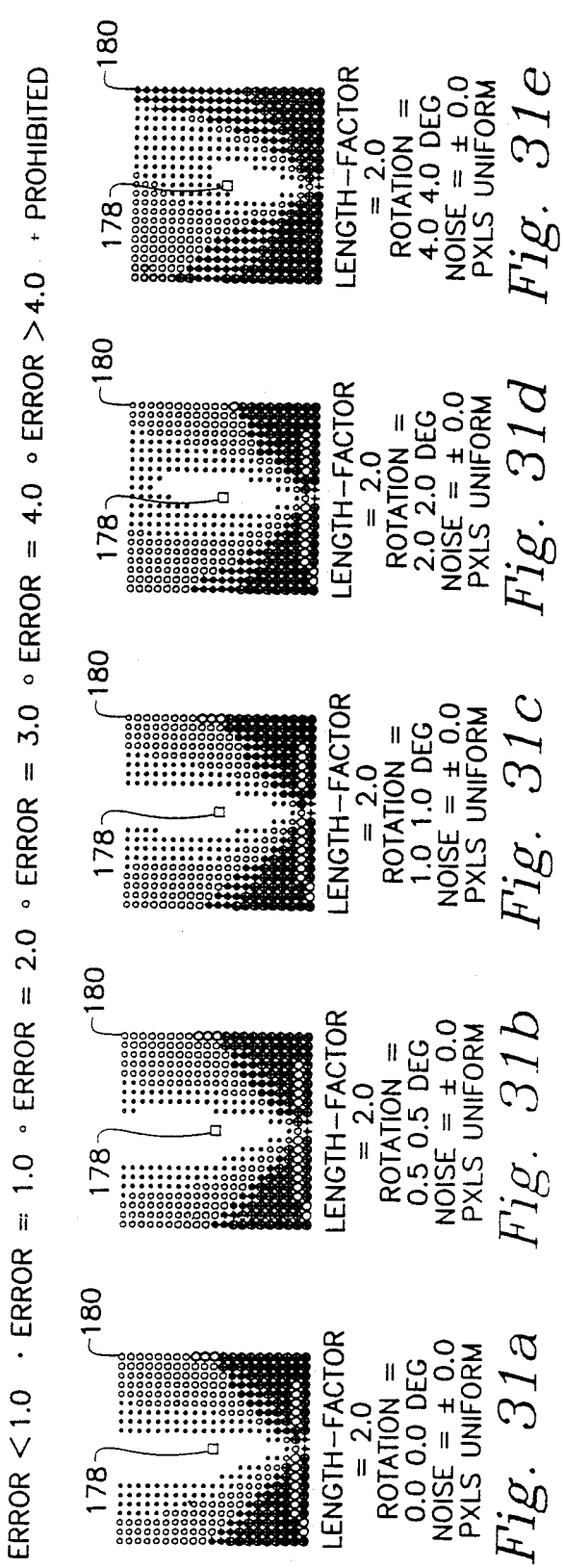

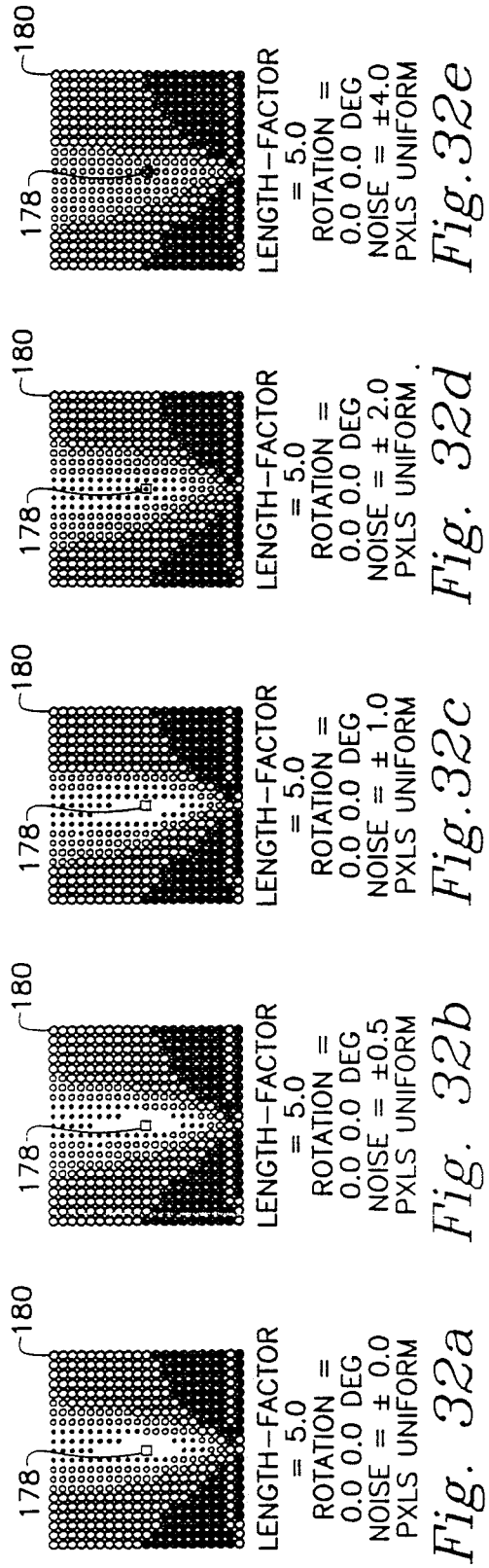

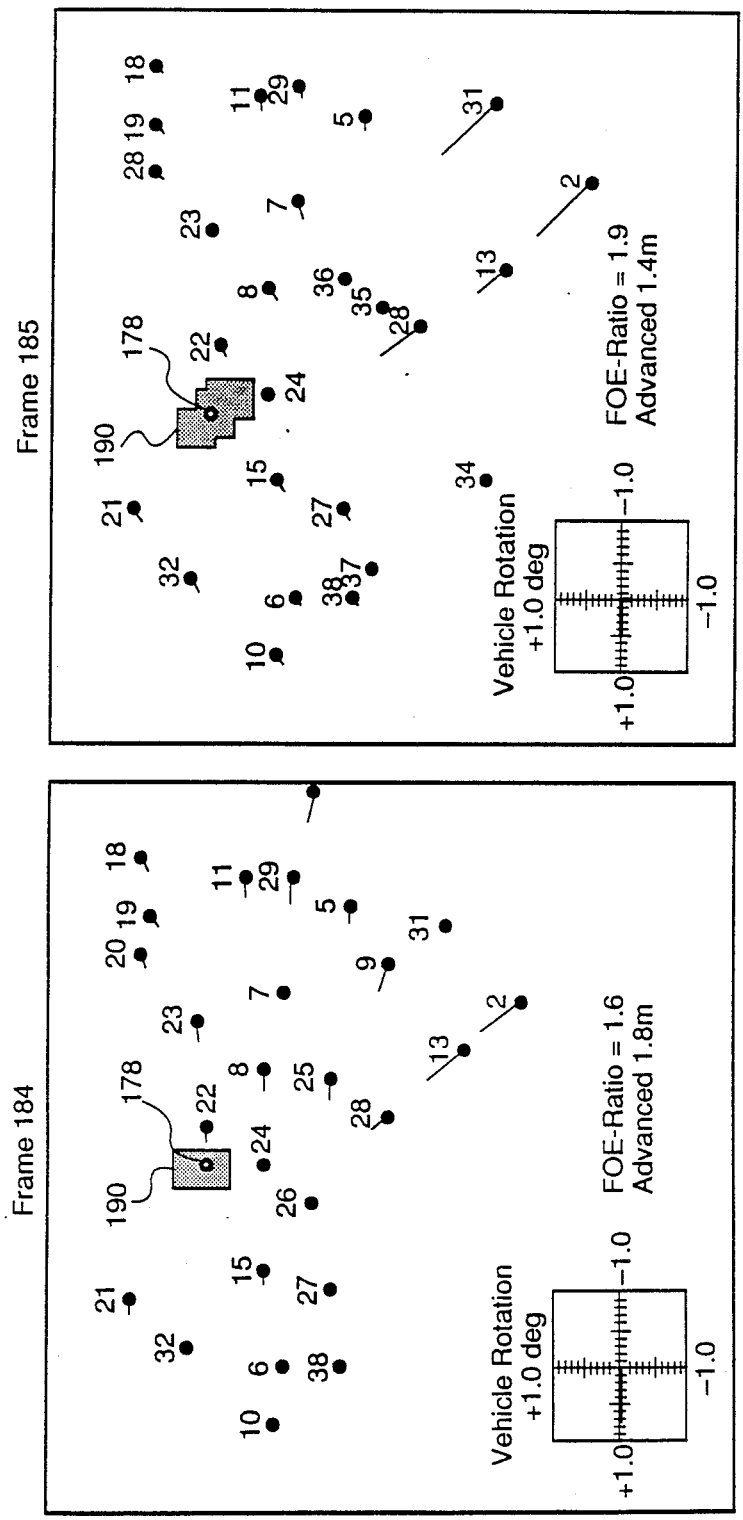

SYSTEM FOR COMPUTING THE SELF-MOTION OF MOVING IMAGES DEVICES

FIELD OF THE INVENTION

The present invention pertains to imaging and particularly to three-dimensional interpretation of two-dimensional image sequences. More particularly, the invention pertains to determination of three-dimensional self-motion of moving imaging devices.

BACKGROUND OF THE INVENTION

Visual information is an indispensable clue for the successful operation of an autonomous land vehicle. Even with the use of sophisticated inertial navigation systems, the accumulation of position error requires periodic corrections. Operation in unknown environments or mission tasks involving search, rescue, or manipulation critically depend upon visual feedback.

Assessment of scene dynamics becomes vital when moving objects may be encountered, e.g., when the autonomous land vehicle follows a convoy, approaches other vehicles, or has to detect moving threats. For the given case of a moving camera, such as one mounted on the autonomous land vehicle, image motion can supply important information about the spatial layout of the environment ("motion stereo") and the actual movements of the land vehicle.

Previous work in motion analysis has mainly concentrated on numerical approaches for the recovery of three-dimensional (3-D) motion and scene structure from two-dimensional (2-D) image sequences. The most common approach is to estimate 3-D structure and motion in one computational step by solving a system of linear or non-linear equations. This technique is characterized by several severe limitations. First, it is known for its notorious noise-sensitivity. To overcome this problem, some researchers have extended this technique to cover multiple frames. Secondly, it is designed to analyze the relative motion and 3-D structure of a single rigid object. To estimate the egomotion of an autonomous land vehicle (ALV), having the imaging device or camera, and the accompanying scene structure, the environment would have to be treated as a large rigid object. However, rigidness of the environment cannot be guaranteed due to the possible presence of moving objects in the scene. The consequence of accidentally including a moving 3-D point into the system of equations, representing the imaged environment, in the best case, would be a solution (in terms of motion and structure) exhibiting a large residual error, indicating some non-rigid behavior. The point in motion, however, could not be immediately identified from this solution alone. In the worst case (for some forms of motion), the system may converge towards a rigid solution (with small error) in spite of the actual movement in the point set. This again shows another (third) limitation: there is no suitable means of expressing the ambiguity and uncertainty inherent to dynamic scene analysis. The invention, that solves the aforementioned problems, is novel in two important aspects. The scene structure is not treated as a mere by-product of the motion computation but as a valuable means to overcome some of the ambiguities of dynamic scene analysis. The key idea is to use the description of the scene's 3-D structure as a link between motion analysis and other processes that deal with spatial perception, such as shape-from-occlusion, stereo, spatial reasoning, etc. A 3-D intepretation of a moving scene can only be correct if it is acceptable by all the processes involved.

Secondly, numeral techniques are largely replaced by a qualitative strategy of reasoning and modeling. Basically, instead of having a system of equations approaching a single rigid (but possibly incorrect) numerical solution, multiple qualitative interpretations of the scene are maintained. All the presently existing interpretations are kept consistent with the observations made in the past. The main advantage of this approach of the present invention is that a new interpretation can be supplied immediately when the currently favored interpretation turns out to be unplausible.

The problem of determining the motion parameters of a moving camera relative to its environment from a sequence of images is important for applications for computer vision in mobile robots. Short-term control, such as steering and braking, navigation, and obstacle detection/avoidance are all tasks that can effectively utilize this information.

SUMMARY OF THE INVENTION

The present invention deals with the computation of sensor platform motion from a set of displacement vectors obtained from consecutive pairs of images. It is directed for application to autonomous robots and land vehicles. The effects of camera rotation and translation upon the observed image are overcome. The new concept of "fuzzy" focus of expansion (FOE), which marks the direction of vehicle heading (and provides sensor rotation), is exploited. It is shown that a robust performance for FOE location can be achieved by computing a 2-D region of possible FOE-locations (termed "Fuzzy FOE") instead of looking for a single-point FOE. The shape of this FOE is an explicit indicator of the accuracy of the result. Given the fuzzy FOE, a number of very effective inferences about the 3-D scene structure and motion are possible and the fuzzy FOE can be employed as a practical tool in dynamic scene analysis. The results are realized in real motion sequences.

The problem of understanding scene dynamics is to find consistent and plausible 3-D interpretations for any change observed in the 2-D image sequence. Due to the motion of the autonomous land vehicle (ALV), containing the scene sensing device, stationary objects in the scene generally do not appear stationary in the image, whereas moving objects are not necessarily seen in motion. The three main tasks of the present approach for target motion detection and tracking are: (1) to estimate the vehicle's motion; (2) to derive the 3-D structure of the stationary environment; and (b 3) to detect and classify the motion of individual targets in the scene. These three tasks are interdependent. The direction of heading (i.e., translation) and rotation of the vehicle are estimated with respect to stationary locations in the scene. The focus of expansion (FOE) is not determined as a particular image location, but as a region of possible FOE-locations called the fuzzy FOE. We present a qualitative strategy of reasoning and modeling for the perception of 3-D space from motion information. Instead of refining a single quantitative description of the observed environment over time, multiple qualitative interpretations are maintained simultaneously. This offers superior robustness and flexibility over traditional numerical techniques which are often ill-conditioned and noise-sensitive. A rule-based implementation of this approach is discussed results on real ALV imagery are presented.

The system of the present invention tracks stationary parts of the visual environment in the image plane, using corner points, contour segments, region boundaries and other two-dimensional tokens as references. This results in a set of 2-D displacement vectors for the selected tokens for each consecutive pair of camera images. The self-motion of the camera is modeled as two separate rotations about horizontal and the vertical axes passing through the lens center and a translation in 3-D space. If the camera performs pure translation along a straight line in 3-D space, then (theoretically) all the displacement vectors extend through one particular location in the image plane, called the focus of expansion (FOE) under forward translation or focus of contraction (FOC) under backward translation. The 3-D vector passing through the lens center and the FOE (on the image plane) corresponds to the direction of camera translation in 3-D space.

The invention can provide the directions of instantaneous heading of the vehicle (FOE) within 1° and self motions of moving imaging devices can be accurately obtained. This includes rotations of ±5° or larger in horizontal and vertical directions. To cope with the problems of noise and errors in the displacement field, a region of possible FOE-locations (i.e., the fuzzy FOE) is determined instead of a single FOE.

In practice, however, imaging noise, spatial discretization errors, etc., make it impractical to determine the FOE as an infinitesimal image location. Consequently, a central strategy of our method is to compute a region of possible FOE-locations (instead of a single position) which produces more robust and reliable results than previous approaches.

BRIEF DESCRIPTION OF THE DRAWINGS

FIGS. 9a and 9b show an image plane and a rotation space, respectively.

FIGS. 11a-f illustrate a changing rotation polygon.

FIGS. 14a-d reveal the standard deviation of intersection at a vertical cross section at position x for different amounts of vertical rotation.

FIGS. 15a-d reveal the standard deviation of intersection (square root) at a vertical cross section at position x for different amounts of vertical rotation with no horizontal rotation and with no pixel noise applied to the image locations.

FIGS. 16a-d reveal the standard deviation of intersection (square root) at a vertical cross section at position x for different amounts of vertical rotation with no horizontal rotation and with ±1 pixels of noise applied to the image locations.

FIGS. 17a-d reveal the standard deviation of intersection (square root) at a vertical cross section at position x for different amounts of vertical rotation with no horizontal rotation and with ±2 pixels of noise applied to the image locations.

FIGS. 18a-d show the location of minimum intersection standard deviation under varying horizontal rotation with the horizontal location of the FOE marked xf.

FIGS. 19a-d show the amount of minimum intersection standard deviation under varying horizontal rotation and with no noise added to the image locations.

FIGS. 20a-d show the amount of minimum intersection deviation under varying horizontal rotation and with ±2 pixels noise added to the image locations.

FIG. 21 illustrates intersecting displacement vectors with two vertical lines which lie on the same side of the FOE.

FIGS. 22a-d show the correlation coefficient for the intersection of displacement vectors at two vertical lines under varying horizontal rotations with no noise added.

FIGS. 23a-d show the correlation coefficient for the intersection of displacement vectors at two vertical lines under varying horizontal rotations and with ±2 pixels of noise added to the image locations.

FIGS. 28a-e display the effects of increasing the average length of displacement vectors upon the shape of the error function.

FIGS. 29a-e display the effects of increasing residual rotation in a horizontal direction upon the shape of the error function for relatively short vectors.

FIGS. 30a-e display the effects of increasing residual rotation in a vertical direction upon the shape of the error function for relatively short vectors.

FIGS. 31a-e show the effects of increasing residual rotation in horizontal and vertical directions upon the shape of the error function for relatively short vectors.

FIGS. 31f-j indicate the amount of optimal linear shift obtained under the same conditions in FIGS. 31a-e.

FIGS. 32a-e show the effects of the uniform noise applied to image point coordinates for a constant average vector length.

DESCRIPTION OF THE PRESENT EMBODIMENT

Figure 1:
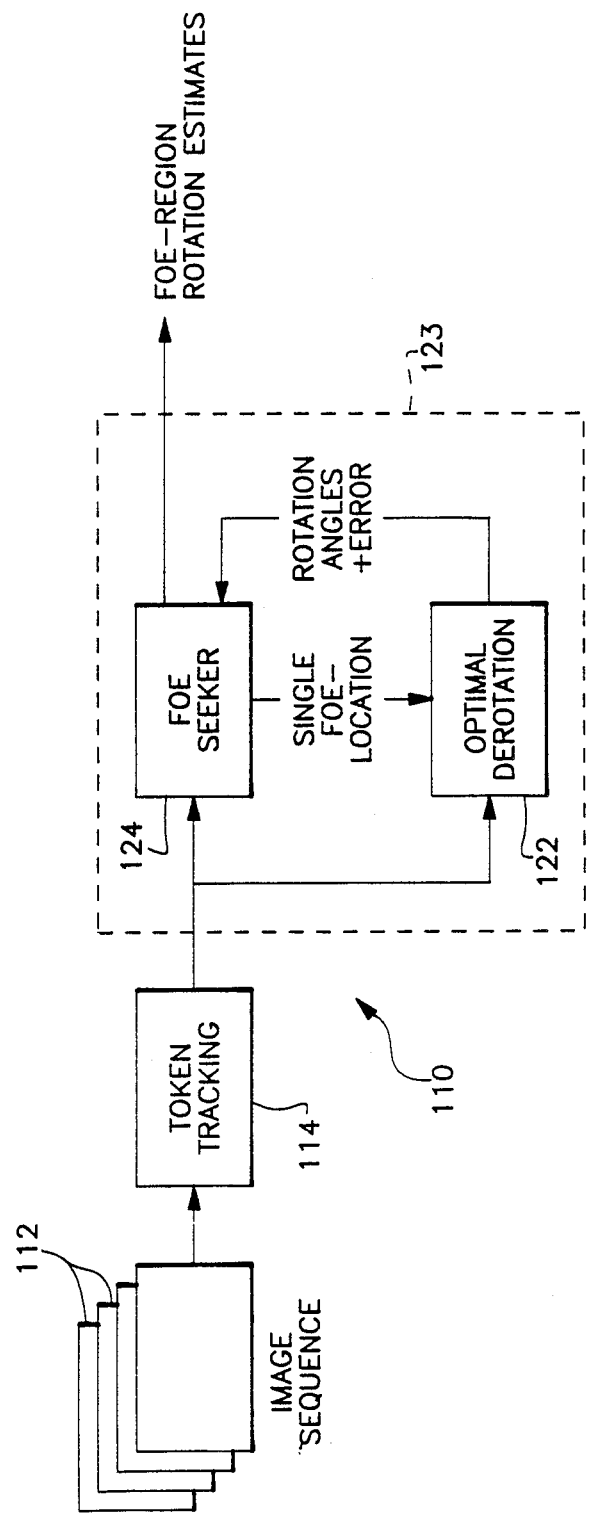
FIG. 1 is a functional block diagram of the present invention.
Figure 2:
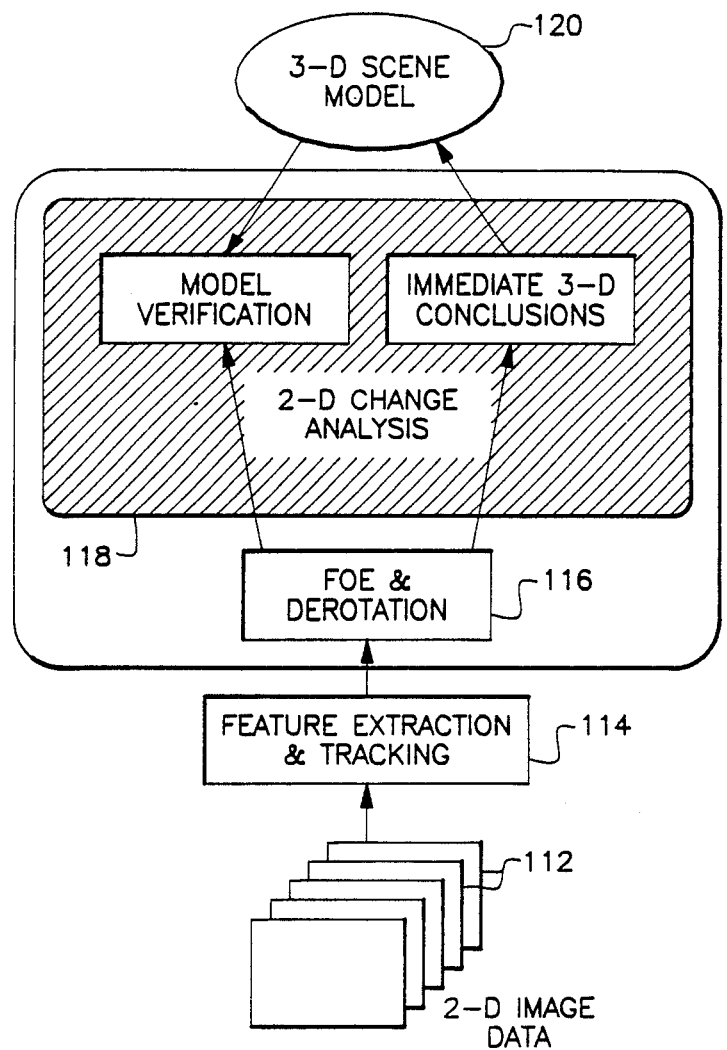
FIG. 2 is a diagram showing an extended application of the invention to three-dimensional scene constructing.

FIGS. 1 and 2 reveal the main portions of the present invention. FIG. 2 also expands on 3-D interpretations of 2-D images in items 118 and 120. Item 116 incorporates portions of items 122 and 124 of FIG. 1. First, significant features (points, boundaries, corners, etc.) are extracted by feature extraction and tracking 114 from the image data 112 and the 2-D displacement vectors are computed for this set of features. For the examples shown here, points were selected and tracked between individual frames by item 114. Automatic techniques suitable for this task are in the related art. In the second step, the vehicle's direction of translation, i.e. the focus of expansion (FOE), and the amount of rotation in space are determined. The effects of vehicle motion on the FOE computation is described below. Nearly all the necessary numerical computation is perforated in the FOE computation stage, which also is described below. The third step (at 2-D change analysis 118) constructs an internal 3-D model of the scene. Also disclosed are the concepts and operation of the qualitative scene model 120. Experiments with the present invention on real imagery taken from a moving ALV are discussed below.

System 110 contains the following three main components—token tracking 114, FOE seeker 124 and optimal derotation 122—in FIG. 1. The 2-D displacement vectors for selected image tokens are determined in the first stage (token tracking 114). Since those original displacement vectors are caused by some arbitrary and (at this point) unknown camera motion, including camera rotations, they do not yet exhibit the characteristic radial pattern of pure camera translation.

The second component (FOE seeker 124) selects a set of candidate locations for the FOE and forms a connected image region of feasible FOE-locations plus the range of corresponding camera rotations, based on the results from the third component (optimal derotation 122). A particular FOE-location is feasible, if the corresponding error value (computed by the optimal derotation module 122) is below some dynamically adjusted threshold. The size of the final FOE-region reflects the amount of uncertainty contained in the visual information (large regions reflect high uncertainty).

The third component (optimal derotation 122) determines the optimal 3-D camera rotations for a particular (hypothesized) FOE-location. This is accomplished by simulating the effects of reverse camera rotations upon the given set of displacement vectors. The camera is virtually rotated until the modified displacement field is closest to a radial expansion pattern with respect to the selected FOE-location. Module 122 returns the necessary amount of reverse rotation and the deviation from a radial displacement field (i.e., an error value).

Component 123, comprising FOE seeker 124 and optimal derotation 122, represents the fuzzy FOE means which outputs the region of possible FOE locations.

The first step of the present invention is to estimate the vehicle's motion relative to the stationary environment using visual information. Arbitrary movement of an object in 3-D space and thus the movement of the vehicle itself can be described as a combination of translation and rotation. While knowledge about the composite vehicle motion is essential for control purposes, only translation can supply information about the spatial layout of the 3-D scene (motion stereo). This, however, requires the removal of all image effects results from vehicle rotation. For this purpose, we discuss the changes upon the image that are caused by individual application of the "pure" motion components.

It is well-known that any rigid motion of an object in space between two points in time can be decomposed into a combination of translation and rotation. While many researchers have used a velocity-based formulation of the problem, the following treatment views motion in discrete time steps.

Figure 3:
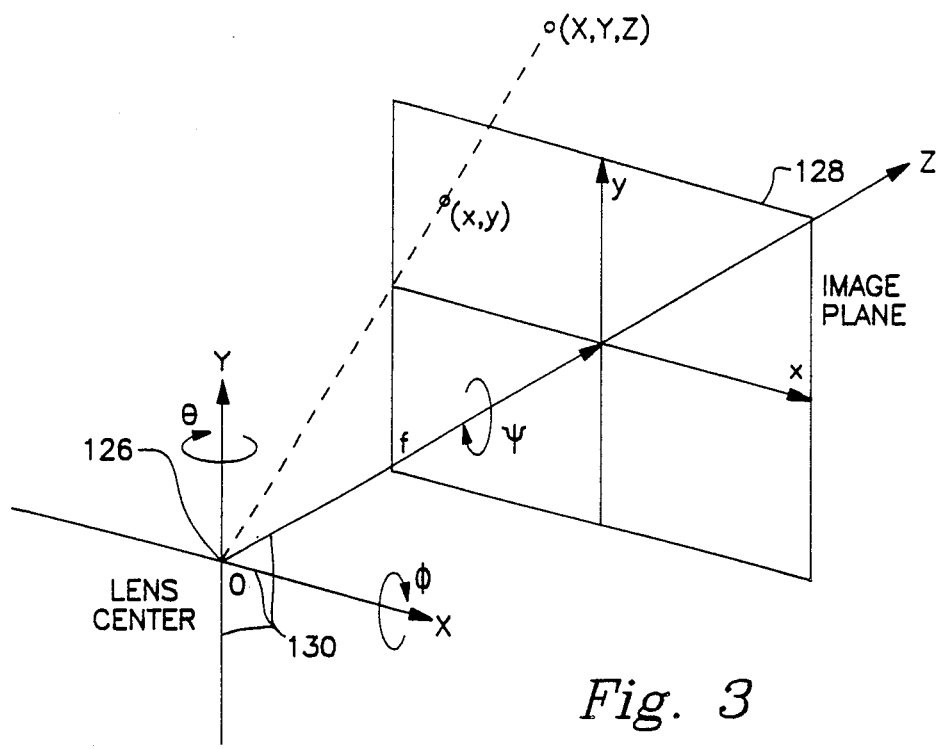
FIG. 3 shows a camera model and corresponding coordinate system.

The viewing geometry involves a world coordinate system, (XYZ) as illustrated in FIG. 3. FIG. 3 shows the camera-centered coordinate system 130, lens center 126, image plane 128, and angles $\phi$, $\theta$ and $\psi$ of rotation. The origin 0 of coordinate system 130 is located at lens center 126. Focal length f is the distance between lens center 126 and image plane 128. Each 3-D point (XYZ) may be mapped onto image location (X,Y). Angles $\phi$, $\theta$ and $\psi$ specify angles of camera rotation about the X,Y and Z axes, respectively. Given the world coordinate system, a translation $T=(U \ V \ W)^T$ applied to a point in 3-D $X=(X \ Y \ Z)^T$ is accomplished through vector addition:

$$X' = T + X = \begin{bmatrix} X' \\ Y' \\ Z' \end{bmatrix} = \begin{bmatrix} U \\ V \\ W \end{bmatrix} + \begin{bmatrix} X \\ Y \\ Z \end{bmatrix}. \tag{1}$$

A 3-D rotation R about an arbitrary axis through the origin of coordinate system 130 can be described by successive rotations about its three axes:

$$R = R_\phi R_\theta R_\psi \text{ where} \tag{2}$$

$$R_\phi = \begin{bmatrix} 1 & 0 & 0 \\ 0 & \cos\phi & -\sin\phi \\ 0 & \sin\phi & \cos\phi \end{bmatrix} \text{ rotation about the X-axis,} \tag{3a}$$

$$R_\theta = \begin{bmatrix} \cos\theta & 0 & \sin\theta \\ 0 & 1 & 0 \\ -\sin\theta & 0 & \cos\theta \end{bmatrix} \text{ rotation about the Y-axis,} \tag{3b}$$

$$R_\psi = \begin{bmatrix} \cos\psi & \sin\psi & 0 \\ -\sin\psi & \cos\psi & 0 \\ 0 & 0 & 1 \end{bmatrix} \text{ rotation about the Z-axis.} \tag{3c}$$

A general rigid motion in space consisting of translation and rotation is described by the transformation $$M: X \to X' = R_\phi R_\theta R_\psi (T + X) \quad (4)$$

Its six degrees of freedom are U, V, W, $\phi$, $\theta$, $\psi$.

This decomposition is not unique because the translation could be as well applied after the rotation. Also, since the multiplication of the rotation matrices is not commutative, a different order of rotations would result in different amounts of rotation for each axis. For a fixed order of application, however, this motion decomposition is unique.

To model the movements of the vehicle, the camera is considered as being stationary and the environment as being moving as one single rigid object relative to the camera. The origin 0 of coordinate system 130 is located in the lens center 126 of the camera.

The given task is to reconstruct the vehicle's or the camera's egomotion from visual information. It is therefore necessary to know the effects of different kings of vehicle or camera motion upon the camera image. Under perspective imaging, a point in space $X = (X\ Y\ Z)^T$ is projected onto a location on the image plane $X = (X\ Y)^T$ such that $$x = \frac{fX}{Z}, \quad y = \frac{fY}{Z}, \quad (5)$$

where f is the focal length of the camera (see FIG. 3).

The effects of pure camera rotation are accounted for. Ignoring the boundary efforts when the camera is rotated around its lens center 126, the acquired image changes but no new views of the environment are obtained. Pure camera rotation merely maps the image into itself. The most intuitive effect results from pure rotation about the Z-axis of the camera-centered coordinate system 130, which is also the optical axis. Any point in the image moves along a circle centered at the image location $x = (0\ 0\ )$. In practice, however, the amount of rotation $\psi$ of the vehicle about the Z-axis is small. Therefore, vehicle rotation is confined to the X- and Y-axis, where significant amounts of rotation occur.

The vehicle or camera undergoing rotation about the X-axis by an angle $-\phi$ and the Y-axis by an angle $-\theta$ moves each 3-D point X to point X' relative to the camera.

$$X \to X' = R_\phi . R_\phi . X \quad (6)$$

$$= \begin{bmatrix} \cos\theta & 0 & \sin\theta \\ \sin\phi\sin\theta & \cos\phi & -\sin\phi\cos\phi \\ -\cos\phi\sin\theta & \sin\phi & \cos\phi\cos\theta \end{bmatrix} \cdot \begin{bmatrix} X \\ Y \\ Z \end{bmatrix}.$$

Consequently x, the image point of X, moves tp x' given by $$x' = f \frac{X\cos\theta + Z\sin\theta}{-X\cos\phi\sin\theta + Y\sin\phi + Z\cos\phi\cos\theta} \quad (7a)$$

$$y' = f \frac{X\sin\phi\sin\theta + Y\cos\phi - Z\sin\phi\cos\theta}{-X\cos\phi\sin\theta + Y\sin\phi + Z\cos\phi\cos\theta} \quad (7b)$$

Inverting the perspective transformation for the original image point x yields.

$$X = \frac{1}{f} Zx \text{ and } Y = \frac{1}{f} Zy. \quad (8)$$

The 2-D rotation mapping $r_\theta r_\phi$ which moves each image point $x = (x\ y)$ into the corresponding image point $x' = (x'y')$ under camera rotation $R_\phi R_{74}$ (i.e., a particular sequence of "pan" and "tilt" is given by $$R_\phi R_\theta(X): X \to X' \quad (9a)$$
$$r_\phi r_\theta(x): x = (xy) \to x' = (x'y')$$

$$x' = f \frac{x\cos\theta + f\sin\theta}{-x\cos\phi\sin\theta + y\sin\phi + f\cos\phi\cos\theta}$$
$$x\sin\phi\sin\theta + y\cos\phi - f\sin\phi\cos$$

It is important to notice that this transformation contains no 3-D variables and is therefore a mapping of the image onto itself. This demonstrates that no additional information about the 3-D structure of the scene can be obtained under pure camera rotation.

An interesting property of this mapping should be mentioned at this point, which might not be obvious. Moving an image point on a diagonal passing through the center of the image at 45° by only rotating the camera does not result in equal amounts of rotation about the X- and the Y-axis. This is again a consequence of the successive application of the two rotations $R_\theta$ and $R_\phi$, since the first rotation about the Y-axis also changes the orientation of the camera's X-axis in 3-D space. It also explains why the pair of equations in (7) is not symmetric with respect to $\theta$ and $\phi$.

In measuring the amount of camera rotation, the problem to be solved is the following: Given are two image locations $x_0$ and $x_1$, which are the observations of the same 3-D point at time $t_0$ and time $t_1$. The question here is the amount of rotation $R_{100}$ and $R_{74}$ which applied to the camera between time $t_0$ and time $t_1$, would move image point $x_0$ onto $x_1$ assuming that no camera translation occurred at the same time. If $R_\phi$ and $R_{74}$ are applied to the camera separately, the points in the image move along hyperbolic paths. If pure horizontal rotation were applied to the camera, a given image point $x_0$ would move on a path described by $$r_\theta(x_0): y^2 = y^2_0 \frac{f^2 + x^2}{f^2 + x^2_0} \quad (10)$$

Similarly pure vertical camera rotation would move an image point $x_1$ along $$r_\phi(x_1): x^2 = x^2_1 \frac{f^2 + y^2}{f^2 + y^2_1} \quad (11)$$

Since the 3-D rotation of the camera is modeled as being performed in two separate steps ($R_\theta$ followed by $R_\phi$), the rotation mapping $r_\phi r_\theta$ can also be separated into $r_\theta$ followed by $r_\phi$. In the first step, applying pure (horizontal) rotation around the Y-axis $r_\theta$, point $x_0$ is moved to an intermediate image location $x_c$. The second step, applying pure (vertical) rotation around the X-axis $r_\phi$, takes point $x_c$ to the final image location $x_1$. This can be expressed as $$r_\phi \theta = r_\phi r_\phi, \text{ where} \tag{12}$$

$$r_\theta: x_0 = (x_0 y_0) \to x_c = (x_c y_c)$$
$$r_\phi: x_c = (x_c y_c) \to x_1 = (x_1 y_1)$$

Figure 4:
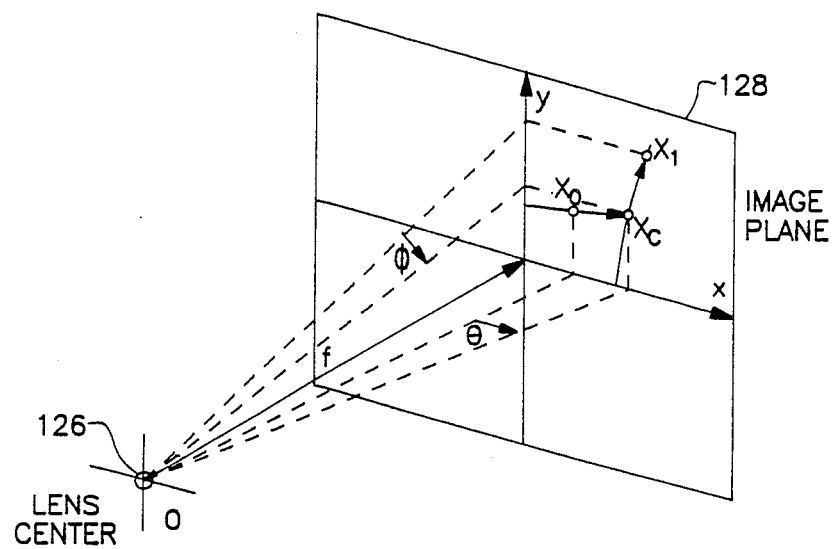
FIG. 4 illustrates a successive application of horizontal and vertical rotation of the camera.

FIG. 4 reveals a successive application of horizontal and vertical rotation. Image point $x_0$ is to be moved to location $x_1$ by pure horizontal and vertical camera rotation. Horizontal rotation (about the Y-axis) is applied first, moving $x_0$ to $x_c$, which is the intersection point of the two hyperbolic paths for horizontal and vertical rotation. In a second step, $x_c$ is taken to $x_1$. Then the two rotation angles $\theta$ and $\phi$ are found directly. Further in FIG. 4, the image point $x_c = (x_c y_c)$ is the intersection point of the hyperbola passing through $x_0$ resulting from horizontal camera rotation (10) with the hyperbola passing through $x_1$ resulting from vertical camera rotation (11). Intersecting the two hyperbolae gives the image point $x_c$, with $$x_c = f x_1 \left[ \frac{f^2 + x_0^2 + y_0^2}{(f^2 + x_0^2)(f^2 + y_1^2) - x_1^2 y_0^2} \right]^{\frac{1}{2}} \tag{13a}$$

$$y_c = f y_0 \left[ \frac{f^2 + x_1^2 + y_1^2}{(f^2 + x_0^2)(f^2 + y_1^2) - x_1^2 y_0^2} \right]^{\frac{1}{2}} \tag{13b}$$

The amount of camera rotation necessary to map $x_0$ onto $_1$ by applying $R_\theta$ followed by $R_\phi$ is finally obtained as $$\theta = \tan^{-1} \frac{x_c}{f} - \tan^{-1} \frac{x_0}{f} \tag{14}$$

$$\phi = \tan^{-1} \frac{y_c}{f} - \tan^{-1} \frac{y_1}{f}. \tag{15}$$

When the vehicle or camera undergoes pure translation between time t and time t', every point on the vehicle is moved by the same 3-D vector $T = (U\ V\ W)^T$. Again, the same effect is achieved by keeping the camera fixed and moving every point $X_i$ in the environment to $X_i'$ by applying $-T$.

Since every stationary point in the environment undergoes the same translation relative to the camera, the imaginary lines between corresponding points $X_i X_i'$ are parallel in 3-D space.

Figure 5:
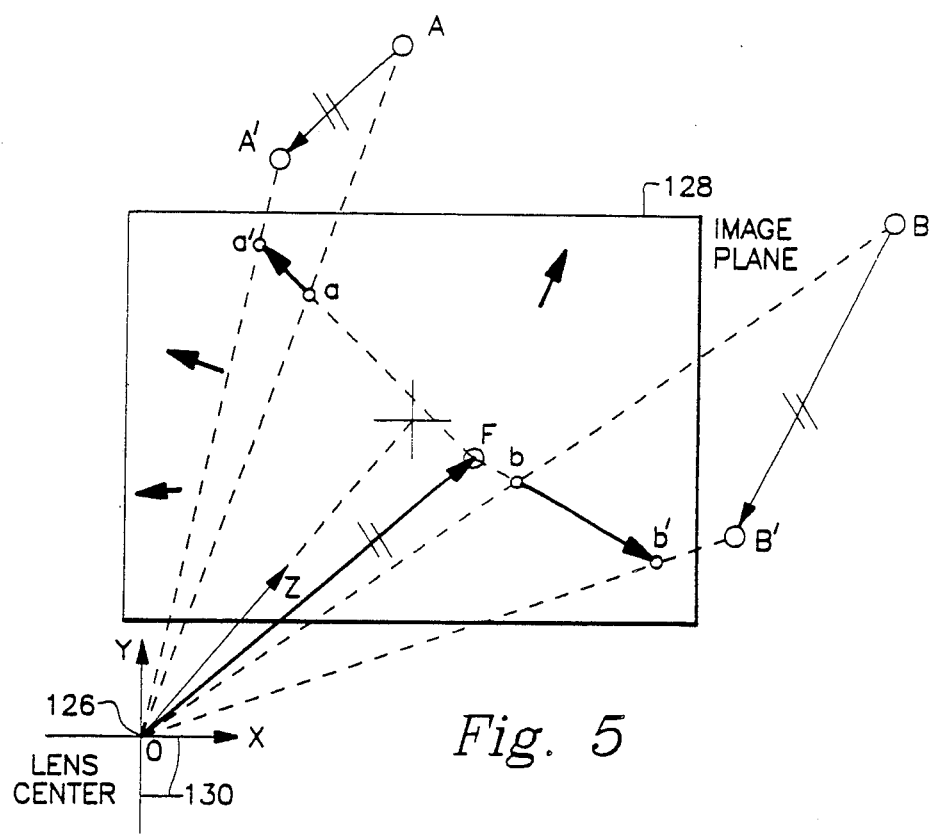
FIG. 5 diagrams the effect of a focus of expansion location (FOE) for pure camera translation.

It is a fundamental result from perspective geometry that the images of parallel lines pass through a single point in the image plane called a "vanishing point." When the camera moves along a straight line, every (stationary) image point seems to expand from this vanishing point or contract towards it when the camera moves backwards. This particular image location is therefore commonly referred to as the focus of expansion (FOE) or the focus of contraction (FOC). Each displacement vector passes through the FOE creating the typical radial expansion pattern shown in FIG. 5. FIG. 5 reveals the location of the FOE. With pure vehicle translation, points in the environment (A,B) move along 3-D vectors parallel to the vector pointing from lens center 126 to the FOE in camera plane 128 (FIG. 3). These vectors form parallel lines in space which have a common vanishing point (the FOE) in the perspective image.

As can be seen in FIG 5, the straight line passing through the lens center of the camera and the FOE is also parallel to the 3-D displacement vectors. Therefore, the 3-D vector $\overrightarrow{OF}$ points in the direction of camera translation in space. Knowing the internal geometry of the camera (i.e., the focal length f), the direction of vehicle translation can be determined by locating the FOE in the image. The actual translation vector T applied to the camera is a multiple of the vector $\overrightarrow{OF}$ which supplies only the direction of camera translation but not its magnitude. Therefore, $$T = \lambda \overrightarrow{OF} = \lambda [x_f y_f f]^T, \lambda \in R. \tag{16}$$

Since most previous work incorporated a velocity-based model of a 3-D motion, the focus of expansion has commonly been interpreted as the direction of instantaneous heading, i.e., the direction of vehicle translation during an infinitely short period in time. When images are given as "snapshots" taken at discrete instances of time, the movements of the vehicle must be modeled accordingly as discrete movements from one position in space to the next. Therefore, the FOE cannot be interpreted as the momentary direction of translation at a certain point in time, but rather as the direction of accumulated vehicle translation over a period of time.

Figure 6:
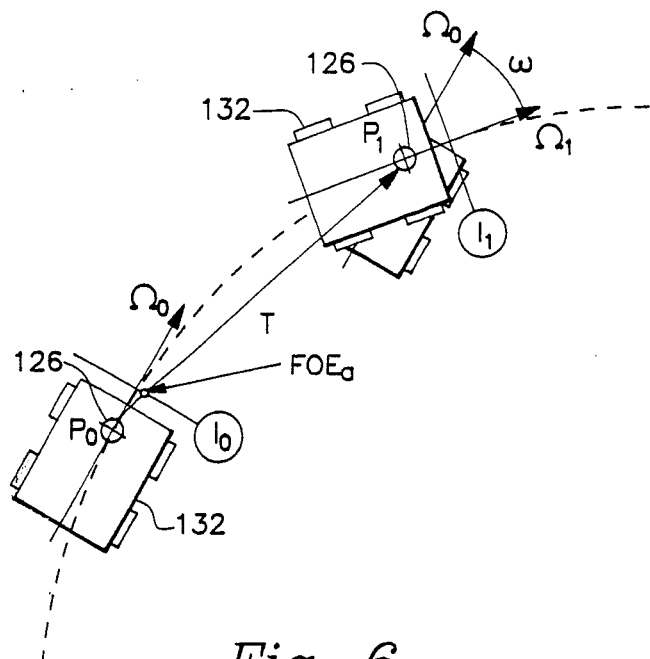
FIG. 6 illustrates the concept of the FOE for discrete time steps during the motion of a vehicle having the camera.

FIG. 6 illustrates the concept of FOE for discrete time steps. The motion of vehicle 132 between two points in time can be decomposed into a translation followed by a rotation. The image effects of pure translation (FOE$_a$) are observed in image $I_o$. FIG. 6 shows the top view of vehicle 132 traveling along a curved path at two instances in time $t_0$ and $t_1$. The position of the vehicle 132 in space is given by the position of a reference point on the vehicle P and the orientation of the vehicle is $\Omega$. FIG. 6 also displays the adopted scheme of 3-D motion decomposition. First, the translation T is applied which shifts the vehicle's reference point (i.e., lens center 126 of the camera) from position $P_0$ to position $P_1$ without changing the vehicle's orientation $\Omega$. The 3-D translation vector T intersects image plane 128 at FOE$_a$. In the second step the vehicle is rotated b $\omega$ to the new orientation $\Omega_1$. Translation T transforms image $I_0$ into image $I'_1$, which again is transformed into $I_1$ by rotation $\omega$. The important fact is that FOE$_a$ is observed at the transition from image $I_0$ to image $I'_1$, which is obtained by derotating image $I_1$ by $-\omega$. Throughout the present description, this scheme (FIG. 6) is used as a model for vehicle or camera motion.

Figure 7:
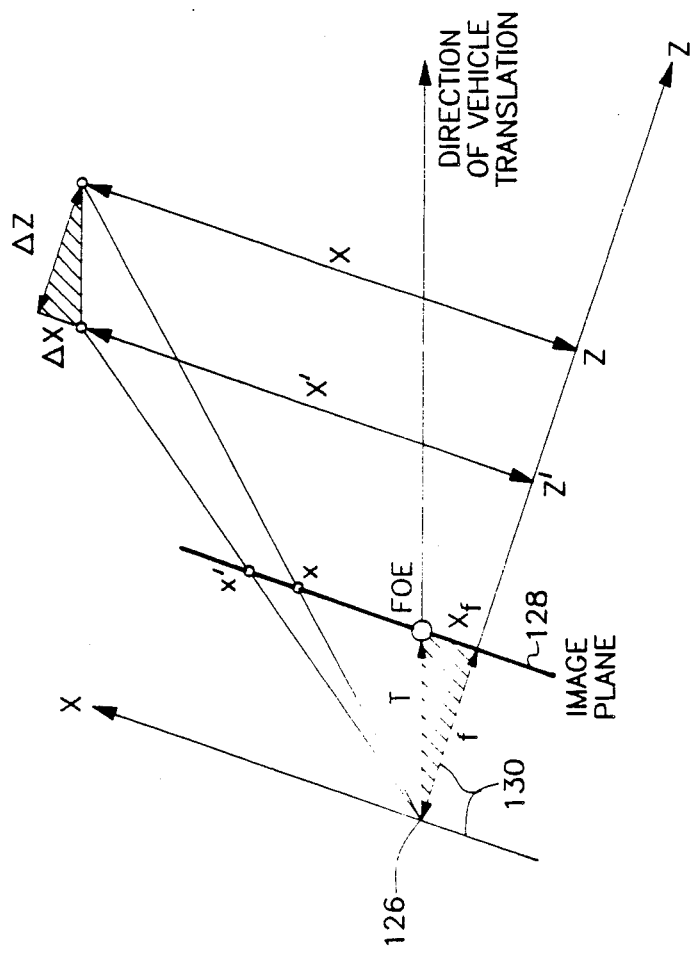
FIG. 7 shows the amount of expansion from the FOE for discrete time steps.

The amount of camera translation can be measured. FIG. 7 shows the geometric relationships for the 2-D case. The amount of expansion from the FOE for discrete time steps is illustrated. FIG. 7 can be considered as a top view of the camera, i.e., a projection onto the X/Z-plane of the camera-centered coordinate system 130. The cross section of the image plane is shown as a straight line. The camera moves by a vector T in 3-D space, which passes through lens center 126 and the FOE in camera plane 128. The 3-D Z-axis is also the optical axis of the camera. The camera is translating from left to right in the direction given by $T = (X_f f)^T$.

A stationary 3-D point is observed at two instances of time, which moves in space relative to the camera from X to X', resulting in two images x and x'.

$$X = \begin{bmatrix} X \\ Z \end{bmatrix} \text{ and } X' = \begin{bmatrix} X' \\ Z' \end{bmatrix} = \begin{bmatrix} X - \Delta X \\ Z - \Delta Z \end{bmatrix} \quad (17)$$

Using the inverse perspective (8) transformation yields $$Z = \frac{f}{x} X \text{ and} \quad (18)$$

$$Z' = Z - \Delta Z = \frac{f}{x'} X' = \frac{f}{x'} (X - \Delta X).$$

From similar triangles (shaded in FIG. 7)

$$\frac{\Delta X}{x_f} = \frac{\Delta Z}{f}, \quad (19)$$

and therefore $$Z = \Delta Z \frac{x' - x_f}{x' - x} = \Delta Z \left[ 1 + \frac{x - x_f}{x' - x} \right]. \quad (20)$$

Thus, the rate of expansion of image points from the FOE contains direct information about the distance of the corresponding 3-D points from the camera. Consequently, if the vehicle is moving along a straight line and the FOE has been located, the 3-D structure of the scene can be determined from the expansion pattern in the image. However, the distance Z of a 3-D point from the camera can only be obtained up to the scale factor $\Delta Z$, which is the distance that the vehicle advanced along the Z-axis during the elapsed time.

When the velocity of the vehicle ($\Delta Z /t$) in space is known, the absolute range of any stationary point can be computed. Alternatively, the velocity of the vehicle can be obtained if the actual range of a point in the scene is known (e.g., from laser range data). In practice, of course, any such technique requires that the FOE can be located in a small area, and the observed image points exhibit significant expansion away from the FOE. As shown below, imaging noise and camera distortion pose problems in the attempt to assure that both of the above requirements are met.

If a set of stationary 3-D points $\{(X_i, X_i')\}$ is observed, then of course the translation in the Z-direction is the same for every point.

$$Z_i - Z'_i = Z_j - Z'_j = \Delta Z \text{ for all } i,j. \quad (21)$$

Therefore, the range of every point is proportional to the observed amount of expansion of its image away from the FOE $$Z_i = \alpha \frac{x'_i - x_f}{x'_i - x_i}, \quad (22)$$

which renders the relative 3-D structure of the set of points.

The effects of camera translation T can be formulated as a mapping t of a set of image locations $\{x_i\}$ into another set of image locations $\{x'_i\}$. Unlike in the case of pure camera rotation, this mapping not only depends upon the 3-D translation vector but also upon the actual 3-D location of each individual point observed. Therefore, in general, t is not simply a mapping of the image onto itself. However, one important property of t can be described exclusively in image plane 128, namely that each point must map onto a straight line passing through the original point and one unique location in the image (the FOE). This means that if vehicle 132 is undergoing pure translation, then there must exist an image location $x_f$ such that the mapping t satisfies the condition radial-mapping t ($x_f$, I, I'):

$$t = \{(x_i, x'_i) \epsilon I x I' | x'_i = x_i + \mu_i(x_i - x_f), \quad (23)$$

$$\mu_i \epsilon R, \mu_i \geq 0\}.$$

Figure 8B:
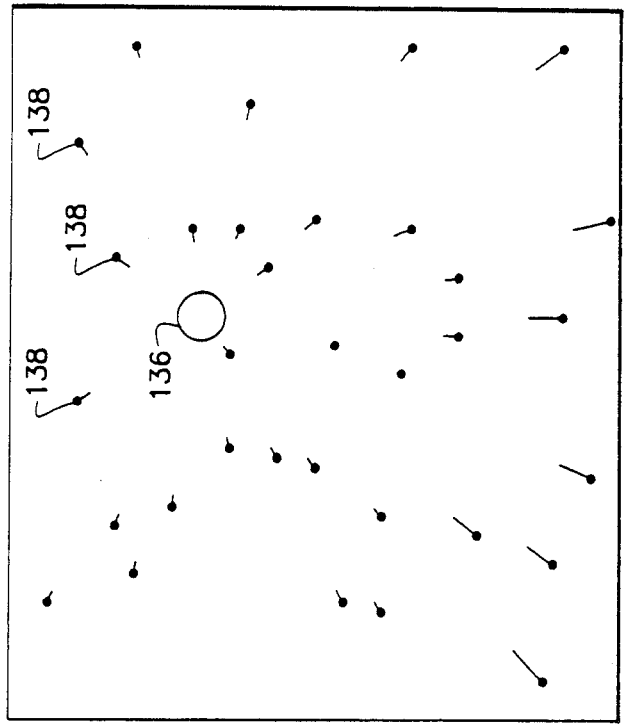
FIGS. 8a and 8b display a displacement field caused by horizontal and vertical rotation and translation of the camera and a derotated displacement field, respectively.
Figure 8A:
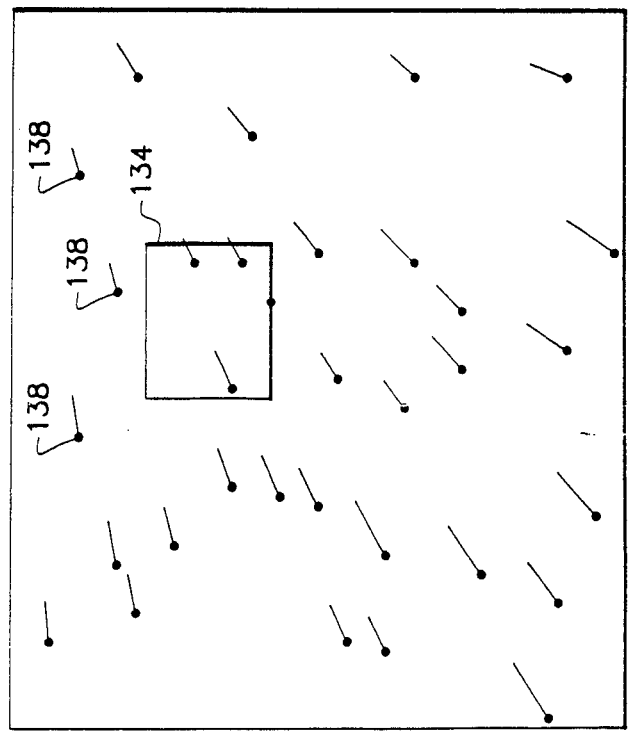

When the vehicle is not undergoing pure translation or rotation but combined 3-D motion (i.e., translation and rotation) of the form $R_\phi R_\theta T$, the effects in the image are described by a transformation d (for displacement) which is a combination f $r_\phi r_\theta$ and t:

$$d: I \rightarrow I' = r_{100} \, r_\theta t \, (I), \quad (24)$$

wherein $I = \{x_i\}$, $I' = \{x'_i\}$ are the two sets of corresponding image points. FIG. 8a and 8b show a typical displacement field for a camera undergoing horizontal and vertical rotation as well as translation. The points $x_i \epsilon$ I are marked with small circles 138. Rectangle 134 marks the area of search for the FOE. The derotated displacement is illustrated in FIG. 8b with the FOE marked by circle 136.

By decomposing a composite displacement field d into its three components $r_\phi$, $r_\theta$, and t, the vehicle's rotation and direction of translation in space can be computed from the information available in the image. This problem is addressed below. As discussed in the previous section, the 3-D motion M of the vehicle is modeled by a translation T followed by a rotation $R_\theta$ about the Y-axis and a rotation $R_\phi$ about the X-axis:

$$M = R_\phi R_\theta T. \quad (25)$$

This results in a mapping d from the original image $I_O$ at time $T_0$ into the new image $I_1$ at time $t_1$.

$$D: I_0 \rightarrow I_1 = r_\phi r_\theta I_0 = r_{100} \, r_\theta I'_0 \quad (26)$$

The intermediate image $I'_0$ (26) is the result of the translation component of the vehicle's motion and has the property of being a radial mapping (23). Unlike the two images $I_0$ and $I_1$, which are actually given, the image $I'_0$ is generally not observed, except when the camera rotation is zero. It serves as an intermediate result to be reached during the separation of translational and rotational motion components.

The question at this point is whether there exists more than one combination of rotation mappings $r_\phi$ and $r_\theta$ which would satisfy this requirement, i.e., if the solution is unique. It has been pointed out above that the decomposition of 3-D motion into $R_\phi$, $R_\theta$, $R_\psi$, and t is unique for a fixed order of application. This does not imply, however, that the effects of 3-D motion upon the perspective image are unique as well.

Related art has shown that seven points in two perspective views sufficient to obtain a unique interpretation in terms of rigid body motion and structure, except for a few cases where points are arranged in some very special configuration in space. Further art reports computer experiments which suggest that six points are sufficient in many cases and seven or eight points yield unique interpretations in most cases.

Due to its design and the application, however, the motion of a typical autonomous land vehicle (ALV) in space is quite restricted. The vehicle can only travel upright on a surface and its large wheelbase allows for only relatively small changes in orientation. It is also heavy and thus exhibits considerable inertia. Therefore, the final motion parameters must lie within a certain narrow range and it can be expected that a unique solution can be found even in cases when the number of points is near or above the minimum.

The fact that $$I'_0 = r_\theta^{-1} r_\phi^{-1} I_1 = tI_0 \qquad (27)$$

suggests two different strategies for separating the motion components: (1) FOE from rotation—40 successively apply combinations of inverse rotation mappings $$r_{\theta 1}^{-1} r_{\phi 1}^{-1}, r_{\theta 2}^{-1} r_{\phi 2}^{-1}, r_{\theta k}^{-1} r_{\phi k}^{-1}$$

to the second image $I_1$, until the resulting image $I'$ is a radial mapping with respect to the original image $I_0$. The locate the FOE $x_{fk}$ in $I_0$ and (2) rotation from FOE —successively select FOE—locations (different directions of vehicle translation) $X_{f1}, X_{f2}, \ldots X_{fl}$ in the original image $I_0$ and then determine the inverse rotation mapping $r_{\theta 1}^{-1} r_{\phi 1}^{-1}$ that yields a radial mapping with respect to the given FOE $x_{fl}$ in the original image $I_0$.

Both alternatives were investigated under the assumption of restricted, but realistic vehicle motion, as stated earlier. It turned out that the major problem in the FOE-from-rotation approach is to determine if a mapping of image prints is (or is close to being) radial when the location of the FOE is unknown. Of course, in the presence of noise, this problem becomes even more difficult. The second approach was examined after it appeared that any method which extends the given set of displacement vectors backwards to find the FOE is inherently sensitive to image degradations.

Although there have been a number of suggestions for FOE-algorithms in the past, no results of implementations have been demonsstrated on real outdoor imagery. One reason for the absence of useful results might be that most researchers have tried to locate the FOE in terms of a single, distinct image location. In practice, however, the noise generated by merely digitizing a perfect translation displacement field may keep the resulting vectors from passing through a single pixel. Even for human observers it seems to be difficult to determine the exact direction of heading (i.e., the location of the FOE on the retina). Average deviation of human judgement from the real direction has been reported to be as large as 10° and up to 20° in the presence of large rotations. It was, therefore, an important premise in this work that the final algorithm should determine an area of potential FOE-locations (called the "fuzzy FOE") instead of a single (but probably incorrect) point.

The FOE may be obtained from rotation. In this method, the image motion is decomposed in two steps. First, the rotational components are estimated and their inverses are applied to the image, thus partially "derotating" the image. If the rotation estimate was accurate, the resulting displacement field after derotation would diverge from a single image location (the FOE). The second step verifies that the displacement field is actually radial and determines the location of the FOE. For this purpose, two problems have to be solved: (1) how to estimate the rotational motion components without knowing the exact location of the FOE, and (2) how to measure the "goodness of derotation" and locate the FOE.

The rotational components can be estimated. Each vector in the displacement field is the sum of vector components caused by camera rotation and camera translation. Since the displacement caused by translation depends on the depth of the corresponding points in 3-D space (equation 18), points located at a large distance from the camera are not significantly affected by camera translation. Therefore, one way of estimating vehicle rotation is to compute $\theta$ and $\phi$ from displacement vectors which are known to belong to points at far distance. Under the assumption that those displacement vectors are only caused by rotation, equations 14 and 15 can be applied to find the two angles. In some situations, distant points are selected easily. For example, points on the horizon are often located at a sufficient distance from the vehicle. Image points close to the axis of translation would be preferred because they expand from the FOE slower than other points at the same depth. However, points at far distances may not always be available or may not be known to exist in the image. In those cases, the following method for estimating the rotational components can be used. The design of the ALV (and most other mobile robots) does not allow rapid changes in the direction of vehicle heading. Therefore, it can be assumed that the motion of the camera between two frames is constrained, such that the FOE can change its location only within a certain range. If the FOE was located in one frame, the FOE in the subsequent frame must lie in a certain image region around the previous FOE location. FIG. 9a shows an image plane which illustrates this situation. The FOE of the previous frame was located at the center of square 140 which outlines the region of search for the current FOE, thus the FOE in the given frame must be inside square 140. Three displacement vectors are shown P1→P1', P2→P2', P3→P3'). The translational components (P1→Q1,P2→Q2, P3→Q3) of those displacement vectors and the FOE (inside square 140) are not known at this point in time but are marked in FIG. 9a.

The main idea of this technique is to determine the possible range of camera rotations which would be consistent with the FOE lying inside marked region 140. Since the camera rotates about two axes, the resulting range of rotations can be described as a region in a 2-D space. FIG. 9b shows this rotation space with the two axes $\theta$ and $\phi$ corresponding to the amount of camera rotation around the Y-axis and the X-axis, respectively. The initial rotation estimate is a range of ±10° in both directions which is indicated by a square 142 in rotation space of FIG. 9b.

Figure 10A:
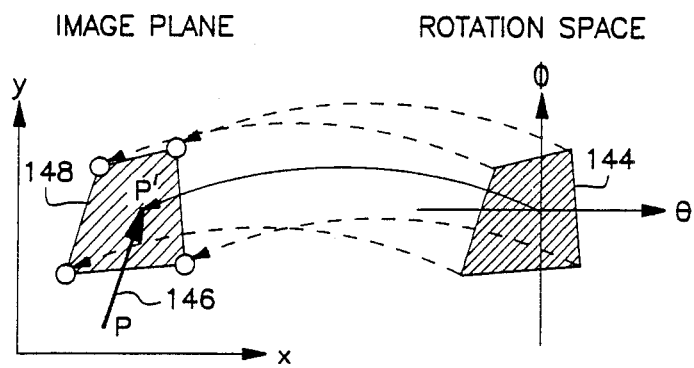
FIGS. 10a and 10b show mappings of a polygon from rotation space to an image plane and vice versa, respectively.
Figure 10B:
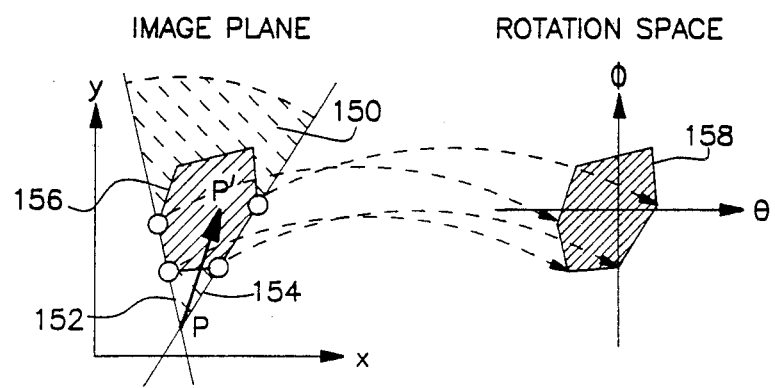

In general, the range of possible rotations is described by a closed, convex polygon in rotation space. A particular rotation ($\theta'$, $\phi'$) is possible if its application to every displacement vector (i.e., to its endpoint) yields a new vector which lies on a straight line passing through the maximal FOE-region. The region of possible rotations is successively constrained by applying the following steps for every displacement vector (FIG. 10a and 10b). First apply the rotation mapping defined by the vertices of the rotation polygon to the endpoint P' of the displacement vector P→P' 146. This yields a set of image points $P_i$. Second, connect the points $P_i$ to a closed polygon 148 in the image. Polygon 148 is similar to the rotation polygon 144 but distorted by the nonlinear rotation mapping as shown in FIG. 10a. Third, intersect polygon 146 in the image with open triangle 150 formed by the starting point P of the displacement vector 146 and defined by two tangents 152 and 154 onto the maximal FOE-region. Rotations that would bring the endpoint of the displacement vector outside triangle 150 are not feasible. The result is a new (possibly empty) polygon 156 in the image plane. Fourth, new polygon 156 from the image plane back into the rotation space of FIG. 9b. Fifth, rotation polygon 158 is empty (number of vertices is zero), then stop. No camera rotation is possible that would make all displacement vectors intersect the given FOE-region. Repeat the process using a larger FOE-region.

Figures 11E, 11F:
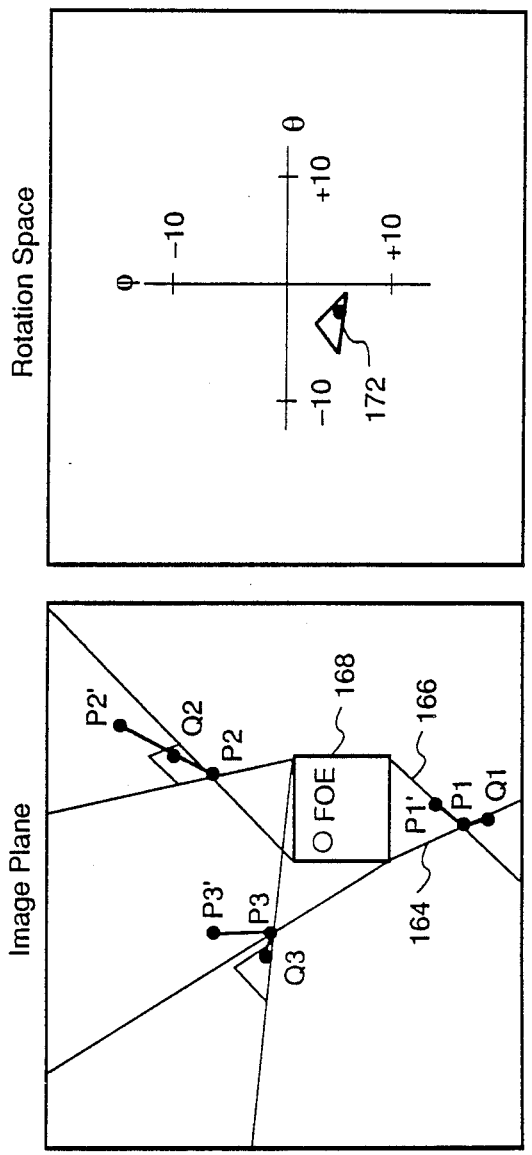

FIGS. 11a, 11b and 11c show the changing shape of the rotation polygon during the application of this process to the three displacement vectors in FIG. 8.

Since the mapping from rotation space to the image plane is nonlinear (equation 9), the straight lines between vertices in the rotation polygon 160 do not correspond to straight lines in the image. They are, however, approximated as straight lines in order to simplify the intersection with the open triangle. The dotted lines in the image plane show the actual mapping of the rotation polygon onto the image. It can be seen that the deviations from straight lines are small and can be neglected. FIG. 11a shows rotation polygon after examining displacement vector P1→P1'. Any camera rotation inside the polygon would move the endpoint of the displacement vector (P1') into the open triangle formed by targets 164 and 166 through P1 to the maximal FOE-region given by square 68 in the image plane. The actual mapping of the rotation polygon into the image plane is shown with a dotted outline.

FIG. 11b reveals the rotation polygon 170 after examining displacement vectors P1→P1' and P2→P2'.

FIG. 11(c) shows the final rotation polygon after examining the three displacement vectors P1→P1', P2→P2' and P3→P3'. The amount of actual camera rotation ($\theta = -2.0°$, $\phi = 5.0°$) is marked with a small circle (arrow) 172.

Increasing the number of displacement vectors improves the rotation estimate. In practice, the amount of camera rotation can be constrained to a range of below 1° in both directions. Rotation can be estimated more accurately when the displacement vectors are short, i.e., when the amount of camera translation is small. This is in contrast to estimating camera translation which is easier with long displacement vectors.

The situation when the rotation polygon becomes empty requires some additional considerations. As mentioned earlier, in such a case no camera rotation is possible that would make all displacement vectors pass through the given FOE-region. This could indicate one of the two alternatives. First, at least one of the displacement vectors belongs to a moving object. Second, the given FOE-region does not contain the actual location of the FOE, i.e., the region is not feasible. The latter case is of particular importance. If a region can be determined not to contain the FOE, then the FOE must necessarily lie outside this region. Therefore, the above method can not only be used to estimate the amount of camera rotation, but also to search for the location of the FOE. Unfortunately, if the rotation polygon does not become empty, this does not imply that the FOE is actually inside the given region. It only means that all displacement vectors would pass through this region, not that they have a common intersection inside this region. However, if not all vectors pass through a certain region, then this region cannot possibly contain the FOE. The following recursive algorithm searches a given region for the FOE by splitting it into smaller pieces (divide-and-conquer):

---

MIN-FEASIBLE (region, min-size, disp-vectors):
if SIZE (region) < min-size then return (region)
else
if FEASIBLE (region, disp-vectors) then
return (union)
MIN-FEASIBLE (sub-region-1, min-size, disp-vectors),
MIN-FEASIBLE (sub-region-2, min-size, disp-vectors),
....
MIN-FEASIBLE (sub-region-n, min-size, disp-vectors)))
else return (nil) {region does not contain the FOE}

---

This algorithm searches for the smallest feasible FOE-region by systematically discarding sub regions from further consideration. For the case that the shape of the original region is a square, subregions can be obtained by splitting the region into four subsquares of equal size. The simple version shown here performs a depth-first search down to the smallest subregion (limited by the parameter "min-size"), which is neither the most elegant nor the most efficient approach. The algorithm can be significantly improved by applying a more sophisticated strategy, for example, by trying to discard subregions around the perimeter first before examining the interior of a region. Two major problems were encountered with the latter method. First, the algorithm is computationally expensive since the process of computing feasible rotations must be repeated for every subregion. Second, a small region is more likely to be discarded than a larger one. However, when the size of the region becomes too small, errors induced by noise, distortion or point-tracking may prohibit displacement vectors from passing though a region which actually contains the FOE.

Although this algorithm is not employed in the further treatment, it suggests an interesting alternative which departs significantly from traditional FOE-algorithms. Its main attractiveness is that it is inherently region-oriented in contrast to most other techniques which search for a single FOE-location. For the purpose of estimating the amount of rotation, the method using points at far distance mentioned earlier is probably more practical. Two other alternatives for locating the FOE once the rotation components have been estimated are discussed in the following.

Figure 12:
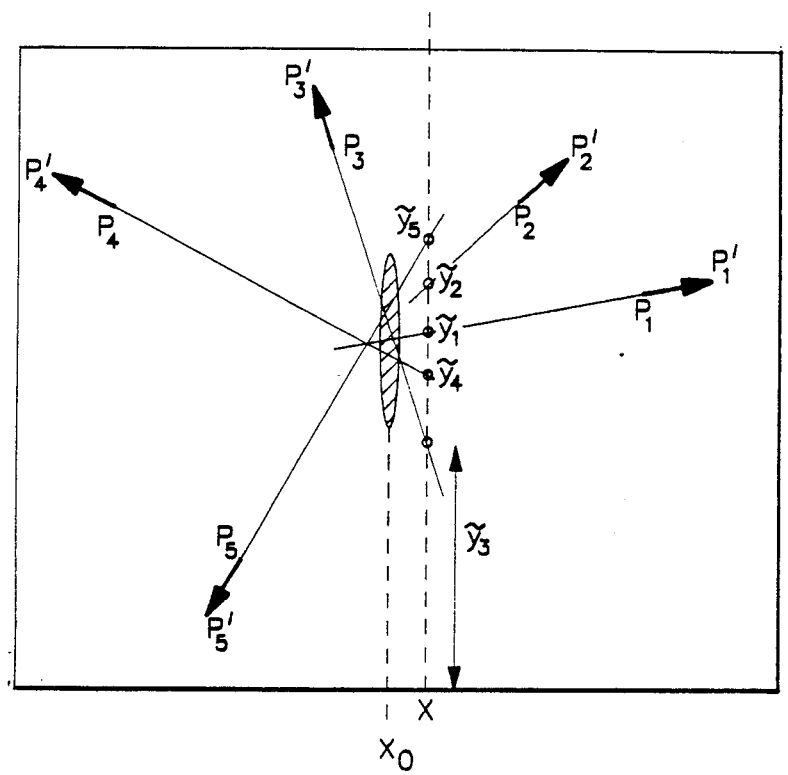
FIG. 12 illustrates an intersection of displacement vectors with a vertical line which, if moved, changes the variance of intersection.

Locating the FOE in a partially derotated image may be attempted. After applying a particular derotation mapping to the displacement field, the question is how close the new displacement field is to a radial mapping, where all vectors diverge from one image location. If the displacement field is really radial, then the image is completely derotated and only the components due to camera translation remain. Two different methods for measuring this property are noted. One method used the variance of intersection at imaginary horizontal and vertical lines. The second method computes the linear correlation coefficient to measure how "radial" the displacement field is. The variance of intersection in related art suggests to estimate the disturbance of the displacement field by computing the variance of intersections of one displacement vector with all other vectors. If the intersections lie in a small neighborhood, then the variance is small, which indicates that the displacement field is almost radial. The problem can be simplified by using an imaginary horizontal and vertical line instead, whose orientation is not affected by different camera rotations. FIG. 12 shows 5 displacement vectors $P_1 \rightarrow P' \ldots P_5'$ intersecting a vertical line at x at $y_1 \ldots Y_5$. Moving the vertical line from x towards $x_0$ will bring the points of intersection closer together and will thus result in a smaller variance of intersection. The point of intersection of a displacement vector $P_i \rightarrow P_i'$ with a vertical line at x is given by $$\widetilde{y_i} = \frac{x_i y'_i - y_i x'_i}{x_i - x'_i} \qquad (28)$$

The variance of intersection of all displacement vectors with the vertical line at position x is $$\sigma^2(x) = \frac{1}{N}\left[\sum_{i,x_i \neq x'_i} \widetilde{y}^2_i - \frac{1}{N}\left[\sum_{i,x_i \neq x'_i} \widetilde{y_i}\right]^2\right]. \qquad (29)$$

To find the vertical cross section with minimum intersection variance, the first derivative of (29) with respect to x is set to zero. The location $x_0$ of minimum intersection variance is then obtained. Similarly, the position of a horizontal cross section with minimal intersection variance can be obtained.

Figure 13:
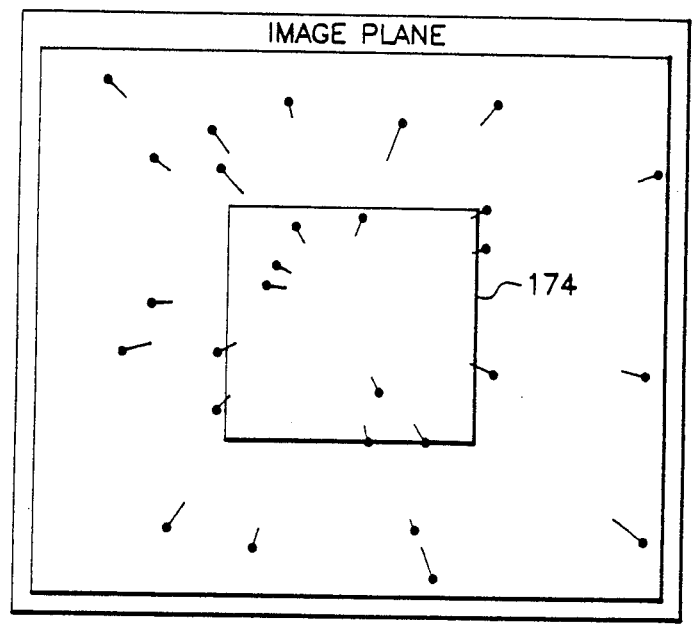
FIG. 13 shows a displacement field used to evaluate various error functions.

The square root of the variance of intersection (standard deviation) at a vertical line was evaluated on the synthetic displacement field shown in FIG. 13. The actual FOE is located in the center of the image. Square 174 around the center ($\pm 100$ pixels in both directions) marks the region over which the error functions are evaluated.

FIGS. 14a, b, c and d show the distribution of the intersection standard deviation for increasing residual rotations in vertical direction in the absence of noise. The horizontal rotation is 1° in all cases represented by these Figures. Locations of displacement vectors are presented by real numbers (not rounded to integer values). In FIG. 14a, no residual rotation exists, i.e., the displacement field is perfectly radial. The value of the horizontal position of the cross section varies $\pm 100$ pixels around the actual FOE. The standard deviation is zero for $x=x_f$ (the x-coordinate of the FOE) and increases linearly on both sides of the FOE. In FIGS. 14b-d, the residual vertical rotation is increased from 0.2° to 1.0°. The bold vertical bar marks the horizonal position of minimum standard deviation, the thin bar marks the location of the FOE ($X_f$). It can be seen that the amount of minimum standard deviation rises with increasing disturbance by rotation, but that the location of minimum standard deviation does not necessarily move away from the FOE.

FIGS. 15-17 show the same function under the influence of noise. In FIG. 15a-d, noise was applied except that by merely rounding the locations of displacement vectors to their nearest integer values. These Figures show standard deviation of intersection (square root) at a vertical cross section at position x for different amounts of vertical rotation with no horizontal rotation. Uniform noise of $\pm 1$ pixels was added to the image locations in FIGS. 16a-d. In FIGS. 17a-d, uniform noise of $\pm 2$ pixels was applied to the image locations. It can be seen that the effects of noise are similar to the effects caused by residual rotation components. The purpose of this error function is to determine where the FOE is located, and how "radial" the current displacement field is.

If the displacement field is already perfectly derotated, then the location of minimum intersection standard deviation is the location of the FOE. Ideally, all vectors pass through the FOE, such that a cross section through the FOE yields zero standard deviation. The question is how well the FOE can be located in an image which is not perfectly derotated. FIG. 18a-d plot the location of minimum intersection standard deviation under varying horizontal rotation. The vertical rotation is kept fixed for each plot. Horizontal camera rotations from $-1°$ to $+1°$ are shown on the abscissa (rot). The ordinate (x0) gives the location of minimum standard deviation in the range of $\pm 100$ pixels around the FOE (marked xf). The location of minimum standard deviation depends strongly on the amount of horizontal rotation.

A problem is that the location of minimum standard deviation is not necessarily closer to the FOE when the amount of rotation is less. The function is only well behaved in a narrow range around zero rotation, which means that the estimate of the camera rotation must be very accurate to successfully locate the FOE. The second purpose of this error function is to measure how "radial" the displacement field is after partial derotation. This should be possible by computing the amount of minimum intersection standard deviation. Intuitively, a smaller amount of minimum intersection standard deviation should indicate that the displacement field is less disturbed by rotation. FIGS. 19a-d and 20a-d show that this is generally true by showing the amount of minimum intersection standard deviation under varying horizontal rotation. For the noise-free case in FIG. 19a, the amount of minimum intersection standard deviation becomes zero in the absence of horizontal and vertical rotations, indicating that the derotation is perfect. Unfortunately, the function is not well behaved even in this relatively small range of rotations ($\pm 1.0°$). The curve exhibits some sharp local minima where an algorithm searching of an optimal derotation would get trapped easily. FIGS. 19a-d show the same function in the presence of $\pm 2$ pixels of uniform noise added to image locations.

The second method, utilizing linear correlation, of measuring how close a displacement field is to a radial pattern again uses the points $y_{11}-y_{15}$ and $y_{21}-y_{25}$ of intersection at vertical (or horizontal) lines $x_1$ and $x_2$ as illustrated in FIG. 21. The displacement vectors $P_1 \rightarrow P'_1$ through $P_5 \rightarrow P'_5$ are intersected by two vertical lines $X_1$ and $X_2$, both of which lie on the same side of the FOE that is within area 176. Since the location of the FOE is not known, the two lines $X_1$ and $X_2$ are simply located at a sufficient distance from any possible FOE-location. This results in two sets of intersection points $\{(x_1, y_{1i})\}$ and $\{(x_2, y_{2i})\}$. If all displacement vectors emanate from one single image location, then the distances between corresponding intersection points in the two sets must be proportional, i.e, $$\frac{y_{1i} - y_{1j}}{y_{2i} - y_{2j}} = \frac{y_{1j} - y_{1k}}{y_{2j} - y_{2k}} \text{ for all } i,j,k. \qquad (30)$$

Therefore, a linear relationship exists between the vertical coordinates of intersection points on these two lines.

The "goodness" of this linear relationship is easily measured by computing the correlation coefficient for the y-coordinates of the two sets of points. The resulting coefficient is a real number in the range from $-1.0$ to $+1.0$. If both vertical lines are on the same side of the FOE, then the optimal value is $+1.0$. Otherwise, if the FOE lies between the two lines, the optimal coefficient is $-1.0$. The horizontal position of the two vertical lines is of no importance, as long as one of these conditions is satisfied. For example, the left and right border lines of the image can be used.

FIGS. 22a–d and 23a–d show plots for the correlation coefficient for intersection of displacement vectors at two vertical lines under varying horizontal rotations, under the same conditions as in FIGS. 19a–d and 20a–d. No noise was applied for FIG. 22a–d. In FIGS. 23a–d, a uniform noise of $\pm 2$ pixels was added to the image locations. The optimal coefficient is $+1.0$ (horizontal axis) in FIGS. 22a–d. The shapes of the curves of FIGS. 22a–d and 23a–d are similar, respectively, to FIGS. 19a–d and 20a–d for the minimum standard deviations shown above earlier, with peaks at the same locations. It is apparent, however, that each curve has several locations where the coefficient is close to the optimum value ($+1.0$), i.e., no distinct global optimum exists which is not only the case in the presence of noise (FIGS. 23a–d). This fact makes the method of maximizing the correlation coefficient useless for computing the FOE.

The main problem encountered in computing the FOE from rotation, just described above, is that none of the functions examined was well behaved, making the search for an optimal derotation and the location of the FOE difficult. Disturbances induced by noise and residual rotation components are amplified by extending short displacement to straight lines and computing their intersections. The method, rotation from FOE, described below avoids this problem by guessing an FOE-location first and estimating the optimal derotation for this particular FOE in the second step.

Given the two images $I_0$ and $I_1$ of corresponding points, the main algorithmic steps of this approach are: (1) Guess an FOE-location $x_f^{(i)}$ in image $I_0$ (for the current iteration i); (2) Determine the derotation mapping $r_\theta^{-1}$, $r_\phi^{-1}$ which would transform image $I_1$ into an image $I'_1$ such that the mapping $(x_f^{(i)}, I_0, I'_1)$ deviates from a radial mapping (equation 23) with minimum error $E^{(i)}$; and (3) Repeat steps (1) and (2) until an FOE-location $x_f^{(k)}$ with the lowest minimum error $E^{(k)}$ is found.

An initial guess for the FOE-location is obtained from knowledge about the orientation of the camera with respect to the vehicle. For subsequent pairs of frames, the FOE-location computed from the previous pair can be used as a starting point.

Once a particular $x_f$ has been selected, the problem is to compute the rotation mappings $r_\theta^{-1}$ and $r_\phi^{-1}$ which, when applied to the image $I_1$, will result in an optimal radial mapping with respect to $I_0$ and $x_f$.

Figure 24:
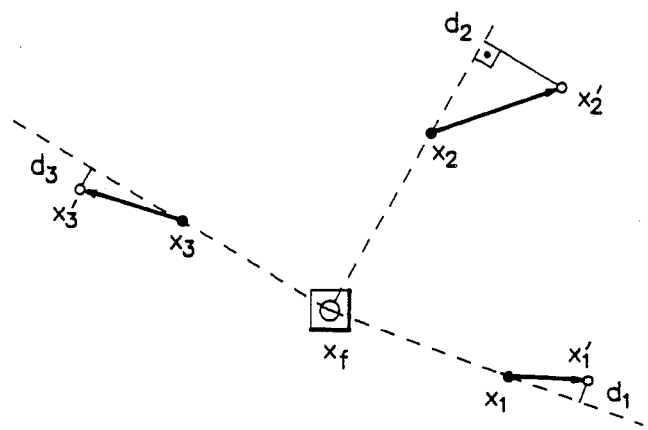
FIG. 24 illustrates displacement vectors and measurement of their error.

To measure how close a given mapping is to a radial mapping, the perpendicular distances between points in the second image ($x'_i$) and the "ideal" displacement vectors is measured. The "ideal" displacement vectors line on straight lines passing through the the FOE $x_f$ and the points in the first image $x_i$ (see FIG. 24) which illustrates measuring the perpendicular distance $d_i$ between lines from $x_f$ through points $x_i$ in the second image. The sum of the squared perpendicular distances $d_i$ is the final error measure. For each set of corresponding image points ($x_i \in I$, $x'_i \in I'$), the error measure is defined as $$E(x_f) = \sum_i E_i = \sum_i d^2_i = \sum_i \left[ \frac{1}{|x_{fx_i}|} x_{fx_i} \times x_{fx'_i} \right]^2. \quad (31)$$

In the following, it is assumed that the amount of residual image rotation in horizontal and vertical direction is moderately small (less than 4°). In most practical cases, this condition is satisfied, provided that the time interval between frames is sufficiently small. However, should the amount of vehicle rotation be very large for some reason, a coarse estimate of the actual rotation can be found (as described above) and applied to the image before the FOE computation. With small amounts of rotation, the actual rotation mapping, where points move on horizontal and vertical hyperbolic paths, can be approximated by a horizontal and vertical shift with constant length over the entire image. Under this condition, the inverse rotation mapping $r_\phi^{-1}$, $r_\theta^{-1}$ can be approximated by a adding a constant vector $s=(s_x,s_y)$ which is independent of the image location:

$$I_1 = r_\theta^{-1} r_\phi^{-1} I_1 \approx S + I_1. \quad (32)$$

Given two images I and I' the error measure (equation 31) becomes $$E(x_f,s) = \sum_i \left[ \frac{1}{|x_{fx'_i}|^2} [x_{fx_i} \times (x_{fx'_i} + s)]^2 \right] \quad (33)$$

where $x_i \in I$ and $x'_i \in I$. For a given FOE-location $x_f$, the problem is to minimize E with respect to the two unknowns $s_x$ and $s_y$. To reduce this problem to a one-dimensional search, one point $x_g$, called the "guiding point", is selected in image I which is forced to maintain zero error (see FIG. 25) wherein one vector $x_g$ is selected from the set of displacement vectors to determine the optimum 2-D shift to be applied to points $x'_i$, given a FOE-location $x_f$. First $x'_g$ is forced onto the line $x_fx_g$ and then the entire image $I'=\{x'_1, x'_2, \ldots\}$ is translated in the direction of this line until the error value reaches a minimum. Therefore, the corresponding point $x'_g$ must lie on a straight line passing through $x_f$ and $x_g$. Any shift s applied to the image I' must keep $x'_g$ on this straight line, so $$x'_g + s = x_f + \lambda(x_g - x_f) \text{ for all } s, \quad (34a)$$

for all s, and thus, $$s = x_f - x_{g'} + \lambda(x_g - x_f) \quad (\lambda \in R). \quad (34b)$$

For $\lambda=1$, $s=x_g-x'_g$, which is the vector $x'_g \rightarrow x_g$. This means that the image I' is shifted such that $x_g$ and $x'_g$ overlap. This leaves $\lambda$ as the only free variable and the error function (equation 33) is obtained as $$E(\lambda) = \sum_i [\lambda A_i + B_i - C_i]^2 \quad (35)$$

$$l_{if} = \sqrt{(x_i - x_f)^2 + (y_i - y_f)^2}$$

$$A_i = \frac{1}{l_{if}} (y_i - y_f)(x_g - x_f) - (x_i - x_f)(y_g - y_f)$$

-continued $$B_i = \frac{1}{l_{if}} (y_i - y_f)(x'_i - x'_g)$$

$$C_i = \frac{1}{l_{if}} (x_i - x_f)(y'_i - y'_g).$$

Differentiating equation 35 with respect to $\lambda$ and forcing the resulting equation to zero yields the parameter for the optimal shift $s_{opt}$ as $$\lambda_{opt} = \frac{\Sigma A_i C_i - \Sigma A_i B}{\Sigma A^2_i} \quad (36)$$

The optimal shift $s_{opt}$ and the resulting minimum error $\Sigma(\lambda_{opt})$ for the given FOE-location $x_f$ is obtained by inserting $\lambda_{opt}$ into equations (34b) and (35) respectively, giving $$E_{min}(x_f) = \lambda^2_{opt}\Sigma A^2_1 + 2\lambda_{opt}[\Sigma A_i B_i - \Sigma A_i C_i] - 2\Sigma B_i C_i + \Sigma B^2_i + \Sigma C^2_i \quad (37)$$

The normalized error $E_n$ shown in the following results (shown in FIGS. 27-32) is defined as $$E_m(x_f) = \sqrt{\frac{1}{N} E_{min}(x_f)} \quad (38)$$

where N is the number of displacement vectors used for computing the FOE.

Figure 25:
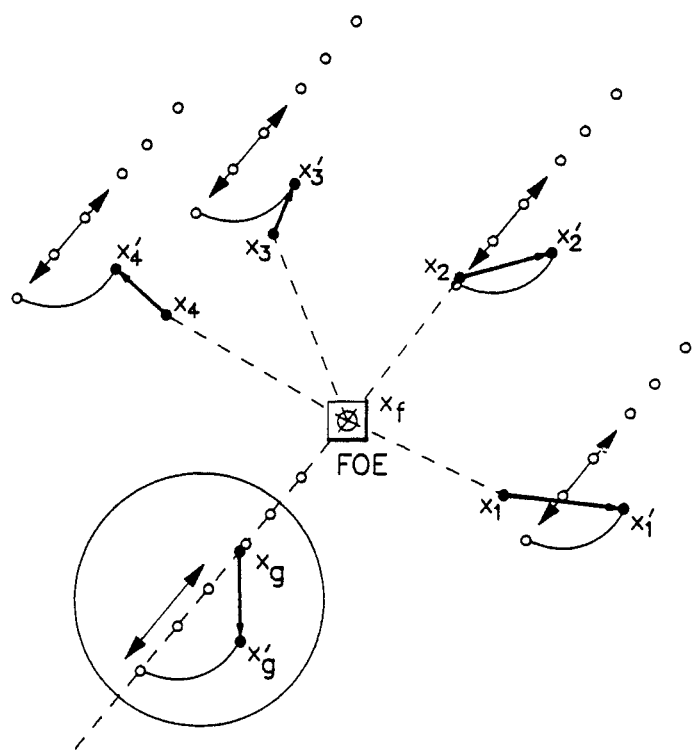
FIG. 25 shows how to determine the optimum two-dimensional shift for a set of displacement vectors.
Figure 26:
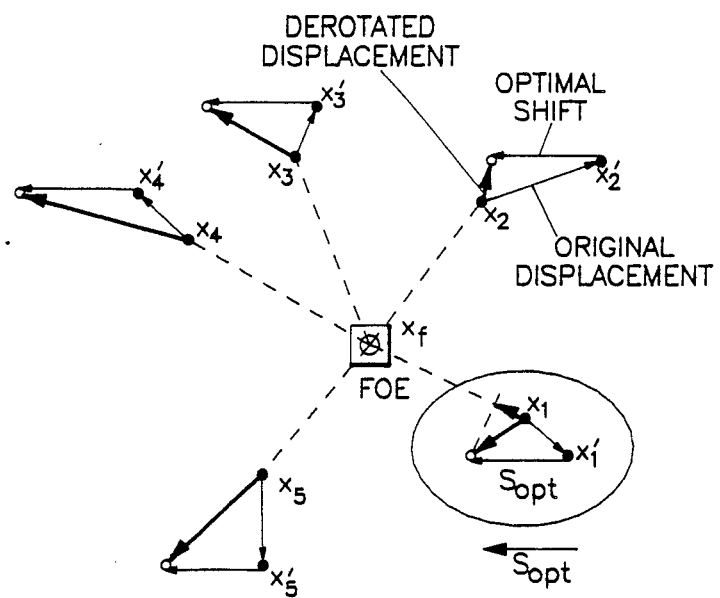
FIG. 26 reveals how FOE locations are dismissed if the displacement field resulting from the application of the optimal shift results in a vector not pointing away from the FOE.

Since in a displacement field caused by pure camera translation all vectors must point away from the FOE, this restriction must hold for any candidate FOE-location (as illustrated in FIG. 25). If after applying $s_{opt}(x_f)$ to the second image I', the resulting displacement field contains vectors pointing towards the hypothesized $x_f$, then this FOE-location is prohibited and can be discarded from further consideration such is the case at point $x_1$ in FIG. 26. FIG. 26 shows a field of 5 displacement vectors. The optimal shift $s_{opt}$ for the given $x_f$ is shown as a vector in the lower right-hand corner. When $s_{opt}$ is applied to point $x'_1$, the resulting displacement vector (shown fat) does not point away from the FOE. Since its projection onto the line $x_f x_1$ points towards the FOE, it is certainly not consistent with a radial expansion pattern.

The final algorithm for determining the direction of heading as well as horizontal and vertical camera rotations is the "find-FOE algorithm" which consists the steps: (1) Guess an initial FOE $x_f^0$, for example the FOE-location obtained from the previous pair of frames; (2) Starting from $x_f^0$, search for a location $x_f^{opt}$ where $E_{min}(x_f^{opt})$ is a minimum. A technique of steepest descent is used, where the search proceeds in the direction of least error; and (3) Determine a region around $x_f^{opt}$ in which the error is below some threshold. The search for this FOE-area is conducted at FOE-locations lying on a grid of fixed width. In the examples shown, the grid spacing is 10 pixels on both x- and y-directions.

The error function $E(x_f)$ is computed in time proportional to the number of displacement vectors N. The final size of the FOE-area depends on the local shape of the error function and can be constrained not to exceed a certain maximum M. Therefore, the time complexity is O(MN).

Figure 27A:
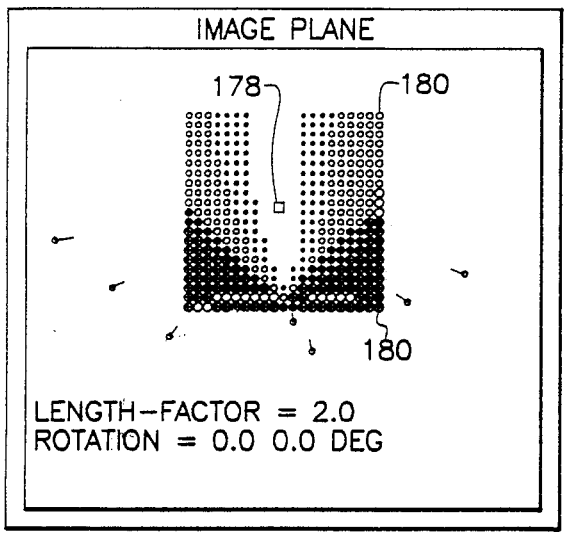
FIGS. 27a-d illustrate the displacement field and minimum error at selected FOE locations.
Figure 27B:
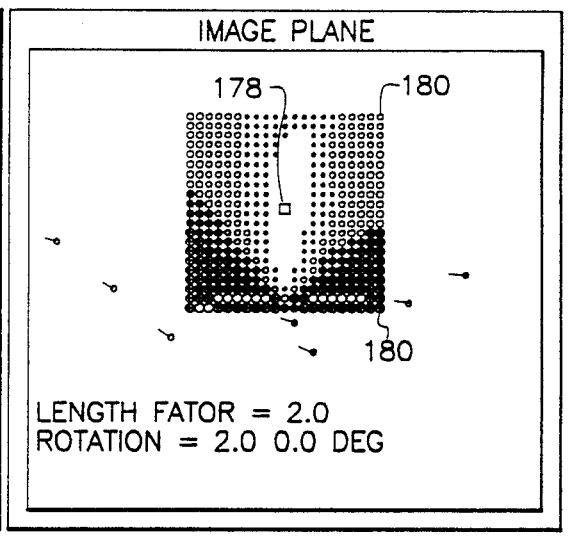
Figure 27C:
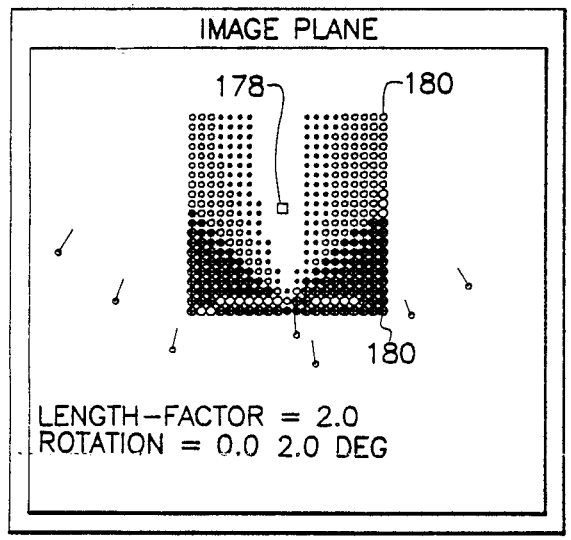
Figure 27D:
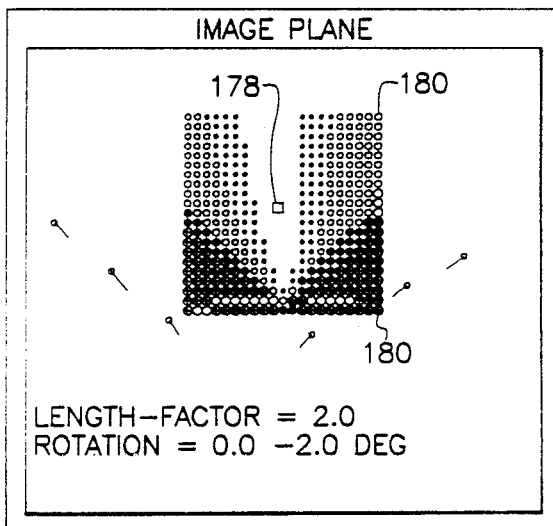

The first set of experiments was conducted on synthetic imagery to investigate the behavior of the error measure under various conditions, namely, the average length of the displacement vectors (longer displacement vectors lead to a more accurate estimate of the FOE), the amount of residual rotation components in the image, and the amount of noise applied to the location of image points. FIGS. 27a-d shows the distribution of the normalized error $E_n(x_f)$ for a sparse and relatively short displacement field containing 7 vectors. Residual rotation components of ±2° in horizontal and vertical direction are present in FIGS. 27b-d to visualize their effects upon the image. This displacement field was used with different average vector lengths (indicated as length-factor) for the other experiments on synthetic data. The displacement vector through the guiding point is marked with a heavy line. The choice of this point is not critical, but it should be located at a considerable distance from the FOE to reduce the effects of noise upon the direction of the vector $x_f x_g$. FIGS. 27a-d, which show displacement field and minimum error at selected FOE-locations, the error function is sampled in a grid with a width of 10 pixels over an area of 200 by 200 pixels around the actual FOE, which is marked by small square 178. At each grid point, the amount of normalized error is (equation 41) indicated by the size of the circle 180. Heavy circles 180 indicate error values which are above a certain threshold. Those FOE-locations that would result in displacement vectors which point towards the FOE (as described above) are marked as prohibited (+). It can be seen that the shape of the 2-D error function changes smoothly with different residual rotations over a wide area and exhibits its minimum close to the actual location of the FOE. FIG. 27a represents no residual rotation, FIG. 27b represents 2.0° of horizontal camera rotation (to the left), FIG. 27c represents 2.0° of vertical rotation (upwards), and FIG. 27d represents −2.0° vertical rotation (downwards).

FIGS. 28 to 33 show the effects of various conditions upon the behavior of this error function in the same 200 by 200 pixel square round the actual FOE as in FIGS. 27a-d.

FIGS. 28a-e show how the shape of the error function depends upon the average length (with length factors varying from 1 to 15) of the displacement vectors in the absence of any residual rotation or noise (except digitization noise). The minimum of the error function becomes more distinct with increasing amounts of displacement. FIGS. 29a-e show the effect of increasing residual rotation in horizontal direction upon the shape of the error function for relatively short vectors (length factor of 2.0) in absence of noise.

FIGS. 30a-e show the effect of residual rotation in vertical direction upon the shape of the error function for short vectors (length factor of 2.0) in absence of noise. Here, it is important to notice that the displacement field used is extremely nonsymmetric along the Y-axis of the image plane. This is motivated by the fact that in real ALV images, long displacement vectors are most likely to be found from points on the ground, which are located in the lower portion of the image. Therefore, positive and negative vertical rotations have been applied in FIGS. 30a-e.

In FIGS. 31a-j, residual rotations in both horizontal and vertical direction, respectively, are present, for short vectors with a length factor of 2.0. In FIGS. 31a-e, the error function is quite robust against rotational components in the image. FIGS. 31f-j show the amounts of optimal linear shift $s_{opt}$ under the same conditions. The result in FIG. 31e shows the effect of large combined rotation of 4.0°/4.0° in both directions. Here, the minimum of the error function is considerably off the actual location of the FOE because of the error induced by using a linear shift to approximate the non-linear derotation mapping. In such a case, it would be necessary to actually derotate the displacement field by the amount of rotation equivalent to $S_{opt}$ found at the minimum of this error function and repeat the process with the derotated displacement.

The effects of various amounts of uniform noise applied to image point coordinates for a constant average vector length of 5.0, are shown in FIGS. 32a–e. For this purpose, a random amount (with uniform distribution) of displacement was added to the original (continuous) image location and then rounded to integer pixel coordinates. Random displacement was applied in ranges from ±0.5 to ±4.0 pixels in both horizontal and vertical direction. The shape of the error function becomes flat around the local minimum of the FOE with increasing levels of the noise. The displacement field contains only 7 vectors. What is observed here is that the absolute minimum error increases with the amount of noise. FIGS. 32a–e thus serve as an indicator for the amount of noise present in the image and the reliability of the final result.

Figure 33B:
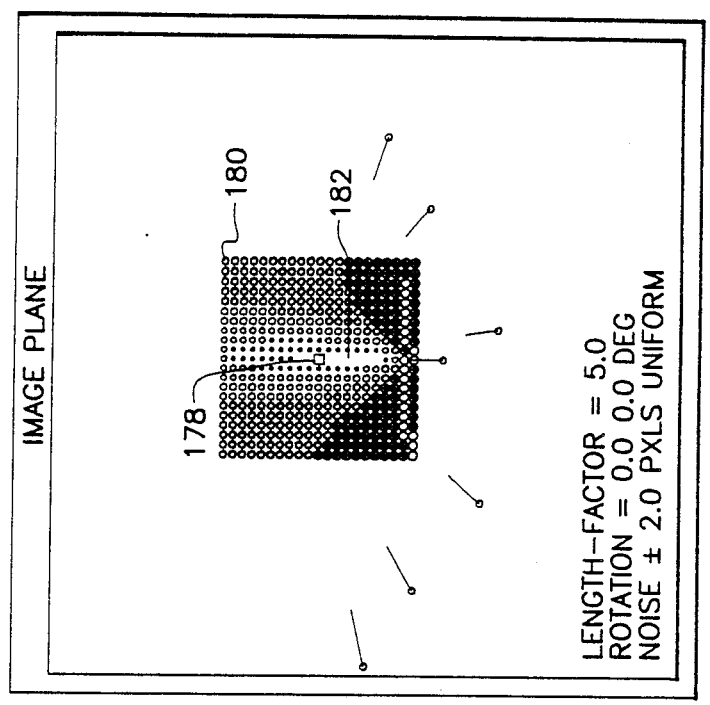
FIGS. 33a and 33b reveal the different effects of uniform noise applied to image point coordinates for shorter and longer average vector lengths, respectively.
Figure 33A:
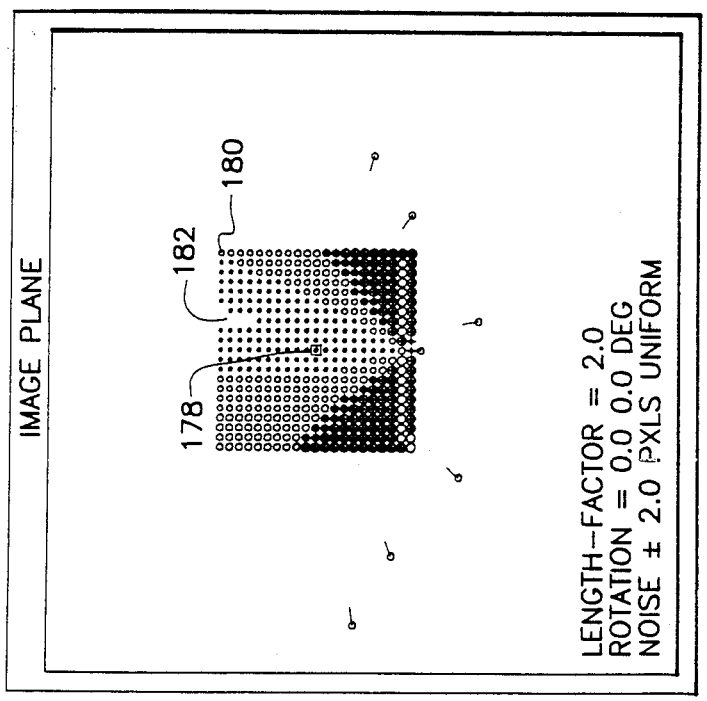

The length of the displacement vectors is an important factor. The shorter the displacement vectors are, the more difficult it is to locate the FOE correctly in the presence of noise. FIGS. 33a and 33b show the error functions for two displacement fields with different average vector lengths (length factor 2.0 and 5.0, respectively). For the shorter displacement field (length-factor 2.0) in FIG. 33, the shape of the error function changes dramatically under the same amount of noise (compare FIG. 31a). A search for the minimum error (i.e., local minimum) inevitably converge towards an area 182 indicated by the small arrow, far off the actual FOE. For the image with length-factor 5.0 (FIG. 33b), the minimum of the error function coincides with the actual location of the FOE 178. The different result for the same constellation of points in the FIG. 32d is caused by the different random numbers (noise) obtained in each experiment. This experiment confirms that a sufficient amount of displacement between consecutive frames is essential for reliably determining the FOE and thus, the direction of vehicle translation.

The performance of this FOE algorithm is shown below on a sequence of real images taken from a moving ALV. Also, it is shown how the absolute velocity of the vehicle can be estimated after the location of the FOE has been determined. The essential measure used for this calculation is the absolute height of the camera above the ground which is constant ad known. Given the absolute velocity of the vehicle, the absolute distance from the camera of 3-D points in the scene can be estimated using equation 20.

Next, velocity over ground may be computed. After the FOE has been computed following the steps outlined above, the direction of vehicle translation and the amount of rotation are known. From the derotated displacement field and the location of the FOE, the 3-D layout of the scene can be obtained up to a common scale factor (equation 20). As pointed out above, this scale factor and, consequently, the velocity of the vehicle can be determined if the 3-D position of one point in space is known. Furthermore, it is easy to show that it is sufficient to know only one coordinate value of a point in space to reconstruct its position in space from its location in the image.

Figure 34:
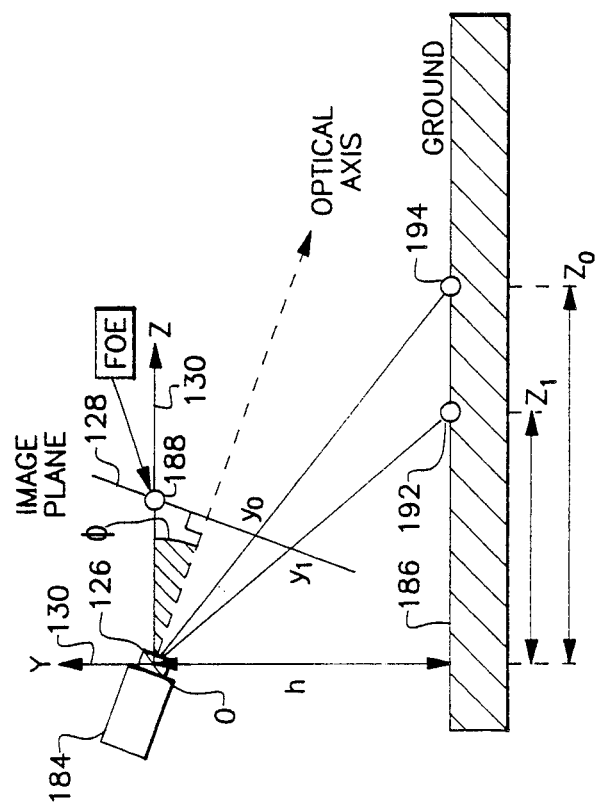
FIG. 34 reveals a side view of a camera traveling parallel to a flat surface.

Since the ALV travels on a fairly flat surface, the road can be approximated as a plane which lies parallel to the vehicle's direction of translation (see FIG. 34). This approximation holds at least for a good part of the road in the field of view of the camera 184. FIG. 34 shows a side view of camera 184 traveling parallel to flat surface 186. Camera 184 advances in direction Z, such that a 3-D point on ground surface 186 moves relative to camera 184 from $Z_0$ to $Z_1$. Depression angle $\phi$ can be determined from the location of FOE 188 in image 128. Height of camera 184 above ground surface 186 is given.

Since the absolute height of camera 184 above the ground 186 is constant and known, it is possible to estimate the positions of points 192 and 194 on road surface 186 with respect to the vehicle 132 (of FIG. 6) in absolute terms. From the changing distances between points 192 and 194 and camera 184, the actual advancement and speed can be determined.

First, a coordinate system 130 is introduced which has its origin O in the lens center 126 of the camera 184. The Z-axis of coordinate system 130 passes through FOE 188 in the image plane 128 and aims in the direction of translation. The original camera-centered coordinate system (X Y Z) 130 is transformed into the new frame (X' Y' Z') merely by applying horizontal and vertical rotation until the Z-axis lines-up with FOE 188. The horizontal and vertical orientation in terms of "pan" and "tilt" are obtained by "rotating" FOE 188 ($x_f y_f$) into the center of image 128 (OO) using equations 14 and 15 in the following:

$$\theta_f = -\tan^{-1} \frac{x_f}{f} \tag{39}$$

$$\phi_f = -\tan^{-1}\left[ y_f \frac{f^2}{(f^2 + x^2 f)f^2 - x^2 f^2 f} \right]. \tag{40}$$

The two angles $\phi_f$ and $\phi_f$ represent the orientation of camera 184 in 3-D with respect to the new coordinate system (X' Y' Z'). This allows determination of the 3-D orientation of the projecting rays passing through image points $y_0$ and $y_1$ by use of the inverse perspective transformation. A 3-D point X in the environment whose image x=(xy) is given, lies on a $$X = \begin{bmatrix} X \\ Y \\ Z \end{bmatrix} = \kappa \begin{bmatrix} \cos\theta_f & \sin\theta_f\sin\phi_f & -\sin\theta_f\cos\phi_f \\ 0 & \cos\phi_f & \sin\phi_f \\ \sin\theta_f & -\cos\theta_f\sin\phi_f & \cos\theta_f\cos\phi_f \end{bmatrix} \begin{bmatrix} x \\ y \\ f \end{bmatrix} \tag{41}$$

For points 192 and 194 on road surface 186 of FIG. 34, the Y-coordinate is $-h$ which is the height of camera 184 above ground 186. Therefore, the value of $\kappa_s$ for a point on the road surface ($x_s \, y_s$) can be estimated as $$\kappa_s = \frac{-h}{y_s\cos\phi_f + f\sin\phi_f} \tag{42}$$

and its 3-D distance is found by inserting $\gamma_s$ into equation 41 as $$Z_s = -h \frac{x_s \sin\theta_f - y_s \cos\theta_f \sin\phi_f - f\cos\theta_f \cos\phi_f}{y_s \cos\phi_s + f\sin\phi_s} \quad (43)$$

If a point on the ground is observed at two instances of time, $x_s$ at time $t$ and $x'_s$ at $t'$, the resulting distances from the vehicle $Z_s$ at $t$ and $Z'_s$ at $t'$ yield the amount of advancement $\Delta Z_s(t, t')$ and estimated velocity $V_s(t, t')$ in this period as $$\Delta Z_s(t,t') = Z_s - Z'_s \quad (44)$$

$$V_s(t,t') = \frac{Z_s - Z'_s}{t' - t}. \quad (45)$$

Image noise and tracking errors have a large impact upon the quality of the final velocity estimate. Therefore, the longest available displacement vectors are generally selected for this measurement, i.e., those vectors which are relatively close to the vehicle. Also, in violation of the initial assumption, the ground surface is never perfectly flat. In order to partially compensate these errors and to make the velocity estimate more reliable, the results of the measurements on individual vectors are combined. The length of each displacement vector $|x_i - x'_i|$ in the image is used as the weight for its contribution to the final result.

Given a set of suitable displacement vectors $S = \{x_i - x'_i\}$, the estimate of the distance traveled by the vehicle is taken as the weighed average of the measurements $\Delta Z_i$ on individual vectors $$\widetilde{\Delta Z}(t,t') = \frac{\Sigma(|x_i - x'_i|\Delta Z_i)}{\Sigma|x_i - x'_i|} \quad (46)$$

and the final estimate for the vehicle velocity is $$\widetilde{V}(t,t') = \frac{\widetilde{\Delta Z}}{t' - t}. \quad (47)$$

This computation was applied to a sequence of real images which is described below.

In the following, results of the FOE-algorithm and computation of the vehicle's velocity over ground are shown on a real image sequence taken from the moving ALV. The original sequence was provided on standard video tape with a frame-rate of 30 per second. Out of this original sequence, images were taken in 0.5 second intervals, i.e., at a frame rate of 2 per second in order to reduce the amount of storage and computation. The images were digitized to a spatial resolution of 512×512, using only the Y-component (luminance) of the original color signal.

FIGS. 35a–i show the edge image of frames 182–190 of an actual test, with points 1–57 being tracked and labeled with ascending numbers. FIGS. 35a–i show the original image sequence taken from the moving ALV after edge detection and point detection. Selected points 1–57 are located at the lower-left corners of their marks. FIGS. 35j–p (frames 191–197), which include additional points 58–78, show the original image sequence taken after edge detection and point selection. An adaptive windowing technique was developed as an extension of relaxation labeling disparity analysis for the selection and matching of tracked points. The actual image location of each point is the lower left corner of the corresponding mark. The resulting data structure consists of a list of point observations for each image (time), e.g., time $t_0$: ((P1 to x1 y1) (P2 to x2 y2) (P3 to x3 y3) . . . ) time $t_1$: ((P1 t1 x1 y1) (P2 t1 x2 y2) (P3 t1 x3 y3) . . . )

Points are given a unique label when they are encountered for the first time. After the tracking of a point has started, its label remains unchanged until this point is no longer tracked. When no correspondence is found in the subsequent frame for a point being tracked, either because of occlusion, or the feature left the field of view, or because it could not be identified, tracking of this point is discontinued. Should the same point reappear again, it is treated as a new item and given a new label. Approximately 25 points per image have been selected in the sequence shown in FIGS. 35a–i. In the search for the focus of expansion, the optical FOE-location from the previous pair of frames is taken as the initial guess. For the very first pair of frames (when no previous result as available), the location of the FOE is guessed from the known camera setup relative to the vehicle. The points which are tracked on the two cars (24 and 33) are assumed to be known as moving and are not used as reference points to compute the FOE, vehicle rotation, and velocity. This information is eventually supplied by the reasoning processes in conjunction with the qualitative scene model (FIG. 2).

Figure 35B:
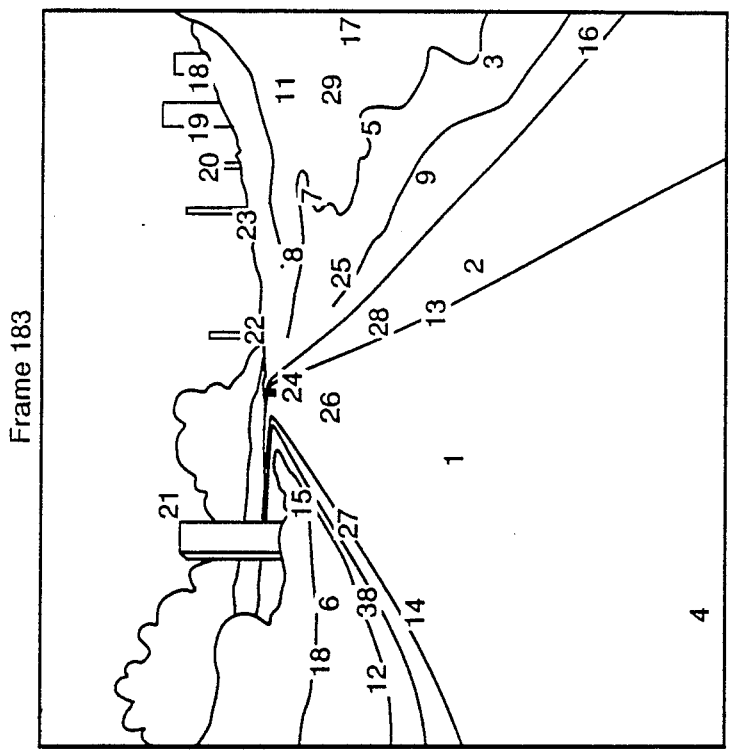
FIGS. 35a-i show an original image sequence taken from a moving vehicle after edge detection and point detection with the selected points located at the lower-left corners of their marks.
Figure 35A:
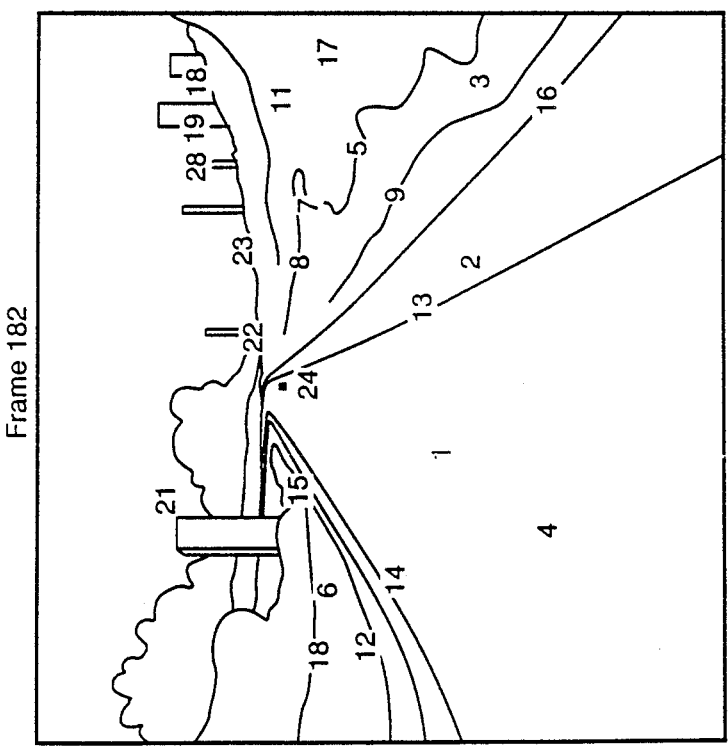
Figure 35D:
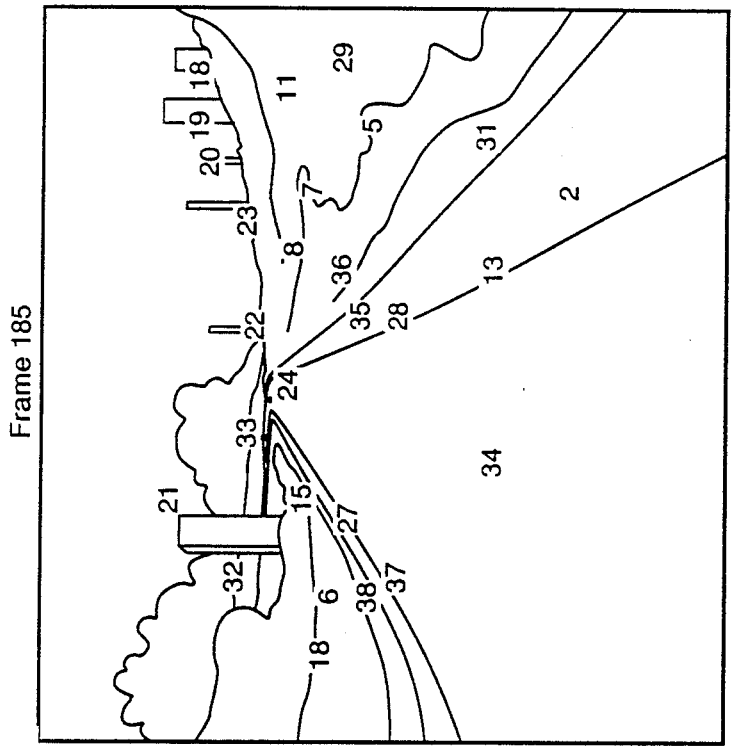
Figure 35C:
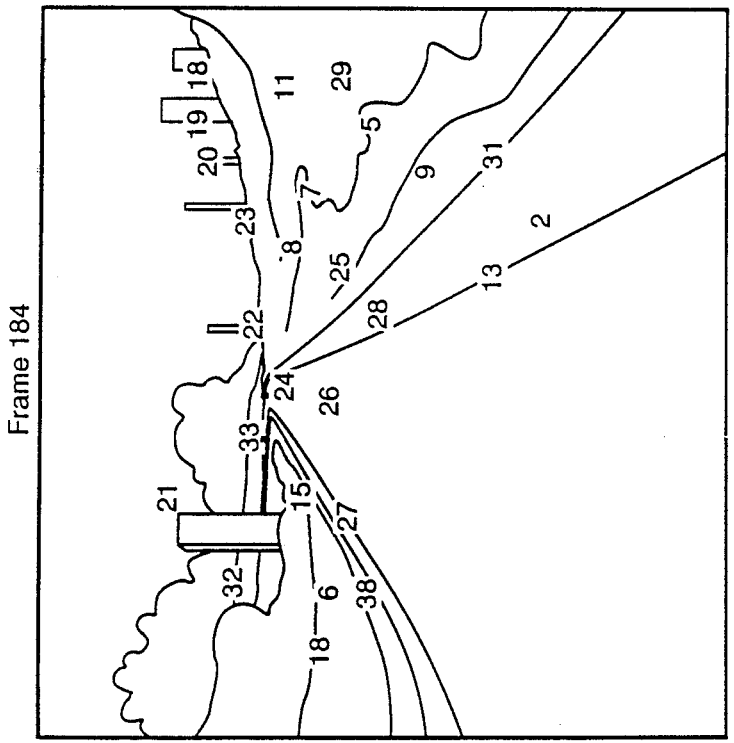
Figure 35F:
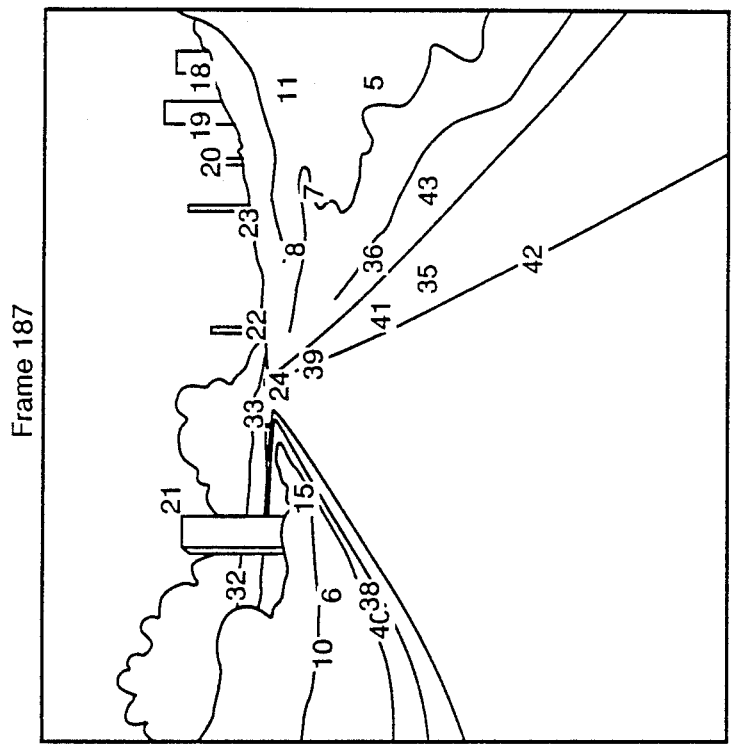
Figure 35E:
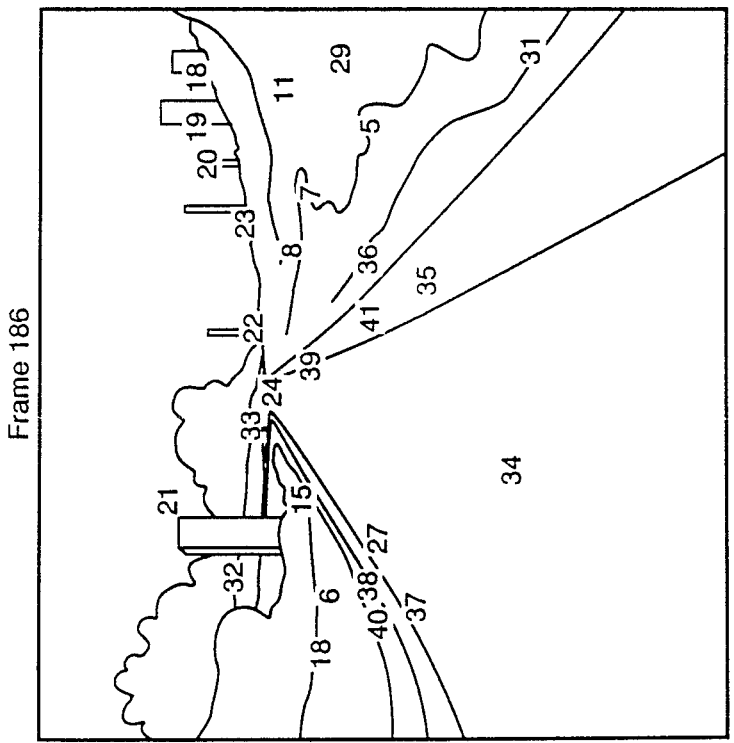
Figure 35H:
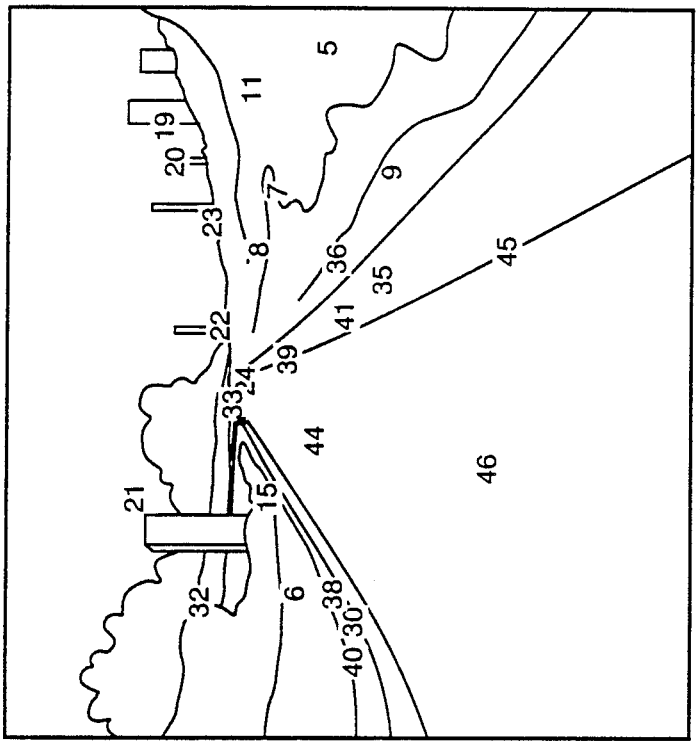
Figure 35G:
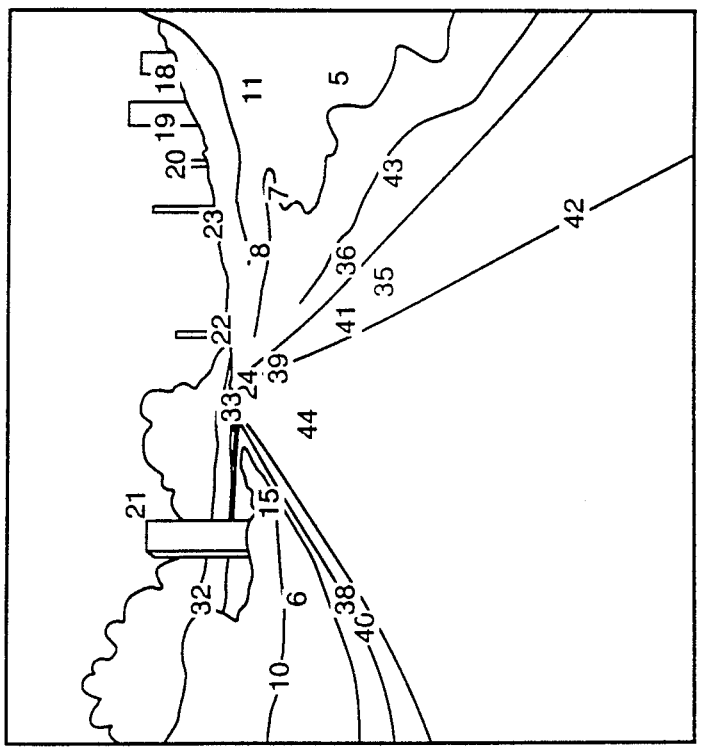
Figure 35J:
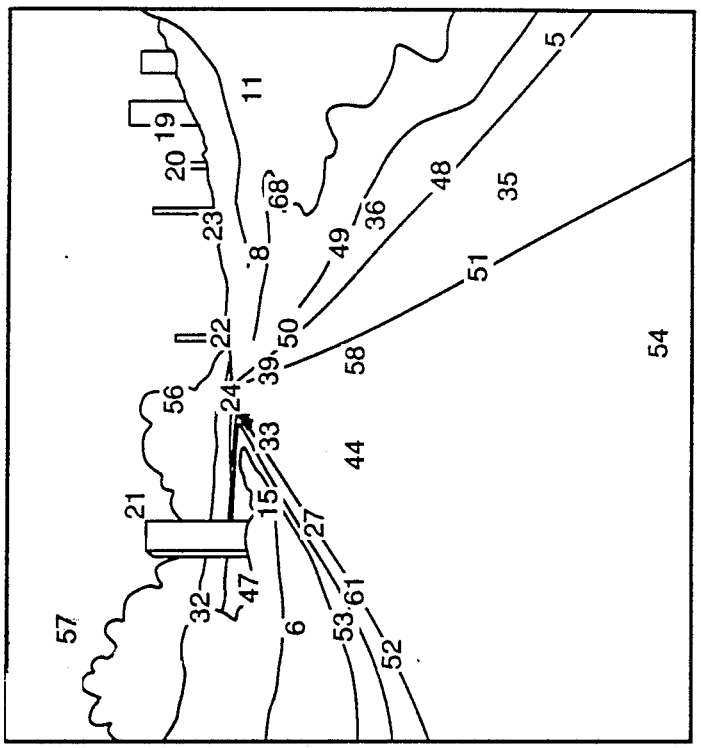
FIG. 35j-p show the original image sequence after edge detection and point selection.
Figure 35I:
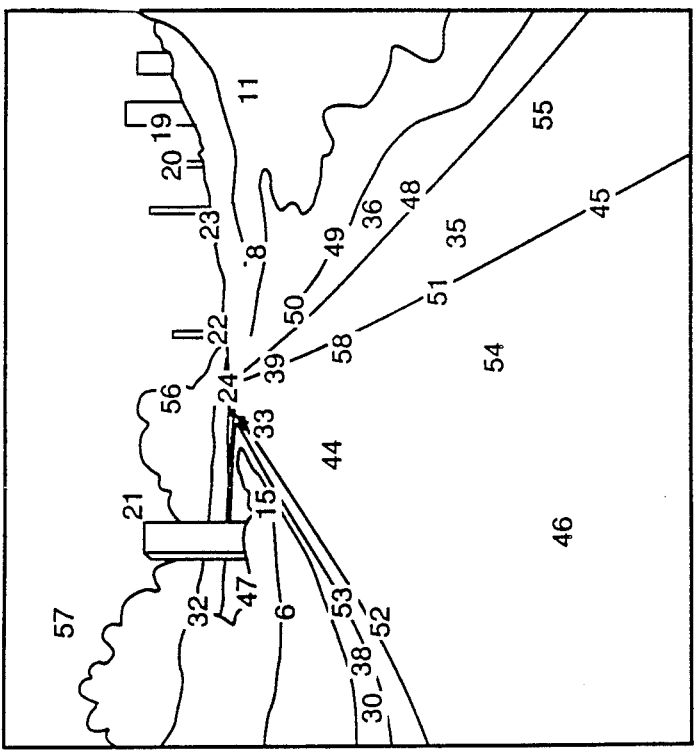
Figure 35L:
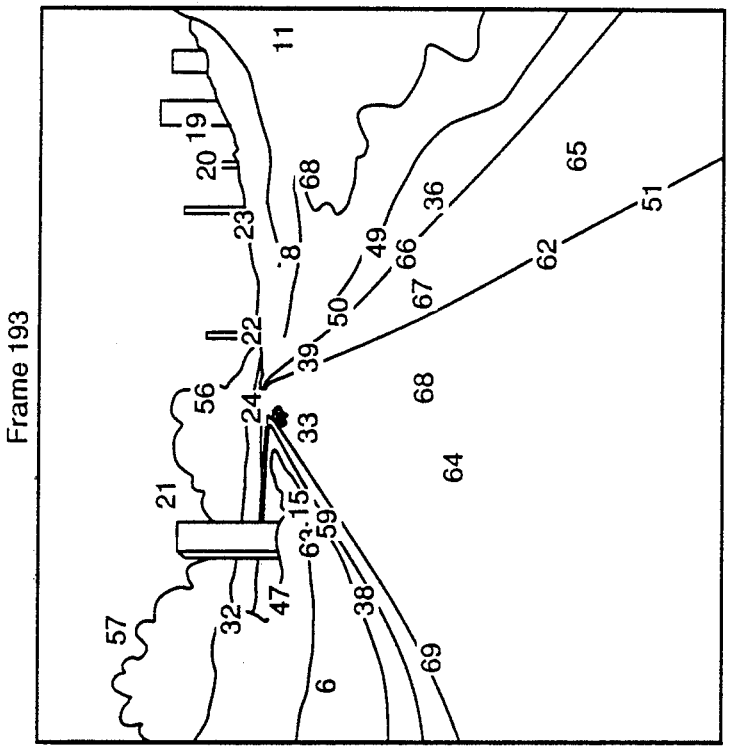
Figure 35K:
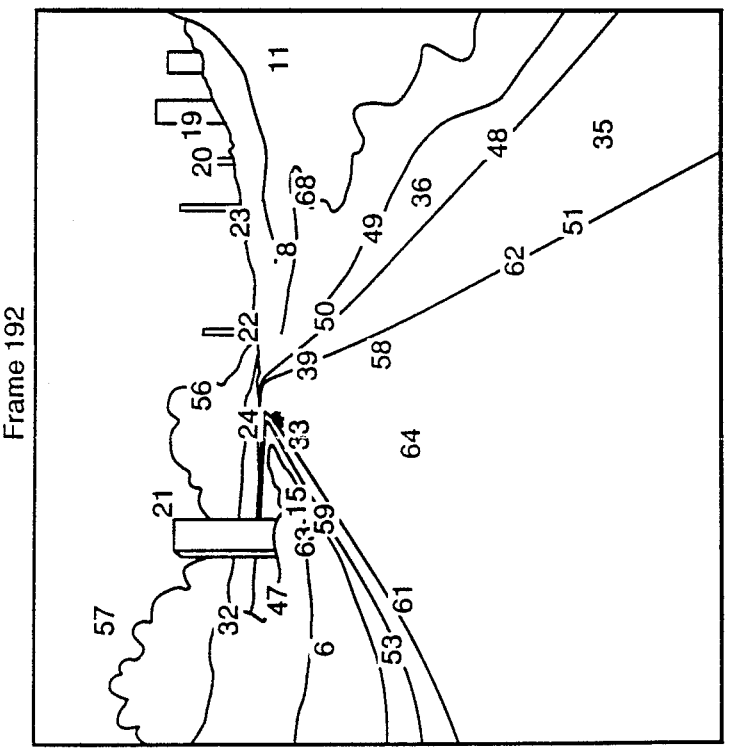
Figure 35N:
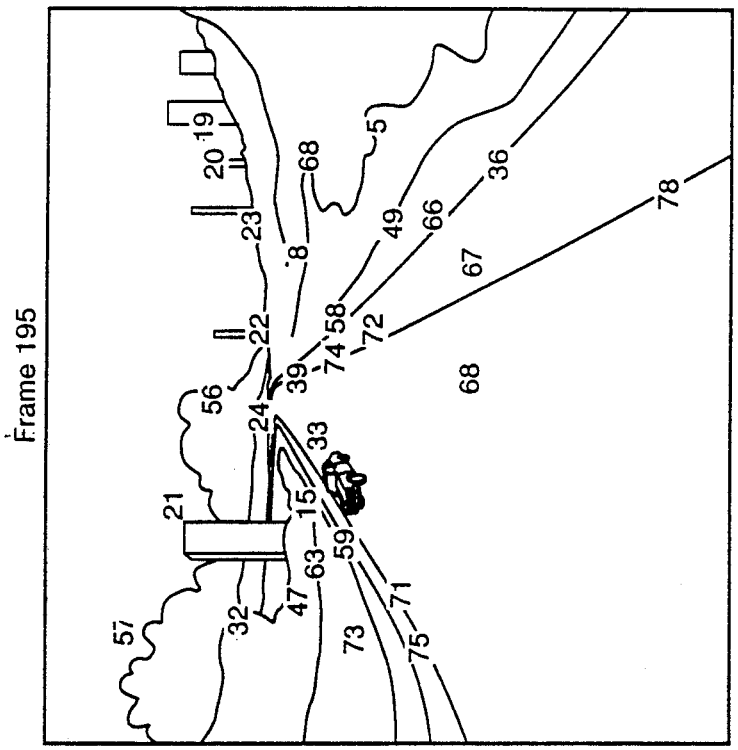
Figure 35M:
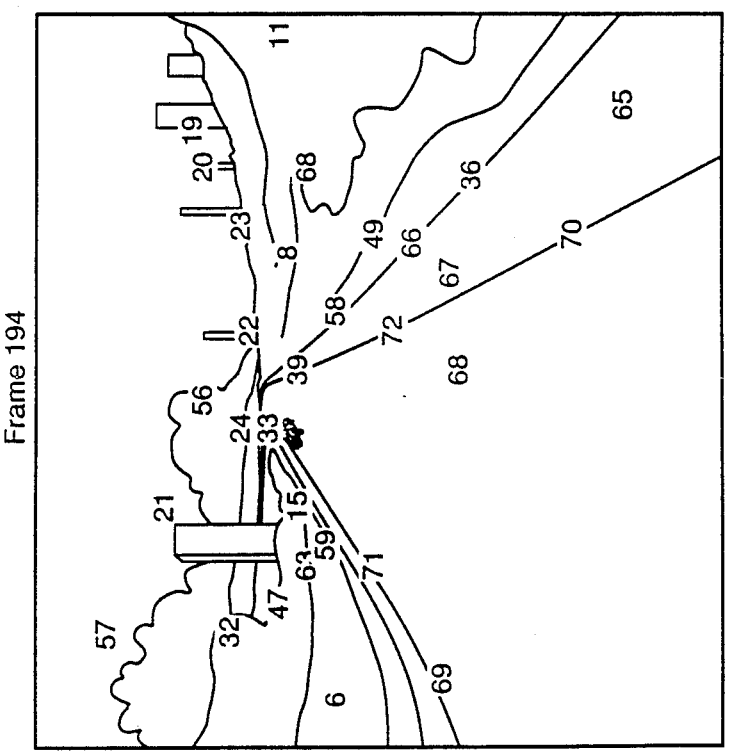
Figure 35O:
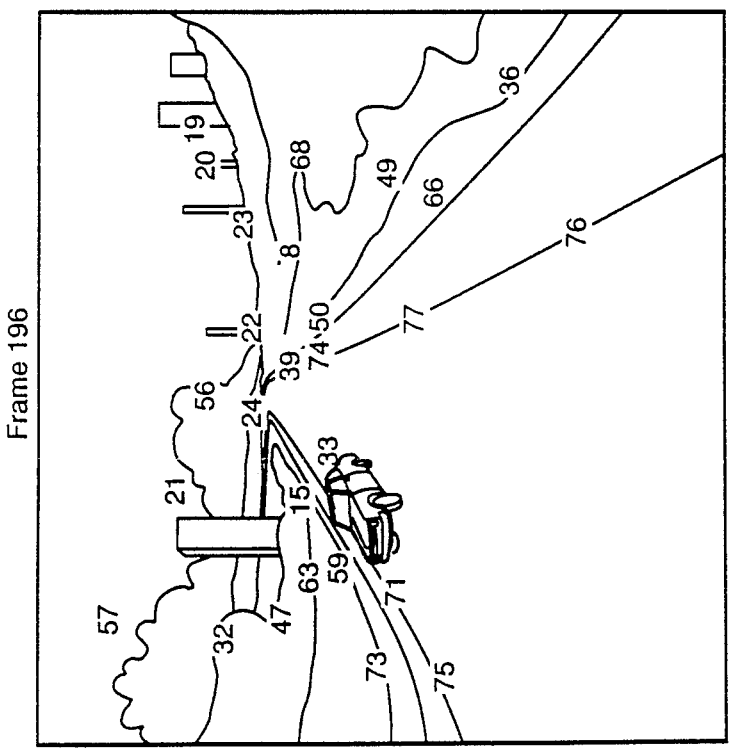
Figure 35P:
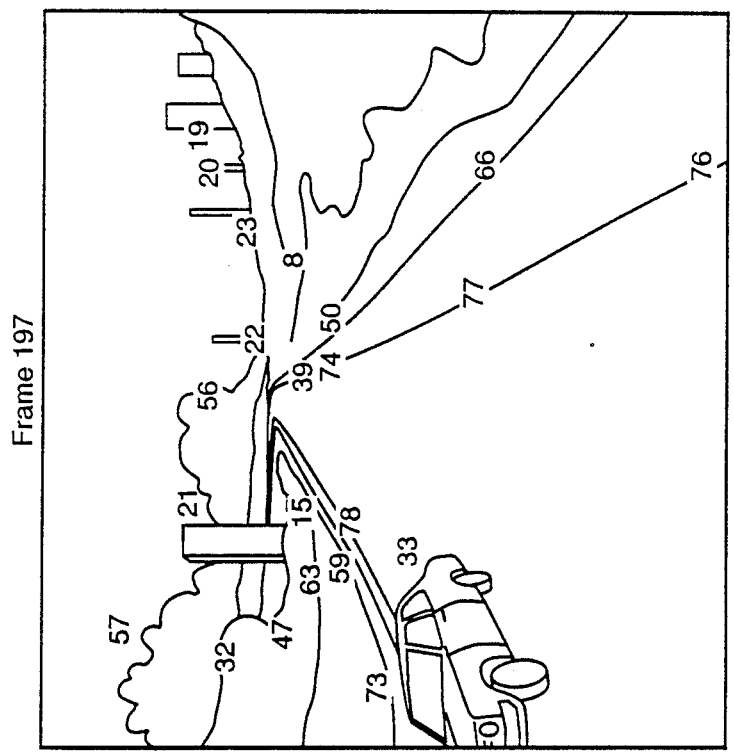
Figure 36B:
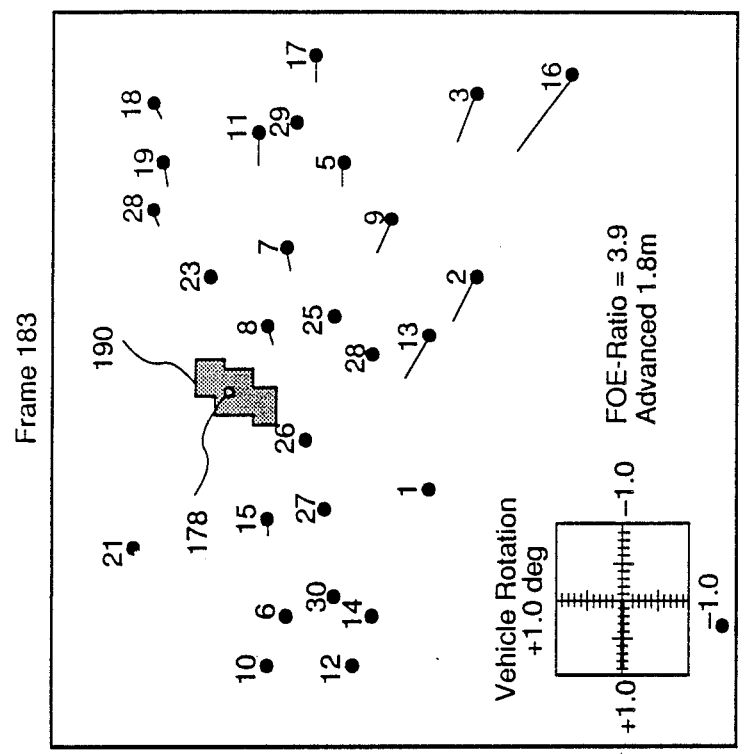
FIG. 36a-p illustrate the displacement vectors and estimates of vehicles motion for the image sequence shown in FIGS. 35a-p.
Figure 36A:
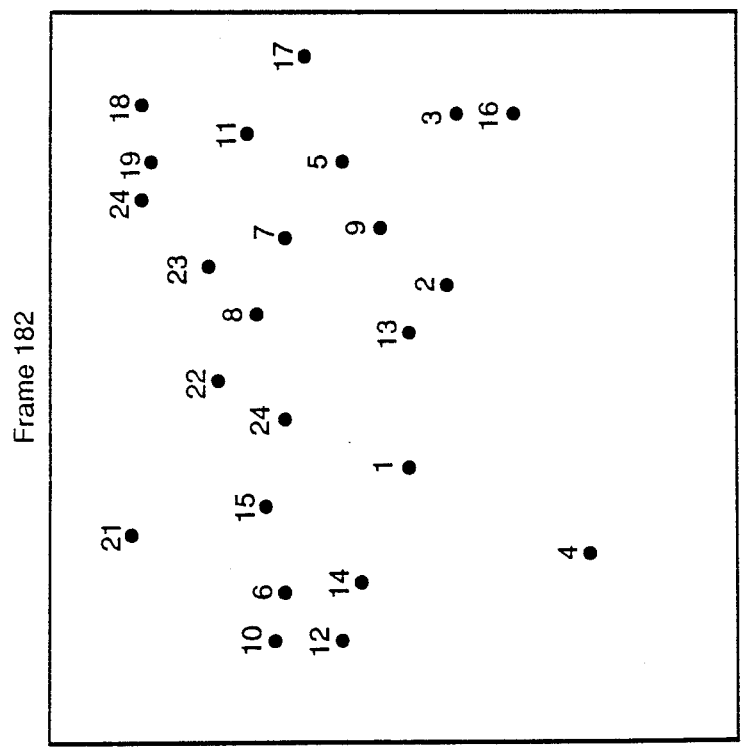
Figure 36F:
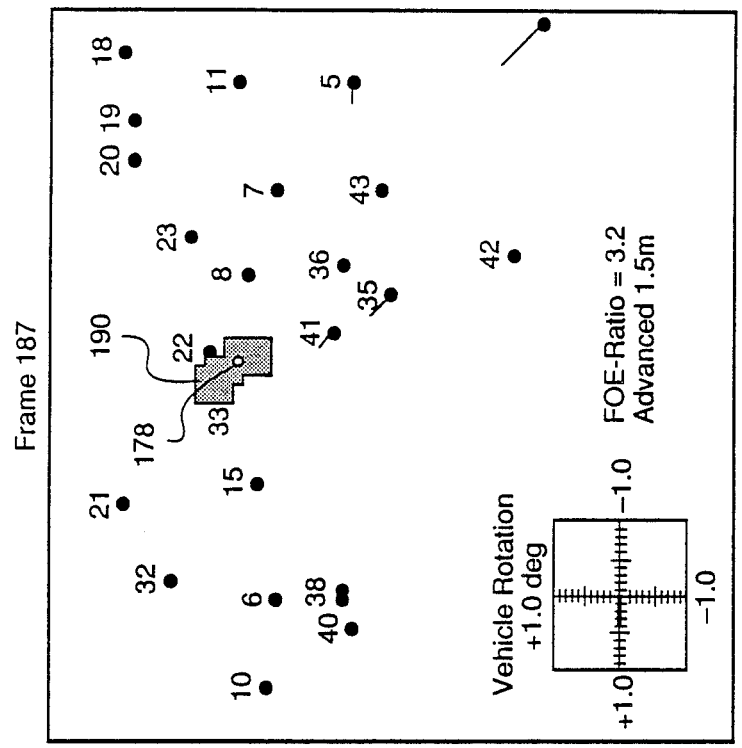
Figure 36E:
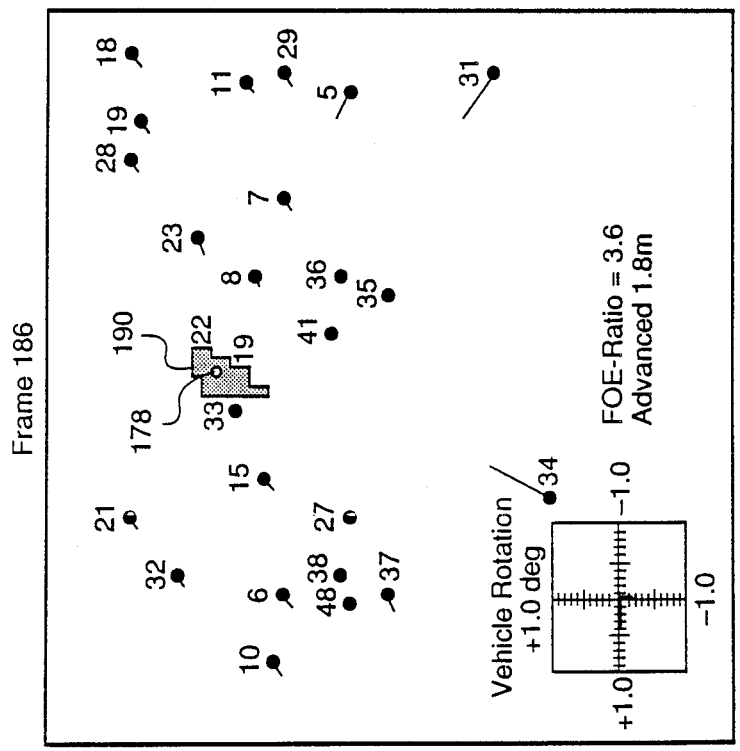
Figure 36H:
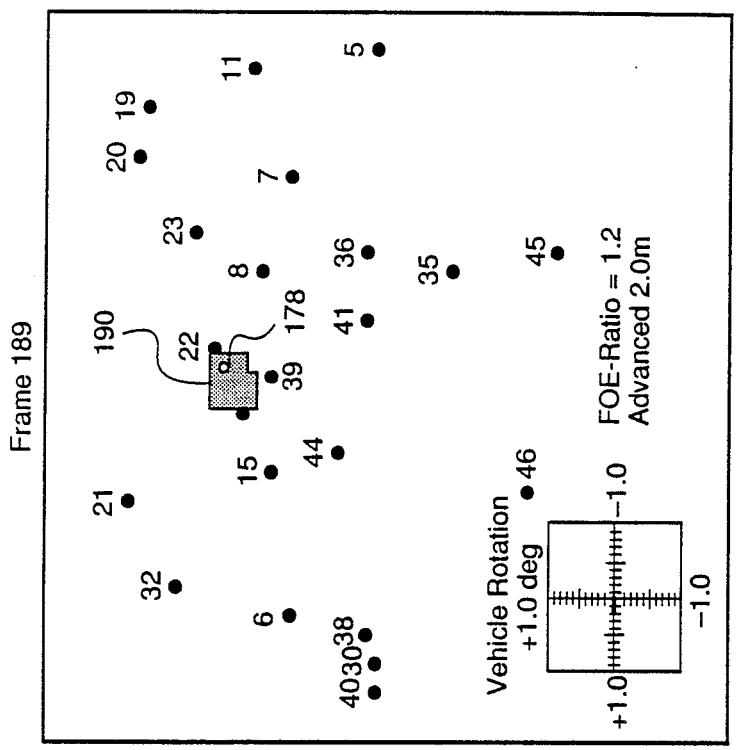
Figure 36G:
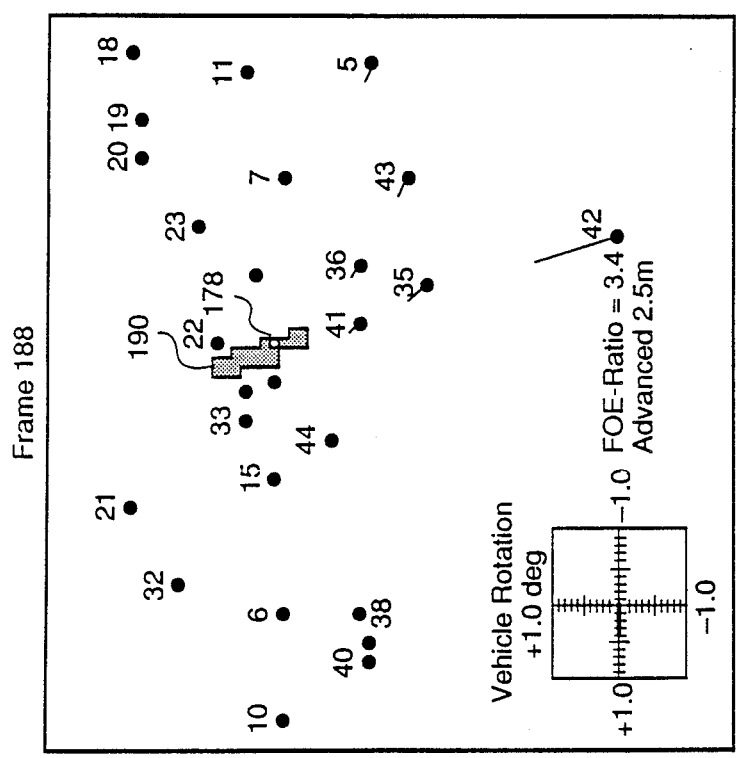
Figure 36J:
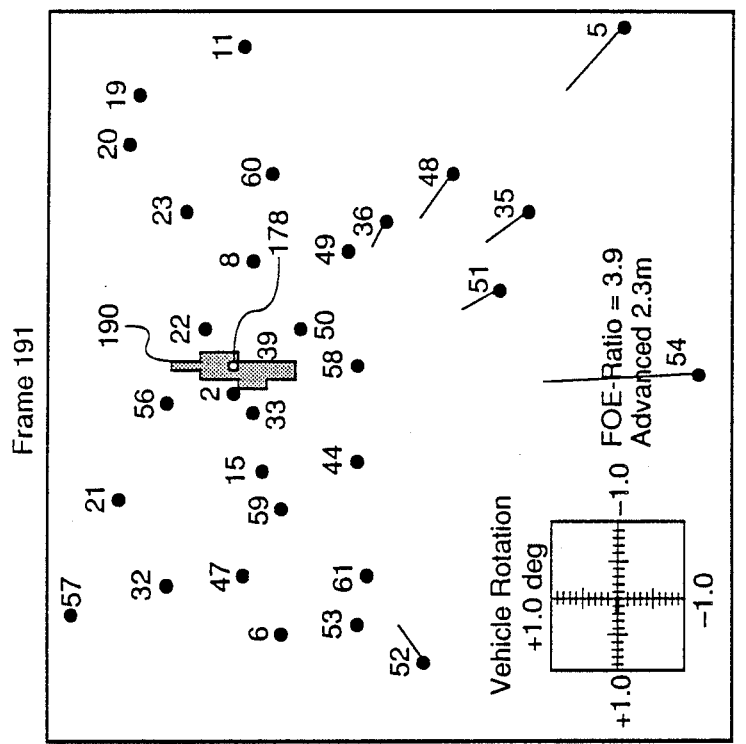
Figure 36I:
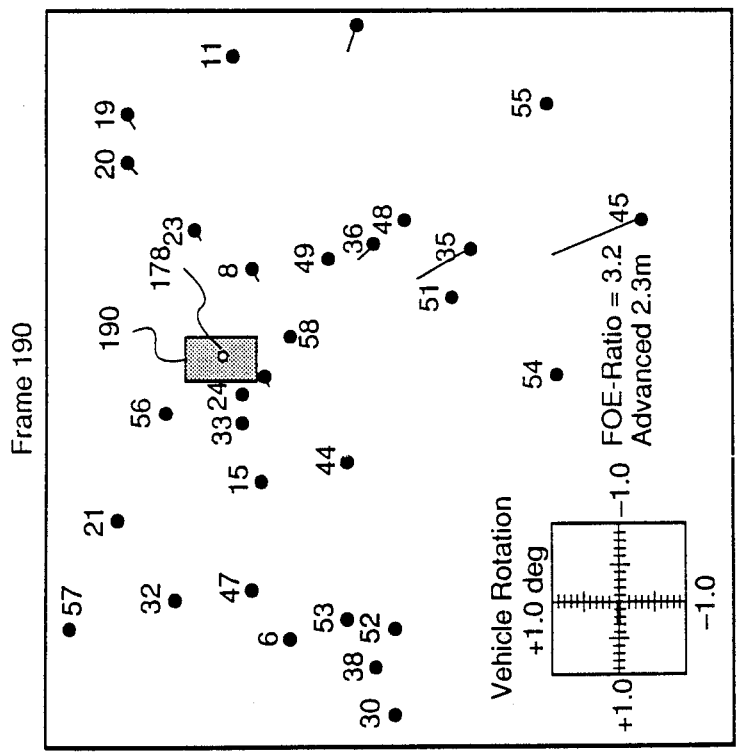
Figures 36K, 36L:
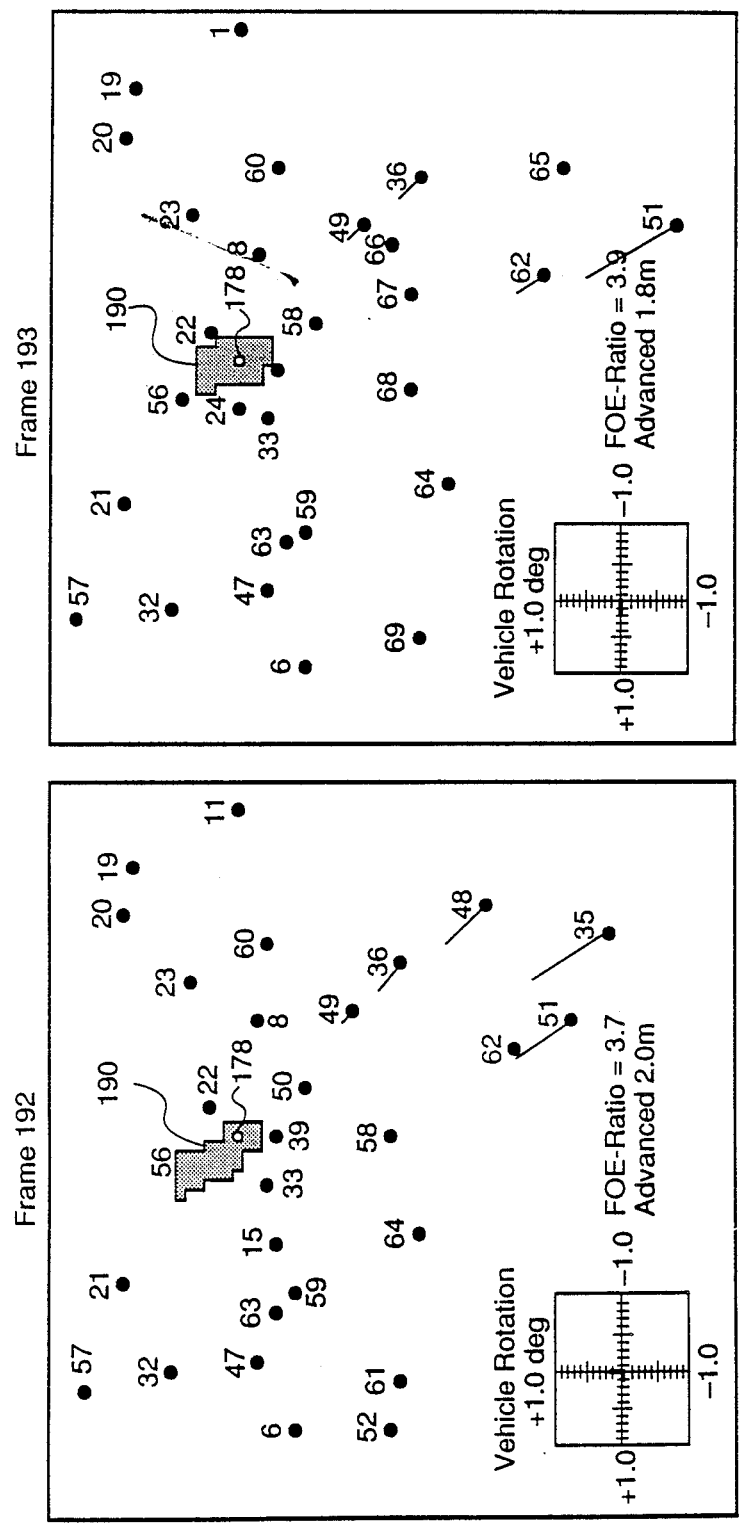
Figures 36M, 36N:
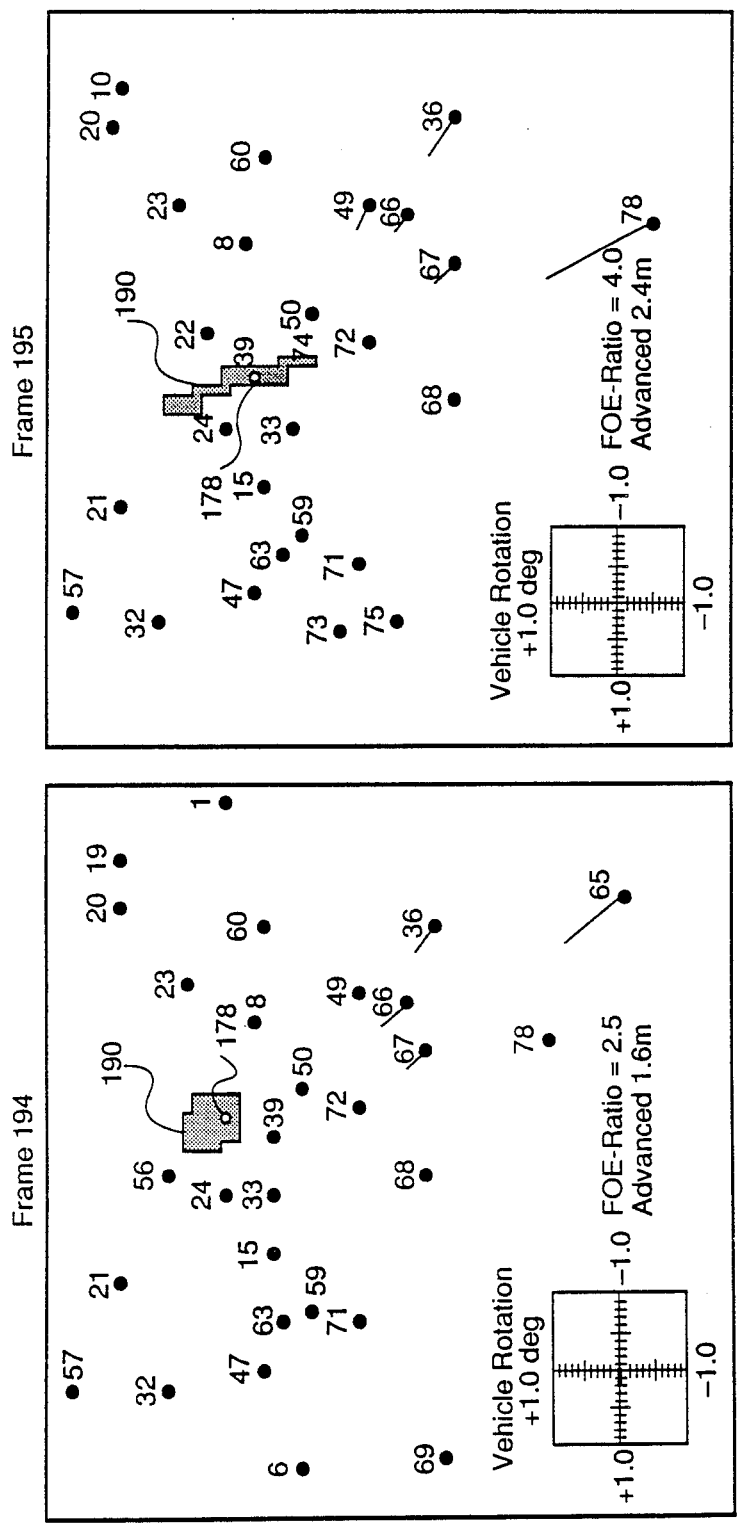
Figure 36P:
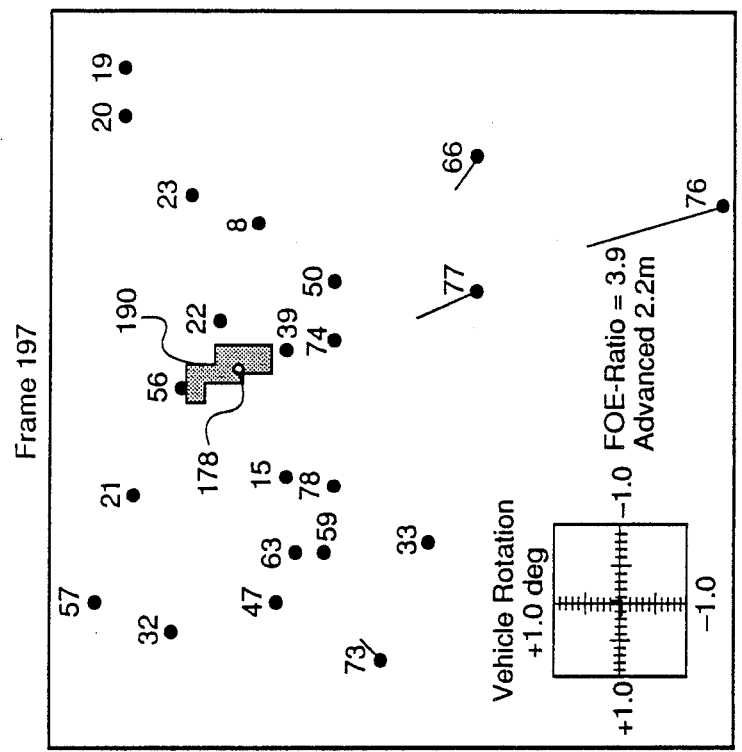
Figure 36O:
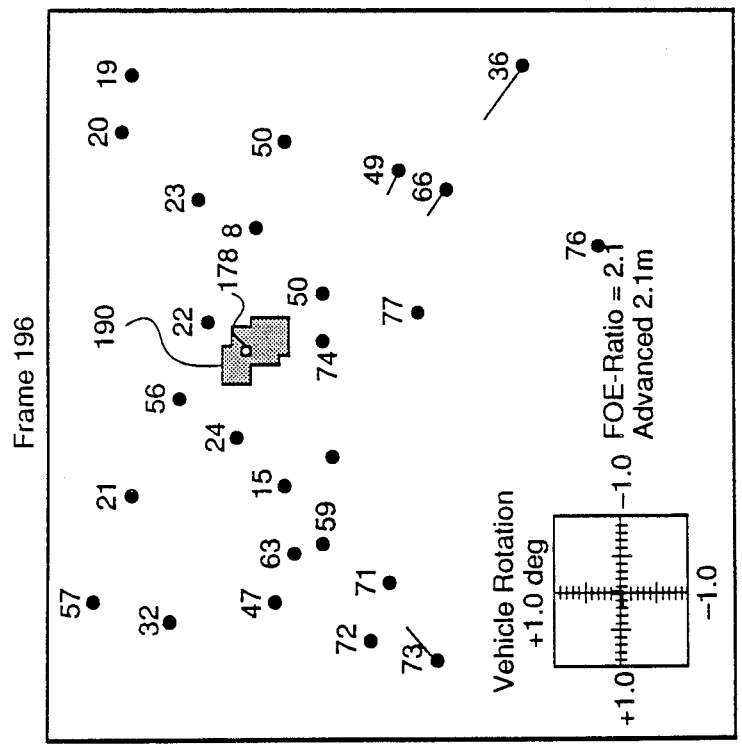

FIGS. 36a–p illustrative the displacement vectors and estimates of vehicle motion for the image sequence shown in FIGS. 35a–p. shaded area 190 marks the possible FOE locations and circle 178 inside of area 190 is the FOE with the lowest error value. The FOE-ratio measures the flatness of the error function inside area 190.

Also, FIGS. 36a–p show the results of computing the vehicle's motion for the same sequence as in the previous Figure. Each frame $t$ displays the motion estimates for the period between $t$ and the previous frame $t-1$. Therefore, no estimate is available at the first frame (182). Starting from the given initial guess, the FOE-algorithm first searches for the image location, which is not prohibited and where the error function (equation 35) has a minimum.

The optimal horizontal and vertical shift resulting at this FOE-location is used to estimate the vehicle's rotations around the X- and Y-axis. This point, which is the initial guess for the subsequent frame, is marked as a small circle inside the shaded area. The equivalent rotation components are shown graphically on a $\pm 1°$ scale. They are relatively small throughout the sequence such that it was never necessary to apply intermediate derotation and iteration of the FOE-search. Along with the original displacement vectors (solid lines), the vectors obtained after derotation are shown with dashed lines.

After the location with minimum error has been found, it is used as the seed for growing a region of potential FOE-locations. The growth of the region is limited by two restrictions: (1) The ratio of maximum to minimum error inside the region is limited, i.e., $$E_n^i / E_n^{min} = \rho^i \leq \rho^{lim}$$

(see equation 40 for the definition of the error function $E_n$). No FOE-location for which the error ratio $\rho^i$ exceeds the limit $\rho^{lim}$ is joined to the region. Thus the final size of the region depends on the shape of the error function. In this example, the ratio $\rho^{lim}$ was set at 4.0. Similarly, no prohibited locations (FIG. 26) are considered; (2) The maximum size of the region M is given by the given FOE-region region regardless of their error values. The resulting error ratio $\rho^{max}=\max(\rho^i)$ for the points inside the region indicates the shape of the error function for this area. A low value for the ratio $\rho^{max}$ indicates a flat error function. The value for $\rho^{max}$ is shown as FOE-RATIO in every image.

For the computation of absolute vehicle velocity, only a few prominent displacement vectors were selected in each frame pair. The criteria were that the vectors be located below the FOE and that their length be more than 20 pixels. The endpoints of the selected (derotated) vectors are marked with dark dots. The parameter used for the computation of absolute advancement is the height of the camera above the ground, which is 3.3 meters (11 feet).

Figure 37:
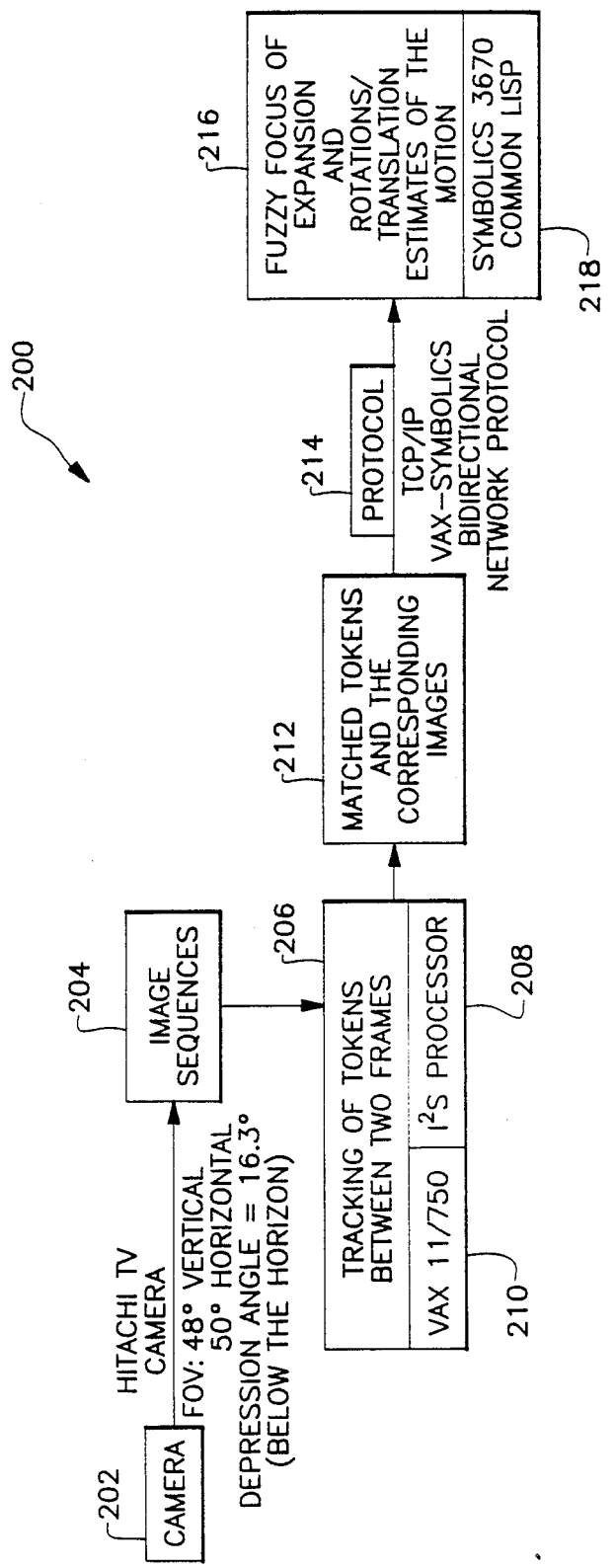
FIG. 37 illustrates a specific hardware implementation of the embodiment of the invention.

FIG. 37 illustrates hardware embodiment 200 of the present invention. Camera 202 may be a Hitachi television camera having a 48° vertical field of view and a 50° horizontal field of view. Camera 202 may be set at a depression angle of 16.3° below the horion. Image sequence 204 acquired by camera 202 are transmitted to tracking means 206 comprising an I2S processor 208 and a VAX 11/750 computer 210. Tracking means 206 tracks tokens between frames of image sequences 204. The output of means 206 goes to means 212 for matching of tokens and corresponding images. For the two different computers 210 and 218, a VAX-Symbolics bidirectional network protocol means 214 is connected between means 212 and means 216 which includes Symbolics 3670 computer 218, though it is possible to use one computer thereby eliminating means 214. Computer 218 provides processing for obtaining fuzzy focus of expansion and rotations/translation estimates of motion. The language environment used with computer 218 is Common LISP.

The methods and processes in the embodiment of the present invention are implemented with the ensuing programming.

```
FRODO:>sklee>DRIVE>create>rules.art.23

;;; -*- Mode: ART; Base: 10; Package: ART-USER; syntax: common-lisp; Fonts: CPTFONT; -*-
;;;
;;;
;;;############################################################################
;;;############################### R U L E S - INITIALIZATION ################
;;;############################################################################
;;;
;;;
(defrule create-single-frame-wdw
   (declare (salience *maximum-salience*))
=>
   #L(progn (setq ?*frame-window-2* 'frame-window-2)
      (create-window ?*frame-window-2* 'graphics
         (+ ?*frame-origin-x* 15)
         (- ?*frame-origin-y* 100)
         (+ ?*frame-origin-x* ?*hor-size* 15)
         (+ ?*frame-origin-y* ?*ver-size* -100)
         "Image Plane 2" t)
      (setq ?*frame-wdw-stream-2* (window-stream ?*frame-window-2*))

(setq ?*frame-window-1* 'frame-window-1)
      (create-window ?*frame-window-1* 'graphics
         (+ ?*frame-origin-x* 15)
         (- ?*frame-origin-y* 100)
         (+ ?*frame-origin-x* ?*x-disp-size* 15)
         (+ ?*frame-origin-y* ?*y-disp-size* -100)
         "Image Plane 1" t)
      (setq ?*frame-wdw-stream-1* (window-stream ?*frame-window-1*))

(setq ?*frame-wdw-stream* ?*frame-wdw-stream-2*)
      (setq ?*frame-array* (create-shadow-array ?*frame-wdw-stream*))
      (setq ?*frame-wdw-stream* ?*frame-wdw-stream-1*
            ?*frame-window* ?*frame-window-1*)
      (setq ?*frame-array1* (create-shadow-array ?*frame-wdw-stream*))
      (clear-zl-window ?*frame-wdw-stream*))
)

;;
(defrule create-multiple-frame-wdws
   (declare (salience *maximum-salience*))
   (block)
=>
   (bind ?x-step (+ ?*x-size* 28))
   (bind ?y-step (+ ?*y-size* 43))
   (for row from 0 to 2 do
      (for col from 0 to 3 do
```

```
        (bind ?wdw-nr (+ (* row 4) col))
        (bind ?wdw (aref ?*frame-array* ?wdw-nr))
        (if (<= ?wdw-nr ?*max-frame-number*) then
          (create-window ?wdw  'graphics
              (* col ?x-step) (* row ?y-step)
                  (+ (* (+ col 1) ?x-step) 1) (+ (* (+ row 1) ?y-step 1))
              (format nil "t = ~,1F sec" (* ?wdw-nr 0.5)) nil)
          (line 0 0 ?*x-size* 0 1 7 ?wdw)
          (line 0 ?*y-size* ?*x-size* ?*y-size* 1 7 ?wdw)
          (line 0 0 0 ?*y-size* 1 7 ?wdw)
          (line ?*x-size* 0 ?*x-size* ?*y-size* 1 7 ?wdw))))
       ;make window for traces
       (create-window 'trace-window  'graphics
            (* 3 ?x-step) (* 2 ?y-step)
                (+ (* (+ 3 1) ?x-step) 1) (+ (* (+ 2 1) ?y-step 1))
            (format nil "Point Traces") t)
       (line 1 1 ?*x-size* 1 2 7 'trace-window)
       (line 1 ?*y-size* ?*x-size* ?*y-size* 2 7 'trace-window)
       (line 1 1 1 ?*y-size* 2 7 'trace-window)
       (line ?*x-size* 1 ?*x-size* ?*y-size* 2 7 'trace-window)
)
;;;
;;;##################################################################
;;;######################## R U L E S - READING DATA
;;;##################################################################
;;;
(defrule read-original-point-set
   (step read-data)
   (cur-time ?ct ?)
   =>
   #L(let ((file-name
              (make-snap-file-name ?ct)))
      (setq ?*points-list* (read-new-facts file-name)) ;returns nil if file nonexistant
      (cond ((null ?*points-list*) (assert (end-of-data ?ct)))
            (t  (eval ?*points-list*))))
)

;;;
;;;##################################################################
;;;######################## R U L E S - TRACING POINTS
;;;##################################################################
;;;
(defrule clear-displacement-list
   (declare (salience *maximum-salience*))
   (step read-data)
   =>
   #L(progn
       (setq ?*disp-orig* '())
       (setq ?*disp-stat* '())
       (setq ?*disp-mob* '()))
)
;;;
(defrule fill-displacement-list
   (step read-data)
   (cur-time ?ct ?pt)
   (ip ?label ?ct ?x2 ?y2)
   (ip ?label ?pt ?x1 ?y1)
   (case
     ((mob ?label)
      =>
      #L(push (list ?label
            (- ?x1 ?*offset-hor*)
            (- ?y1 ?*offset-ver*)
            (- ?x2 ?*offset-hor*)
            (- ?y2 ?*offset-ver*))
          ?*disp-mob*))

(otherwise
      =>
      #L(push (list ?label
            (- ?x1 ?*offset-hor*)
```

```
            (- ?y1 ?*offset-ver*)
            (- ?x2 ?*offset-hor*)
            (- ?y2 ?*offset-ver*))
         ?*disp-state*)))
  =>
  #L(push (list ?label
        (- ?x1 ?*offset-hor*)
        (- ?y1 ?*offset-ver*)
        (- ?x2 ?*offset-hor*)
        (- ?y2 ?*offset-ver*))
      ?*disp-orig*)
)
;;;
;;;##############################################################
;;;######################## R U L E S - DISPLAYING THE IMAGE
;;;##############################################################
;;;
(defrule SWITCH-WINDOW
  (declare (salience *maximum-salience*))
  (cur-time ?ct ?)
  (step display-data)
  =>
  #L(setq ?*frame-wdw-stream* ?*frame-wdw-stream-1*
          ?*frame-window* ?*frame-window-1*)
)
;;;
(defrule SHOW-DISPLACEMENT
  (declare (salience -1))
  (cur-time ?ct ?)
  (step display-data)
  =>
  (clear-zl-window ?*frame-wdw-stream*)
  (retrieve ?ct ?*frame-wdw-stream* ?*frame-array*)
  (label-window ?*frame-window* (format nil "FRAME ~D" ?ct))
  (mark-list-of-points (cdr ?*points-list*) ?ct ?*frame-wdw-stream*)
  (rectangle 0 0 (- ?*x-size* 2) (- ?*y-size* 1) 1 7 ?*frame-window*)
  (show-labeled-disp ?*disp-orig* ?*frame-wdw-stream* t)           ;dashed=nil solid=t
)
;;;
;;;##############################################################
;;;######################## R U L E S - FINDING THE FOE
;;;##############################################################
;;;
(defrule CLEAR-DEROTATED-DISPLACEMENTS
  (declare (salience *maximum-salience*))
  (step find-foe)
  =>
  #L(setq ?*disp-derot* '())
)
;;;
(defrule MAKE-INITIAL-FOE-GUESS
  (goal (foe-guess ? ? ?ct))
  (cur-time ?ct ?pt)
  (case
    ((foe-est ?xfp ?xyp ? ? ?pt)
     =>
     (assert (foe-guess ?xfp ?xyp ?ct)))      ;use previous FOE as new guess
    (otherwise
     =>
     (assert (foe-guess 0 -80 ?ct))))
)
;;;
(defrule FIND-THE-FOE-AND-DEROTATE
  (step find-foe)
  (cur-time ?ct ?)
  (foe-guess ?xfg ?yfg ?ct)
  =>
  #L(let ((theta 0.0) (phi 0.0) (advancement 0.0) (growstep 10))

(multiple-value-bind (foe-locations area error-ratio)
                         (find-foe ?xfg ?yfg ?*disp-state* growstep)
```

```
     (setq ?*foe-locations* foe-locations)

(unless (endp foe-locations)
       (multiple-value-bind (xf yf sx sy error) (values-list (car foe-locations))

(multiple-value-setq (theta phi) (actual-rot xf yf (+ xf sx) (+ yf sy)))

(setq ?*disp-derot* (derotate ?*disp-orig* theta phi))
         (setq ?*disp-stat* (derotate ?*disp-stat* theta phi))

(setq ?*disp-ext*  (set-min-max-dist ?*disp-derot* foe-locations 10))
              ;add new information to the diplacement vectors (show-labeled-disp ?*disp-derot* ?*frame-wdw-stream* nil)        ;dashed lines (mark-foe-area foe-locations growstep ?*frame-wdw-stream*)       ;stepsize = 10
         (mark-foe-specs area error-ratio 270 600 ?*frame-window*)

(mark-rotation theta phi 50 80 400 ?*frame-window*)

(multiple-value-setq
            (advancement ?*disp-references*)
              (speed-above-ground ?*disp-stat* foe-locations 20))
         (mark-speed-vectors ?*disp-references* ?*frame-window*)
         (mark-advancement advancement 270 660 ?*frame-window*)

(assert (foe-est =(+ xf) =(+ yf) =(+ xf) =(+ yf) ?ct)
                 (rot-est =(+ theta) =(+ phi) =(+ theta) =(+ phi) ?ct)
                 (derotated ?ct))))))
)
;;;
;;;############################################################################
;;;############################# R U L E S - WRITING RESULTS
;;;############################################################################
;;;
(defrule write-results-to-file
   (step write-data)
   (cur-time ?ct ?)
   (derotated ?ct)
   (foe-est ?xf1 ?yf1 ?xf2 ?yf2 ?ct)
   (rot-est ?rx1 ?ry1 ?rx2 ?ry2 ?ct)
   =>
   #L(let
        ((file-name (make-disp-file-name ?ct))
         ;assert foe-est, rot-est, displacement-list (assert-list
           (append
             (list 'assert
                (list 'foe-est ?xf1 ?yf1 ?xf2 ?yf2 ?ct)           ;center foe
                (list 'rot-est ?rx1 ?ry1 ?rx2 ?ry2 ?ct)           ;estim rotation
                (list 'foe-locations ?ct *foe-locations*))        ;list of foe-locat
ions
             (mapcar #'(lambda (x) (cons 'dv (cons ?ct x)))
                                    ?*disp-ext*))))   ;displacement vectors (write-assertion assert-list file-name))
)

;;;
;;;############################################################################
;;;############################# R U L E S - FORGETTING OLD STUFF
;;;############################################################################
;;;
(defrule eliminate-old-points                         ;points (tracked)
   (declare (salience (+ *minimum-salience* 3)))
   (cur-time ? ?past)
   ?to-kill <- (point ? ? ? ?ti&:(< ?ti (- ?past 2)))
=>
   (retract ?to-kill)
)
;;;
```

```
FRODO:>sklee>DRIVE>create>foefun.lisp.6

D,#TD1PsT[Begin using 006 escapes](0 0 (NIL 0) (NIL NIL NIL) "CPTFONT")(1 0 (NIL 0)
(NIL :BOLD-EXTENDED NIL) "CPTFONTB")0;;; -*- Mode: LISP; Base: 10; Package: ART-USER; syn
tax: common-lisp; Fonts: CPTFONT,CPTFONTB; Tab-Width: 4; -*-
;;;
(defconstant
        ;neighborhood offsets, contains x/y-offsets for 8 neighbors
        ;
        ;  |3|2|1|         |
        ;  |4| |0|  ->  +x  V +y
        ;  |5|6|7|
        ;
        1*nb-off*0 (make-array '(8 2) :initial-contents
                  '((1 0) (1 -1) (0 -1) (-1 -1) (-1 0) (-1 1) (0 1) (1 1)))
)
;;;
;;;---------------------------------------------------------------------------
(defun 1find-foe 0(xf-guess yf-guess disp-list growstep)
   (let
      ((bigstep 10) (smallstep 5) (disp-for-foe) (foe-locations nil)
         (final-size 16) (error-ratio 1))

(unless (endp disp-list)
        (setq disp-for-foe (select-guide-vector disp-list 100))

(initialize-search)        ;restart the hash-table for quick references

;(show-error-grid xf-guess yf-guess step disp-for-foe)

(multiple-value-bind (found stuck xc yc err-c)
                (search-pool xf-guess yf-guess -1.0 bigstep smallstep disp-for-foe)   ;s
earch for minimum (multiple-value-setq (foe-locations final-size error-ratio)
                    (grow-foe-area-2 xc yc final-size growstep disp-for-foe))))
;expand area
      ;
      (values foe-locations final-size error-ratio))   ;return list of foe-locations (center i
s first)
)
;;;
;;;---------------------------------------------------------------------------
;;;---------------------------------------------------------------------------
;;;
(defun 1select-guide-vector 0(disp-list N)
   ;sort for lowest starting point vector
   (let ((disp-list-copy (copy-list disp-list)))
        (keep-n-elements (cl:sort disp-list-copy #'> :key #'third) N))
)
;;;
(defun keep-n-elements (a-list n)
   ;return only the first n elements of a-list
   (cond
        ((and (consp a-list) (> n 0))
            (cons (car a-list) (keep-n-elements (cdr a-list) (- n 1))))
        (t nil))
)
;;;---------------------------------------------------------------------------
;;;
(defun show-error-grid (xf-guess yf-guess step disp-for-foe)
        ;
        (do ((yf (- yf-guess 100) (+ yf step))) ((> yf (+ yf-guess 100)))
            (do ((xf (- xf-guess 100) (+ xf step))) ((> xf (+ xf-guess 100)))

(multiple-value-bind (status x-shift y-shift error feasible)
                                                                                                    (f
ind-opt-shift xf yf disp-for-foe)
                    (setq error (* 1.0 (sqrt error)))   ;(sqrt error)
                    (cond
```

```
                    ((>= 8.0 error)
                                (circle (+ ?*offset-hor* xf) (+ ?*offset-ver* yf)
                                    error 1 7 'frame-window))
                        (t
                                (circle (+ ?*offset-hor* xf) (+ ?*offset-ver* yf)
                                    8 2 7 'frame-window)))
            (unless feasible
                    (line (+ ?*offset-hor* xf -4) (+ ?*offset-ver* yf)
                        (+ ?*offset-hor* xf  4) (+ ?*offset-ver* yf) 1 7 'frame-window)
                    (line (+ ?*offset-hor* xf) (+ ?*offset-ver* yf -4)
                                        (+ ?*offset-hor* xf) (+ ?*offset-ver* yf  4) 1 7 'frame
-window)))))
)
;;;
;;;-----------------------------------------------------------------
;;;
(defun 1actual-rot0 (x1 y1 x2 y2)   ;disp-vector vertex)
   ;; determine the hor/vertical rotation necessary to move (x1 y1) into (x2 y2)
   ;;"disp-vector"= (xc yc xd yd)
   ;;"vertex" = (xrot yrot xpos ypos tag)
   (let ((xyf) (f-2 (float (* ?*focal-length* ?*focal-length*)))
         (y10-2)  (x20-2)           ;displacement on the axes
         (xc) (yc)
         (x1-2) (y1-2) (x2-2) (y2-2))

(setq
          x1-2 (* x1 x1)    y1-2 (* y1 y1)
          x2-2 (* x2 x2)    y2-2 (* y2 y2))
      (setq
          y10-2 (float (/ (* f-2 y1-2) (+ f-2 x1-2)))
          x20-2 (float (/ (* f-2 x2-2) (+ f-2 y2-2))))
      (setq xyf    (/ (* x20-2 y10-2) f-2))
      ;;find intersection of the two hyperbolae (setq xc (sqrt (/ (+ x20-2 xyf) (- 1.0 (/ xyf f-2)))))
      (setq yc (sqrt (/ (* y10-2 (+ f-2 (* xc xc))) f-2)))
      (write-line (format nil "~%  ~F    ~F" xc yc))
      (cond ((< x2 0)
             (setq xc (- xc))))
      (cond ((< y1 0)
             (setq yc (- yc))))
      (values
          (zl::/ (round (* 100.0 57.29578
                      (atan (* ?*focal-length*
                             (/ (- xc x1)
                                (+ f-2 (* xc x1)))))))  100.0)
          (zl::/ (round (* 100.0 57.29578
                      (atan (* ?*focal-length*
                             (/ (- y2 yc)
                                (+ f-2 (* yc y2)))))))  100.0) xc yc))
)
;;;-----------------------------------------------------------------
;;;
(defun 1actual-ro0 (x1 y1 x2 y2)   ;disp-vector vertex)
   ;; determine the hor/vertical rotation necessary to move (x1 y1) into (x2 y2)
   ;;"disp-vector"= (xc yc xd yd)
   ;;"vertex" = (xrot yrot xpos ypos tag)
   (let ((xyf) (f-2 (float (* ?*focal-length* ?*focal-length*)))
         (y10-2)  (x20-2)           ;displacement on the axes
         (xc 0.0) (yc 0.0)
         (x1-2) (y1-2) (x2-2) (y2-2))

(setq
          x1-2 (* x1 x1)    y1-2 (* y1 y1)
          x2-2 (* x2 x2)    y2-2 (* y2 y2))
      (setq
          y10-2 (float (/ (* f-2 y1-2) (+ f-2 x1-2)))
          x20-2 (float (/ (* f-2 x2-2) (+ f-2 y2-2))))
      (setq xyf    (/ (* x20-2 y10-2) f-2))
      ;;find intersection of the two hyperbolae
      (setq xc (* ?*focal-length* x2
                     (sqrt (/ (+ f-2 x1-2 y1-2) (- (* (+ f-2 x1-2) (+ f-2 y2-2)
) (* x2-2 y2-2)))))))
      (setq yc (* ?*focal-length* y1
                     (sqrt (/ (+ f-2 y2-2 x2-2) (- (* (+ f-2 y2-2) (+ f-2 x1-2)
```

```
) (* y1-2 x1-2)))))))

(write-line (format nil "~%  ~F  ~F" xc yc))
    (cond ((< x2 0)
           (setq xc (- xc))))
    (cond ((< y1 0)
           (setq yc (- yc))))
    (values
       (zl::/ (round (* 100.0 57.29578
             (atan (* ?*focal-length*
                   (/ (- xc x1)
                      (+ f-2 (* xc x1))))))) 100.0)
       (zl::/ (round (* 100.0 57.29578
             (atan (* ?*focal-length*
                   (/ (- y2 yc)
                      (+ f-2 (* yc y2))))))) 100.0) xc yc))
)
;;;-----------------------------------------------------------------
(defun lactual0 (x1 y1 x2 y2)    ;disp-vector vertex)
  ;; determine the hor/vertical rotation necessary to move (x1 y1) into (x2 y2)
  ;;"disp-vector"= (xc yc xd yd)
  ;;"vertex" = (xrot yrot xpos ypos tag)
  (let ((xyf) (f-2 (float (* ?*focal-length* ?*focal-length*)))
        (y10-2) (x20-2)                ;displacement on the axes
        (xc 0.0) (yc 0.0)
        (x1-2) (y1-2) (x2-2) (y2-2) (A) (B))

(setq
       x1-2 (* x1 x1)    y1-2 (* y1 y1)
       x2-2 (* x2 x2)    y2-2 (* y2 y2))
    (setq A (/ x2-2 (+ f-2 y2-2)))
    (setq B (/ y1-2 (+ f-2 x1-2)))
    (setq xc (sqrt
                 (* f-2 x2-2 (/ (+ f-2 x1-2 y1-2)
                                (- (* (+ f-2 y2-2) (+ f-2 x1-2)) (* x2-2 y1-2)
)))))
    (setq yc (sqrt
                 (* f-2 y1-2 (/ (+ f-2 y2-2 x2-2)
                                (- (* (+ f-2 x1-2) (+ f-2 y2-2)) (* y1-2 x2-2)
)))))

(write-line (format nil "~%  ~F  ~F" xc yc))

(setq xc (sqrt (* A f-2 (/ (+ 1.0 B) (- 1.0 (* A B))))))
    (setq yc (sqrt (* B f-2 (/ (+ 1.0 A) (- 1.0 (* A B))))))

(write-line (format nil "~%  ~F  ~F" xc yc))
    (cond ((< x2 0)
           (setq xc (- xc))))
    (cond ((< y1 0)
           (setq yc (- yc))))
    (values
       (zl::/ (round (* 100.0 57.29578
             (atan (* ?*focal-length*
                   (/ (- xc x1)
                      (+ f-2 (* xc x1))))))) 100.0)
       (zl::/ (round (* 100.0 57.29578
             (atan (* ?*focal-length*
                   (/ (- y2 yc)
                      (+ f-2 (* yc y2))))))) 100.0) xc yc))
)
;;;-----------------------------------------------------------------
(defun real-rot (x2 y2 theta phi)
  ;;apply the rotation specified by theta/phi to the image point x2 y2
  (let
    ( (xr) (yr) (finv (/ 1.0 ?*focal-length*))
      (hsin 0.0) (hcos 0.0) (vsin 0.0) (vcos 0.0)
      (denom 0.0))
    (setq
      hsin (sin (* ?*deg-rad* theta))
```

```
            hcos (cos (* ?*deg-rad* theta))
            vsin (sin (* ?*deg-rad* (- phi)))
            vcos (cos (* ?*deg-rad* (- phi))))
       (setq denom (+ (- (* finv x2 hsin vcos)) (* finv y2 vsin) (* hcos vcos)))
       (setq
          xr (/ (+ (* x2 hcos) (* ?*focal-length* hsin)) denom)
          yr (/ (+ (* x2 hsin vsin) (* y2 vcos) (- (* ?*focal-length* hcos vsin)))
                denom))
       (list xr yr))
)
;;;
;;;----------------------------------------------------------------
;;;
(defun shift (disp-orig x-shift y-shift)
   (let ((label) (x1) (y1) (x2) (y2)
         (hsin) (hcos) (vsin) (vcos) (denom) (disp-derot '()))
      ;;
      (dolist (disp-vec disp-orig)          ;disp-vec =(x1 y1 x2 y2)
         (multiple-value-setq (label x1 y1 x2 y2) (values-list disp-vec))
         (push
            (list label x1 y1 (+ x2 x-shift) (+ y2 y-shift)) disp-derot))
      disp-derot)
)

;;;;
(defun derotate (disp-orig theta phi)   ;theta,phi in DEGREES (not 10 * deg)
   (let
       ((hsin) (hcos) (vsin) (vcos) (denom) (disp-derot '()))
      ;;
      (dolist (disp-vec disp-orig)          ;disp-vec =(x1 y1 x2 y2)
         (multiple-value-bind (label x1 y1 x2 y2) (values-list disp-vec)
         (setq
            hsin (sin (* ?*deg-rad* theta))
            hcos (cos (* ?*deg-rad* theta))
            vsin (sin (* ?*deg-rad* (- phi)))
            vcos (cos (* ?*deg-rad* (- phi))))
         (setq denom
             (+ (- (* ?*finv* x2 hsin vcos)) (* ?*finv* y2 vsin) (* hcos vcos)))

(push
            (list label x1 y1
                 (z!::/ (round (* 10.0
                    (/ (+ (* x2 hcos) (* ?*focal-length* hsin)) denom))) 10.0)
                 (z!::/ (round (* 10.0
                    (/ (+ (* x2 hsin vsin) (* y2 vcos) (- (* ?*focal-length* hcos vsin)))
                       denom))) 10.0))
                disp-derot)))
      disp-derot)
)

;;;###############################################################
;;;######################## FUNCTIONS FOR OPTIMUM SHIFT
;;;###############################################################
;;;
(defvar
       *foe-hash* (make-hash-table :test #'equal :size 200)
)
;;;
(defun initialize-search ()
    (clrhash *foe-hash*)
)

;;;
(defun add-to-map (member x y sx sy err feasible)
    (setf (gethash (format nil "~4D-~4D" x y) *foe-hash*)
               (list member x y sx sy err feasible))
)

;;;
(defun get-from-map (x y)
        (let ((entry (gethash (format nil "~4D-~4D" x y) *foe-hash*)))
             (cond ((consp entry) (values-list entry))
                   (t nil)))
)
```

```
;;;
;;;------------------------------------------------------------
;;;
(defun find-opt-shift (xf yf disp-list)
  (let ((mu) (m) (x) (y) (sx) (sy) (error) (feasible))

;first try to find (xf,yf) in hash-table
        (multiple-value-setq (m x y sx sy error feasible) (get-from-map xf yf))

(when (null m)   ;NOT in table
          (multiple-value-setq (sx sy mu error) (compute-opt-shift xf yf disp-list))
          (setq feasible (check-feasible xf yf sx sy disp-list))
            (setq m 'P)
            (add-to-map m xf yf sx sy error feasible))          ;memorize as "probed"

(values m sx sy error feasible))
)
;;;
(defun compute-opt-shift (xf yf disp-list)
   ;first element in displacement list contains
   ;guide = (xg yg xg' yg')
   (let ((A2-sum 0) (B2-sum 0) (C2-sum 0)
         (AB-sum 0) (AC-sum 0) (BC-sum 0) (N 1) (label)
         (xg1) (yg1) (xg2) (yg2)                        ;guide displacement vector
         (xgf) (ygf)
         (xe) (ye) (length) (mu)
         (x-shift) (y-shift) (error)
         (Ai) (Bi) (Ci)))
   (multiple-value-setq (label xg1 yg1 xg2 yg2) (values-list (car disp-list)))
   ;(circle (+ ?*offset-hor* xg2) (+ ?*offset-ver* yg2) 3 2 7 'frame-window)
   (setq
      xgf (- xg1 xf)   ygf (- yg1 yf))
   ;
   (dolist (disp-vector (cdr disp-list))

(multiple-value-bind (label x1 y1 x2 y2) (values-list disp-vector)
        (setq
            xe (- x1 xf) ye (- y1 yf)
            length (sqrt (+ (* xe xe) (* ye ye))))
        (unless (zerop length)
          (setq
            xe (/ xe length)
            ye (/ ye length)                    ;(xe,ye) unit vector from FOE to Pi Ai (- (* ye xgf) (* xe ygf))
            Bi (* ye (- x2 xg2))
            Ci (* xe (- y2 yg2))
            A2-sum (+ A2-sum (* Ai Ai))
            B2-sum (+ B2-sum (* Bi Bi))
            C2-sum (+ C2-sum (* Ci Ci))
            AB-sum (+ AB-sum (* Ai Bi))
            AC-sum (+ AC-sum (* Ai Ci))
            BC-sum (+ BC-sum (* Bi Ci))
            N (+ N 1)))))

;evaluate sums
   (setq
     mu (/ (- AC-sum AB-sum) A2-sum)
     x-shift (zl::/ (round (* 10.0 (+ (- xf xg2) (* mu xgf)))) 10.0)
     y-shift (zl::/ (round (* 10.0 (+ (- yf yg2) (* mu ygf)))) 10.0)
     error   (zl::/ (round (* 10.0
                              (/ (+ (* mu mu A2-sum)
                                    (* 2.0 mu (- AB-sum AC-sum))
                                    (* -2.0 BC-sum)
                                    B2-sum C2-sum)
                                 N))) 10.0))
    (values x-shift y-shift mu (max 0.0 error)))   ;return multiple values
)

;;;
(defun check-feasible (xf yf x-shift y-shift disp-list)
   ;checks if this FOE (xf,yf) with the shift applied (x-shift,y-shift)
```

```
;is a feasible one
;
(let ((dx1) (dy1) (dx2) (dy2) (x1) (x2) (y1) (y2) (label)
            (tolerance 4) (min-shift -50) (max-shift 50))

;
  (cond
  ;((or (> xf 200) (< xf -200) (> yf 200) (< yf -200)) nil)
  ;
  ;((or (> x-shift max-shift) (< x-shift min-shift)
  ;     (> y-shift max-shift) (< y-shift min-shift)) nil)
  ;
  (t
        (dolist (disp-vector disp-list t)              ;returns t if passes through
        (multiple-value-setq (label x1 y1 x2 y2) (values-list disp-vector))
        (setq
            dx1 (- x1 xf)
            dy1 (- y1 yf)
            dx2 (- (+ x2 x-shift ) xf)
            dy2 (- (+ y2 y-shift ) yf))
              (setq                                                               ;m
ake dx2/dy2 longer
                dx2 (cond ((plusp dx2) (+ dx2 tolerance)) (t (- dx2 tolerance)))
                dy2 (cond ((plusp dy2) (+ dy2 tolerance)) (t (- dy2 tolerance))))
        (when
          (> (+ (* dx1 dx1) (* dy1 dy1)) (+ (* dx2 dx2) (* dy2 dy2)))
          (return nil))))))                          ;if still larger => imposs
ible shift
)
;;;------------------------------------------------------------------
;;;
(defun search-pool (x-guess y-guess threshold bigstep smallstep disp-list)
  ;starting from (x-guess,y-guess) the minimum of the foe-area is searched (let ((xc x-guess) (yc y-guess) (xn) (yn)
            (err-c) (err-n) (xs) (ys) (!!) (S) (S-from) (S-to)
            (stuck nil) (found nil) (feasible) (m)
            (xold nil) (yold nil))
;;;
;probe 1st point
(multiple-value-setq (m xs ys err-c feasible) (find-opt-shift xc yc disp-list))

(do ((step bigstep (/ step 2))) ((< step smallstep)) ;reduce step-size when stuck (setq xold xc yold yc)
    (setq S-from 0  S-to 7)                                                      ;f
irst probe all around
    (setq stuck nil)

(do ((it 1 (+ it 1))) (stuck)

(multiple-value-setq (S xn yn err-n feasible)        ;S..direction in which min
was fnd
              (min-neighbor xc yc err-c S-from S-to step feasible disp-list))
        (cond
        ((< err-n err-c)                         ;new minimum found
                (setq
                        xc xn   yc yn   err-c err-n)
                (when ?*show-foe-search*
                  (line (+ ?*offset-hor* xold) (+ ?*offset-ver* yold)
                        (+ ?*offset-hor* xc)   (+ ?*offset-ver* yc) 4 7 'frame-window
))
                (setq xold xc yold yc)

(cond
                ((<= err-c threshold)
                              (setq found t))
;we are inside the pool!
                (t
                        (cond
                        ((evenp S)
                                (setq
                                    S-from (mod (+ S 7) 8)                       ;search S
```

```
+-1
                                         S-to    (mod (+ S 1) 8)))
                       (t
                              (setq
                                         S-from (mod (+ S 6) 8)                      ;search S
+-2
                                         S-to    (mod (+ S 2) 8))))))))              ;from corn
er
                  (t
;NO new minimum found!
                    (setq stuck t)))))                                                ;STUCK outside the
pool!
      (values found stuck xc yc err-c))
)
;;;------------------------------------------------------------------------
(defun min-neighbor (xc yc err-c S-from S-to step feasible disp-list)
        ;probe the error-function at neighbors S-from including S-to
     ;if feasible = true (xc/yc was in a feasible area)
        ;     then if none of the neighbors are feasible then take min-neighbor
        ;                   else take the min-neigbor among the feasible
        ;     else
        ;                   take the min-neighbor among the feasible
     ;
     ;
        (let ((err-min 9999) (x-min) (y-min) (S-min) (m))
     ;
        (do ((n S-from (mod (+ n 1) 8)) (done nil)) (done)
            (let
                              ((xn (+ xc (* step (aref *nb-off* n 0))))
                               (yn (+ yc (* step (aref *nb-off* n 1)))))
                  ;get neighbors error
             (multiple-value-bind (m xs ys err-n n-feasible) (find-opt-shift xn yn disp-list)

(cond
                       ((and (not feasible) n-feasible)                                ;t
ransition into feasible region
                        (setq
                                   feasible t
                                   S-min    n
                                   err-min err-n
                                   x-min    xn
                              y-min    yn))
                       (t
                              (when (< err-n err-min)
                                 (setq
                                      S-min    n
                                      err-min err-n
                                      x-min    xn
                                 y-min    yn)))))

(setq done (= n S-to))))

(values S-min x-min y-min err-min feasible))
)
;;;------------------------------------------------------------------------
;;;
(defun outline (x-start y-start threshold step disp-list)
         ;outline the area with error<=threshold using raster-width "step"
         ;(x-start,y-start) is inside this area and one of its neighbors must
     ;be outside
         ;(1) set initial direction S
         ;(2) until back at the starting-point (x-start,y-start)
         ;       (2a) step in direction S
         ;       (2b) set new direction S
     ;
        (let ((S) (xc) (yc) (err-c))
     ;
          (multiple-value-setq (S xc yc err-c)           ;set initial direction & new point
               (init-outline x-start y-start threshold step disp-list))
        (filled-circle (+ ?*offset-hor* xc) (+ ?*offset-ver* yc)
               2 7 'frame-window)
```

```
          (do ((iter 1 (+ iter 1))) ((or (and (= xc x-start) (= yc y-start))))
              (multiple-value-setq (S xc yc err-c)
                    (continue-outline S xc yc threshold step disp-list))
          (filled-circle (+ ?*offset-hor* xc) (+ ?*offset-ver* yc)
                    2 7 'frame-window)))
)
;;;--------
;;;
(defun init-outline (x-start y-start threshold step disp-list)
       ;assumes that for at least one neighbor of (x-start,y-start) is > threshold
    ;searches neighbors for <= threshold to start outline in counter-clockwise
       ;order
       ;(1) probe neigbors in CCW order until one with error > threshold is found
       ;(2) from this neighbor find next in CCW order whose error is <= threshold
       ;         if none does exist, return (x-start,y-start).
       (let ((xc) (yc) (sx) (sy) (failure nil) (m))
;
;(1) find point OUTSIDE the area
;
       (unless                                                          ;if not fo
und during iteration
         (do ((n 0 (+ n 1)) (found nil)) ((or found (> n 7)) found)
         (let
                    ((xn (+ x-start (* step (aref *nb-off* n 0))))
                     (yn (+ y-start (* step (aref *nb-off* n 1))))
                     (ll) (err-n))
              ;get neighbors error
           (multiple-value-setq (m sx sy err-n) (find-opt-shift xn yn disp-list))
              (cond
                    ((> err-n threshold)                                ;point OUTSIDE area found
                      (setq
                            found t
                            S n))
                    (t (unless (check-feasible xn yn sx sy disp-list)   ;not feasible
                          (setq
;= outside
                            found t
                            S n))))))

(return-from init-outline (values nil nil nil nil)))     ;failure
;
;(2) find first point CCW inside area
;
       (unless
          (do ((i 0 (+ i 1))
               (n (mod (+ S 1) 8) (mod (+ n 1) 8))
               (found nil))
                       ((or found (> i 7)) found)
         (let
                    ((xn (+ x-start (* step (aref *nb-off* n 0))))
                     (yn (+ y-start (* step (aref *nb-off* n 1))))
                     (ll) (err-n))
              ;get neighbors error
           (multiple-value-setq (m sx sy err-n) (find-opt-shift xn yn disp-list))
              (when (<= err-n threshold)                                ;point OUTSIDE are
a found
                      (when (check-feasible xn yn sx sy disp-list)      ;feasible
                          (setq
                              found t
                              S n
                              xc xn
                              yc yn
                              err-c err-n)))))

(return-from init-outline (values nil nil nil nil)))     ;failure (values S xc yc err-c))
)
;;;--------
;;;
(defun continue-outline (S-prev x-start y-start threshold step disp-list)
       ;assumes that for at least one neighbor of (x-start,y-start) is > threshold
```

```
;searches neighbors for <= threshold to start outline in counter-clockwise
;order
;
    (let ((xc) (yc) (sx) (sy) (failure nil) (m))
;
;S-prev is the search direction which lead to (x-start,y-start)
;
    (unless
        (do ((i 0 (+ i 1))
             (n (mod (+ S-prev 7) 8) (mod (+ n 1) 8))
             (found nil))
            ((or found (> i 6)) found)
   (let
            ((xn (+ x-start (* step (aref *nb-off* n 0))))
             (yn (+ y-start (* step (aref *nb-off* n 1))))
             (ll) (err-n))
        ;get neighbors error
        (multiple-value-setq (m sx sy ll err-n) (find-opt-shift xn yn disp-list))
            (when (<= err-n threshold)                              ;point OUTSIDE are
a found
                (when (check-feasible xn yn sx sy disp-list)    ;feasible
                    (setq
                        found t
                        S n
                        xc xn
                        yc yn
                        err-c err-n)))))

(return-from continue-outline (values nil nil nil nil)))    ;failure (values S xc yc err-c))
)

;;;-------------------------------------------------------------------------
;;;
(defun grow-foe-area (x-start y-start size step disp-list)
    ;from the starting point grow the FOE area in the direction of smalles error
    ;until the nuber of raster points in "size" is reached
    ;
    (let ((xc) (yc) (sx) (sy) (m) (feasible)
          (err-c) (err-n) (pending-foes '()) (foe-locations '()) (N 1))

(multiple-value-setq (m sx sy err-c feasible)
                (find-opt-shift x-start y-start disp-list))

(push (list err-c x-start y-start sx sy feasible) pending-foes)

;
    (do ((i 1 (+ i 1)))                                 ;until the desired number of membe
rs
                ((or (> i size) (endp pending-foes)))
        (multiple-value-setq (err-c xc yc sx sy feasible)
                            (values-list (pop pending-foes)))

(add-to-map 'M xc yc sx sy err-c feasible)              ;mark as MEMBER in
hash-table
        (push (list xc yc sx sy err-c) foe-locations)           ;add to foe-locati
ons
        ;(circle (+ ?*offset-hor* xc) (+ ?*offset-ver* yc)
        ;        step 1 7 'frame-window)

;
        ;get error-values of neigbors
        (do ((nb 0 (+ nb 1))) ((> nb 7))
        (let
            ((xn (+ xc (* step (aref *nb-off* nb 0))))
             (yn (+ yc (* step (aref *nb-off* nb 1))))  (x) (y) (m))

;try to find (xn,yn) in hash-table
            (multiple-value-setq (m sx sy err-n feasible)
                            (find-opt-shift xn yn disp-list))
            (unless (or (equal m 'M) (equal m 'R))
                                                ;(xn,yn) has not been in t
```

```
he pending-foes
                            (add-to-map 'R xn yn sx sy err-n feasible)     ;mark as REMEMBER
ED.
                            (setq N (+ N 1))
                            (setq pending-foes                                                      ;i
nsert-in-order into list
                                    (cl:merge 'list
                                              pending-foes
                                              (list (list err-n xn yn sx sy feasible))
                                              #'< :key 'car))))))

(reverse foe-locations))   ;return list of foe-locations with center-point in first p
os.
)
(defun 1grow-foe-area-20 (x-start y-start size step disp-list)
        ;;from the starting point grow the FOE area in the direction of smallest error
        ;;the neighbors of the point with the lowest error on the xisting boundary are
        ;;added to the boundary
        ;
        (let ((xc) (yc) (sx) (sy) (m) (feasible)
              (N) (min-error) (max-error) (error-ratio)
              (error-limit)
              (err-c) (err-n) (pending-foes '()) (foe-locations '()) )
         ;
         (multiple-value-setq (m sx sy err-c feasible)
                    (find-opt-shift x-start y-start disp-list))
         (setq foe-locations (list (list x-start y-start sx sy err-c))
               pending-foes  (list (list err-c x-start y-start sx sy feasible))
               N 1
               min-error err-c
               max-error err-c
               error-limit  (* 4.0 err-c))                                                         ;s
et error limit ;(circle (+ ?*offset-hor* x-start) (+ ?*offset-ver* y-start)
    ;               step 1 7 'frame-window)

;grow until either:
            ;(a) the maximum area is reached (> size)
            ;(b) no more points could be added because the surrounding locations are p
rohibited
            ;(c) a sufficient error level has been reached by the border points (do ()                                                       ;until the desired number
of members
                        ((or (>= N size) (endp pending-foes)))
        (multiple-value-setq (err-c xc yc sx sy feasible)
                                    (values-list (pop pending-foes)))
;get one at the boundary ;
            ;get error-values of neigbors
            (do ((nb 0 (+ nb 1))) ((> nb 7))
             (let
                    ((xn (+ xc (* step (aref *nb-off* nb 0))))                    ,d
etermine where neighbor is
                     (yn (+ yc (* step (aref *nb-off* nb 1)))) (x) (y) (m))

(multiple-value-setq (m sx sy err-n feasible)
                                (find-opt-shift xn yn disp-list))
                    (unless (or
                            (not feasible)       ;point is not feasible
                            (equal m 'M)         ;point is already in the set
                            (> err-n error-limit))
                        (push (list xn yn sx sy err-n) foe-locations)          ;add neigh
bor to foe-locations
                ;(circle (+ ?*offset-hor* xn) (+ ?*offset-ver* yn)
                ;         step 1 7 'frame-window)

;(write-line (format nil "~%adding ~D ~D" xn yn))
                        (add-to-map 'M xn yn sx sy err-n feasible)                        ;m
``` ark as MEMBER

```
                          (setq min-error (min min-error err-n)
                                max-error (max max-error err-n)
                                N (+ N 1))

(setq pending-foes                                    ;i
nsert-in-order into list
                                (cl:merge 'list
                                          pending-foes
                                          (list (list err-n xn yn sx sy feasible))
                                          #'< :key 'car))))))

(setq foe-locations (reverse foe-locations))
              ;return list of foe-locations with center-point in first pos.
      (setq error-ratio (/ max-error min-error))
      (values foe-locations N error-ratio))

)
;;;
;;;-----------------------------------------------------------------
;;;
(defun lmark-foe-0area (foe-locations step wdw)
   (let ((half-step (floor (* 0.5 step))))

(dolist (foe foe-locations)
         (multiple-value-bind (xn yn sx sy err-c) (values-list foe)
            (shade-rectangle 2 (floor (* step ?*scale-hor*)) (floor (* step ?*scale-ve
r*))
               (floor (* (+ ?*offset-hor* (- xn half-step)) ?*scale-hor*))
               (floor (* (+ ?*offset-ver* (- yn half-step)) ?*scale-ver*)) 7 wdw)))

(unless (null foe-locations)                              ;mark center FOE
         (multiple-value-bind (xc yc sx sy err-c) (values-list (car foe-locations))
            (zl::send wdw :draw-filled-in-circle
               (floor (* (+ ?*offset-hor* xc) ?*scale-hor*))
               (floor (* (+ ?*offset-ver* yc) ?*scale-ver*)) 3 2)
            (zl::send wdw :draw-circle
               (floor (* (+ ?*offset-hor* xc) ?*scale-hor*))
               (floor (* (+ ?*offset-ver* yc) ?*scale-ver*))  3 7))))
)

(defun lmark-rotation 0(theta phi scale xc yc wdw-name)
   (let ((xcs (floor (* xc ?*scale-hor*))) (ycs (floor (* yc ?*scale-ver*))))
      (let ((xll (- xcs 50)) (yll (- ycs 50)) (xrr (+ xcs 50)) (yrr (+ ycs 50)))
         (filled-rectangle xll yll xrr yrr 2 wdw-name)
         (rectangle xll yll xrr yrr 1 7 wdw-name)
         (text (format nil "VEHICLE ROTATION") (- xcs 65) (- yll 15) xrr (- yll 15) 7 'TR10B
nil wdw-name)

(line  xll ycs xrr ycs 1 7 wdw-name)
         (do ((x xll (+ x 5))) ((> x xrr))                      ;draw x-scale
            (line x (- ycs 3) x (+ ycs 3) 1 7 wdw-name))
         (do ((x xll (+ x 25))) ((> x xrr))
            (line x (- ycs 6) x (+ ycs 6) 1 7 wdw-name))
         (text "+1.0" (- xll 23) (+ ycs 3) xrr (+ ycs 3) 7 'TR10 nil wdw-name)
         (text "-1.0" (+ xrr 3) (+ ycs 3) (+ xrr 100) (+ ycs 3) 7 'TR10 nil wdw-name)

(line  xcs yll xcs yrr 1 7 wdw-name)
         (do ((y yll (+ y 5))) ((> y yrr))                      ;draw y-scale
            (line (- xcs 3) y (+ xcs 3) y 1 7 wdw-name))
         (do ((y yll (+ y 25))) ((> y yrr))
            (line (- xcs 6) y (+ xcs 6) y 1 7 wdw-name))
         (text "+1.0 deg" (- xcs 22) (- yll 4) xrr (- yll 4) 7 'TR10 nil wdw-name)
         (text "-1.0" (- xcs 8) (+ yrr 15) xrr (+ yrr 15) 7 'TR10 nil wdw-name)

(line xcs ycs (+ xcs (round (* theta scale))) ycs 5 7 wdw-name)
         (line xcs ycs xcs (+ ycs (round (* phi scale))) 5 7 wdw-name))

)
)
;;;
(defun lmark-foe-specs 0(area error-ratio xc yc wdw-name)
   ;(text (format nil "FOE-LOCATIONS: ~D" area)
```

```
                              ;xc yc (+ xc 100) yc 6 'TR12B nil wdw-name)
       (text (format nil "FOE-RATIO = ~,1F" error-ratio)
                   xc (+ yc 20) (+ xc 100) (+ yc 20) 6 'TR12B nil wdw-name)
)
;;;
(defun 1mark-advancement 0(advance xc yc wdw-name)
    (if (null advance)

(text (format nil "ADVANCED ----")
                         xc yc (+ xc 100) yc 6 'TR12B nil wdw-name)

(text (format nil "ADVANCED ~,1F m" advance)
                         xc yc (+ xc 100) yc 6 'TR12B nil wdw-name))
)
;;;
(defun 1SET-MIN-MAX-DIST 0(disp-orig foe-locations step)
       ;add useful information to displacement data
       ;(locations and expansion with respect to the FOE-locations)
       (let* ((ext-list '()) (label) (x1) (y1) (x2) (y2) (d1) (d2) (N)
              (dx1) (dy1) (dx2) (dy2)
              (min-exp 3)
              (min-con 3)
              (margin (* step 0.5))
              (xf1 (first  (car foe-locations)))
              (yf1 (second (car foe-locations))))

(dolist (dv disp-orig)                                          ;got through list
of displacement vectors
              (let ((dmin most-positive-fixnum) (dmax most-negative-fixnum)
                    (above 'A) (below 'B) (left 'L) (right 'R) (expands 'E) (contrac
ts 'X)
                    (xf-min nil) (xf-max nil) (yf-min nil) (yf-max nil))

(multiple-value-setq (label x1 y1 x2 y2) (values-list dv))

(setq N 1)
              (dolist (foe foe-locations)                           ;go through all FOE-locati
ons
                    (multiple-value-bind (xf yf sx sy error) (values-list foe)

(setq dx1 (- x1 xf)                             ;dist foe -> X1
                          dy1 (- y1 yf)
                          dx2 (- x2 xf)                             ;dist foe -> X2
                          dy2 (- y2 yf))

i     (when (< x1 (+ xf margin)) (setq right 'X))     ;determine relativ
e
                    (when (> x1 (- xf margin)) (setq left  'X))     ;location to FOE-a
rea
                    (when (< y1 (+ yf margin)) (setq below 'X))
                    (when (> y1 (- yf margin)) (setq above 'X))

(setq d1 (sqrt (+ (* dx1 dx1) (* dy1 dy1)))
                          d2 (sqrt (+ (* dx2 dx2) (* dy2 dy2))))

(when (and (<= N 1) (< d2 (- d1 min-con))) (setq contracts 'C)
                    (write-line (format nil "contracts ~D ~F ~F ~F ~F ~D ~D ~F ~F"
                    label x1 y1 x2 y2  d1 d2 )))
                                             ;needs only to contract towards ON
E foe
         (setq N (+ N 1))
                    (cond
                         ((or (< (abs dx1) margin) (< (abs dy1) margin)) ;too close
to FOE-region
                                    (setq dmin 0   dmax 9999
                                                expands    'X))
                     (t
                              (when (< d1 dmin )
;determine min/max dist of X1
                                    (setq dmin d1
                                                xf-min xf
;closest FOE to x1/y1
```

```
                                                        yf-min yf))
                           (when (> d1 dmax )
;determine min/max dist of X1
                              (setq dmax  d1
;closest FOE to x1/y1                xf-max xf
                                     yf-max yf))

(when (< d2 (+ d1 min-exp)) (setq expands 'X))))))
                                                       ;must expand from every foe
             (push
                (list label left right above below expands contracts
                             x1 y1 x2 y2 xf-min yf-min xf-max yf-max)
                ext-list)))
         ext-list)
)
;;;
(defun 1speed-above-ground0 (disp-list foe-locations min-length)
        ;1st element of disp-list is the guiding vector
        ;1st element of foe-locations is the most trustworthy FOE ;(1) align camera coordinate system with world coordinate system such that the FOE
        ;points in the direction of the world's Z-axis (multiple-value-bind (xf yf) (values-list (car foe-locations))
    (let* ((focal-length 549)   ;40 mm lens ?
                  (disp-for-speed (select-speed-vectors disp-list xf yf min-length)))

(cond
                ((consp disp-for-speed)
;some disp-vectors suit
                  (multiple-value-bind (theta phi) (actual-rot xf yf 0 0)           ;a
lign foe with Z-axis
                  (let*
                      ((hsin (sin (* ?*deg-rad* theta)))
                       (hcos (cos (* ?*deg-rad* theta)))
                       (vsin (sin (* ?*deg-rad* phi)))
                       (vcos (cos (* ?*deg-rad* phi)))
                        (Z1) (Z2) (dZ-sum 0.0) (W-sum 0.0))

(dolist (dv disp-for-speed)               ;loop to evaluate more tha
n one vector later
                            (multiple-value-bind (label x1 y1 x2 y2 length) (values-li
st dv)

(setq Z1 (/ (+ (* x1 hsin) (- (* y1 hcos vsin))) (* focal-l
ength hcos vcos))
                                              (+ (* y1 vcos) (* focal-length vsi
n))))
                               (setq Z2 (/ (+ (* x2 hsin) (- (* y2 hcos vsin))) (* focal-l
ength hcos vcos))
                                              (+ (* y2 vcos) (* focal-length vsi
n))))
                               (setq dz-sum (+ dz-sum (* length ?*above-ground* (- Z1 Z2)
))
                                     W-sum (+ W-sum length))))
                           (values (/ dz-sum W-sum) disp-for-speed))))      ;return estimated
distance traveled
                (t nil))))
;and disp-vectors used
)
;;;
(defun 1select-speed-vectors 0(disp-list xf yf min-length)
    (let ((speed-list '()))
       (setq min-length (* min-length min-length))
       (dolist (dv disp-list)
              (multiple-value-bind (label x1 y1 x2 y2) (values-list dv)
                 (let ((length (+ (* (- x2 x1) (- x2 x1)) (* (- y2 y1) (- y2 y1)))))
                     (when (and (>= length min-length) (> y1 (+ yf 50)))
                         (push (list label x1 y1 x2 y2 (sqrt length)) speed-list)))
))
```

```
        (sort speed-list #'> :key #'car))       ;sort for longest vectors
)
;;;
(defun 1mark-speed-vectors0 (disp-reference wdw-name)
    (dolist (dv disp-reference)
        (multiple-value-bind (label x1 y1 x2 y2) (values-list dv)
          (filled-circle (round (* (+ x2 ?*offset-hor*) ?*scale-hor*))
                         (round (* (+ y2 ?*offset-ver*) ?*scale-ver*)) 3 7 wdw-name)))
)

;;;--------------------------------------------------------------------------
    ;#L(zl::load "FRODO:>burger>DRIVE>create>foefun.lisp" 'au nil)
(defun doit ()
   (let ((disp '((1 91 -36 135 -6) (2 135 -6 263 80)) )
         (foe '((29 -97 0 0 0))))
     (1speed-above-ground0 disp foe))
)

FRODO:>sklee>DRIVE>reason>getdata.art.7

;;; -*- Mode: ART; Base: 10; Package: ART-USER; syntax: common-lisp; Fonts: CPTFONT; -*-
;;;

;;;################################################################
;;;######################## R U L E S - READING DATA
;;;################################################################
;;;
(defrule read-displacement-data
    (step read-data)
    (cur-time ?ct ?)
    =>
    #L(let ((data (read-new-facts (make-disp-file-name ?ct))))

(cond ((null data) (assert (end-of-data ?ct)))   ;file was not found
              (t  (eval data))))                         ;assert those facts
)
;;;
;;;################################################################
;;;######################## R U L E S - REMOVING DATA
;;;################################################################
;;;
(defrule forget-displacement-data
    (declare (salience 10))
    (step read-data)
    (cur-time ?ct ?past)
    (split
        (?to-delete <- (dv ?past $?))

(?to-delete <- (foe-est $? ?past))

(?to-delete <- (rot-est $? ?past))

(?to-delete <- (foe-locations ?past $?)))
    =>
    (retract ?to-delete)
)

FRODO:>sklee>DRIVE>globals.art.42

;;; -*- Mode: ART; Base: 10; Package: ART-USER; syntax: common-lisp; -*-
;;;
;;;
;;;--------------------------------------------------------------------------
(defconstant *edge-directory* "FRODO:>ob_detec>pr1")
(defconstant *snap-directory* "FRODO:>ob_detec>pr1")
(defconstant *disp-directory* "FRODO:>ob_detec>pr1")
;;;
(defglobal
```

```
?*points-list* = '()
?*points-list-2* = '()
?*disp-orig* = '()              ;original (observed) displacement vectors
?*disp-derot* = '()             ;derotated displacement vectors
?*disp-ext* = '()
?*disp-perfect* = '()
?*disp-stat* = '()
?*disp-mob* = '()
?*disp-reference* = '()         ;displacement vectors used for measuring speed over ground
?*foe-locations* = '()
)
;;;
(defglobal
   ;single frame window
   ?*frame-window* = nil
   ?*frame-window-1* = nil
   ?*frame-window-2* = nil
   ?*frame-wdw-stream* = nil
   ?*frame-wdw-stream-1* = nil
   ?*frame-wdw-stream-2* = nil
   ?*frame-array* = nil
   ?*frame-array1* = nil
   ?*frame-origin-x* = 10
   ?*frame-origin-y* = 100

?*hor-max* = 512
   ?*ver-max* = 442 ;448

?*hor-size* = (+ ?*hor-max* 0)    ;512
   ?*ver-size* = (+ ?*ver-max* 42)   ;490
)
;;;
(defglobal
   ?*show-foe-search* = nil
)
;;;
(defglobal
   ;multiple frame windows
   ?*num-of-interpretations* = 9
   ?*wdw-names*    = #L(make-array '(15) :initial-contents
                         '( frame-0 frame-1 frame-2 frame-3 frame-4
                            frame-5 frame-6 frame-7 frame-8 frame-9
                            frame-10 frame-11 frame-12 frame-13 frame-14))
   ?*wdw-streams* = #L(make-array '(15))
   ?*wdw* = nil
   ?*x-size* = 768      ;for 1.5x scale images
   ?*y-size* = 663
   ?*x-disp-size* = (+ ?*x-size* 0) ; 768
   ?*y-disp-size* = (+ ?*y-size* 42) ; 714
   ?*scale-hor*  = (/ ?*x-size* 512.0)
   ?*scale-ver*  = (/ ?*y-size* 442.0)
   ?*max-frame-number* = 50
   ?*end-of-simulation* = ?*max-frame-number*
)
;;;
(defglobal
   ;vehicle data
   ?*above-ground* = 3.94      ;meters
   ?*focal-length* = 505.3     ;in pixels
   ?*finv* = #L(/ 1.0 ?*focal-length*)
   ?*offset-hor* = 247          ;center of the image plane
   ?*offset-ver* = 201
   ?*hor-rot* = 0.0             ;pan
   ?*ver-rot* = 0.511           ;tilt
)
;;;
(defglobal
   ;constants for perspective transformation
   ?*deg-rad* = 0.01745329252
   ?*rad-deg* = 57.2957795
   ?*sin-hor* = (sin (* (/ pi 180.0) ?*hor-rot*))   ;horizontal sine
```

```
    ?*cos-hor* = (cos (* (/ pi 180.0) ?*hor-rot*))    ;horizontal cosine
    ?*sin-ver* = (sin (* (/ pi 180.0) ?*ver-rot*))    ;vertical sine
    ?*cos-ver* = (cos (* (/ pi 180.0) ?*ver-rot*))    ;vertical cosine
)
;;;
(defglobal
    ;retention time
    ?*retention-time* = 2

;graphic details
    ?*mark-radius* = 5
)
;;;
(defglobal
    ?*stat-count* = 0
)
;;;

FRODO:>sklee>DRIVE>z-windows.lisp.32

;;; -*- Mode: LISP; Syntax: zetalisp; Fonts: CPTFONT,CPTFONTB; Package: au; Base: 10;
-*-
;;;
;;;
;;;
(defvar *frame-wdw* nil
)
;;;
(defvar *frame-bit-arr* nil
)
;;;
(defvar *frarr347689654334* nil
)
;;;
(defvar *arr* nil
)
(defun lmake-edge-file-name 0(frame)
     (zl::format nil "~A>edge>f~D.wdw" *edge-directory* frame)
)
;;;
(defun lmake-snap-file-name 0(frame)
     (zl::format nil "~A>snap>f~D.art" *snap-directory* frame)
)
;;;
(defun lmake-disp-file-name 0(frame)
     (zl::format nil "~A>disp>f~D.art" *disp-directory* frame)
)
;;;

;;;
(defun lcreate-frame-window 0(label h-pos v-pos h-size v-size)
    ;creates a graphics window and returns it as an object
    ;label must be a string
    (let ((wdw
           (tv:make-window
                  'tv:window
                  ':position (list h-pos v-pos)
                  ':inside-size (list h-size v-size)
                  ':label (list ':string label)
                  ':blinker-p nil
                  ':save-bits t
                  ':expose-p t)))
       wdw)
)
;;;
(defun lcreate-shadow-array 0(wdw)
    ;creates an array which can hold the entire window
    (multiple-value-bind (h-size v-size)
                (zl::send wdw :inside-size)
        (tv:make-sheet-bit-array wdw h-size v-size))
```

```
)
;;;
(defun 1copy-window-to-array0 (wdw arr)
  ;copies the contents of wdw to arr
  (zl::send wdw :expose)
  (multiple-value-bind (h-size v-size)
            (zl::send wdw :inside-size)
    (zl:send wdw
        :bitblt-from-sheet
            tv:alu-seta
            h-size v-size 0 0 arr 0 0))
)
;;;
(defun 1copy-array-to-window 0(wdw arr)
  ;copies the contents of arr to wdw
  (zl::send wdw :expose)
  (multiple-value-bind (h-size v-size)
            (zl::send wdw :inside-size)
    (zl:send wdw
        :bitblt
            tv:alu-seta
            h-size v-size arr 0 0 0 0))
)
;;;
(defun zoom1-array-to-window 0(wdw arr)
  ;zooms the contents of arr to wdw
  (zl::send wdw :expose)
  (let ((a arr) (b ?*frame-array1*))
        (declare (sys:array-register-1d a b))
        (do ((i 0 (+ i 1))) ((>= i ?*y-size*))
            (let ((k (* i ?*x-size*))
                  (l (* (floor (// i ?*scale-ver*)) ?*hor-max*)))
                (do ((j 0 (+ j 1))) ((>= j ?*x-size*))
                    (setf (sys:%1d-aref b (+ j k))
                          (sys:%1d-aref a (+ (floor (// j ?*scale-hor*)) l)))))))
  (multiple-value-bind ( h-size v-size )
            (zl::send wdw :inside-size)
    (zl:send wdw
        :bitblt
            tv:alu-seta
            h-size v-size ?*frame-array1* 0 0 0 0))
)
;;;
(defun 1dump-shadow-array0 (arr file-name)
  (sys:dump-forms-to-file file-name
        (list
            (list 'setq '*frarr347689654334* arr))))
)
;;;
(defun 1load-shadow-array0 (filename)
  (zl::load filename)
  *frarr347689654334*
)
;;;
(defun 1clear-zl-window0 (wdw)
    (zl::send wdw :expose)
    (zl::send wdw :clear-window)
)
;;;
(defun 1shade-rectangle 0(spacing width height x0 y0 alu wdw)
    (zl::send wdw :draw-rectangle width height x0 y0 7)  ;clear to black (do ((x x0 (+ x 1)) (w 0 (+ w 1))) ((> w width))
        (unless (zerop (mod x spacing))
            (zl::send wdw :draw-line x y0 x (+ y0 height) 2)))     ;erase vertical line (do ((y y0 (+ y 1)) (h 0 (+ h 1))) ((> h height))
        (unless (zerop (mod y spacing))
            (zl::send wdw :draw-line x0 y (+ x0 width) y 2 )))     ;erase horizontal line
).
;;;
(defun 1store 0(wdw arr)
```

```
    (copy-window-to-array wdw arr)
    (dump-shadow-array arr "FRODO:>burger>drive>data>sequ2>edge.wdw")
)
;;;
(defun 1retrieve 0(frame wdw arr)
    (setq arr
        (load-shadow-array (make-edge-file-name frame)))
    (zl::send wdw :expose)
    (zoom-array-to-window wdw arr)
)
;;;
(defun 1show-labeled-disp 0(disp-list wdw-stream solid)
    ;
    (dolist (d disp-list)
        (multiple-value-bind (label x1 y1 x2 y2) (values-list d)
            (setq x1 (round (* (+ ?*offset-hor* x1) ?*scale-hor*))
                  y1 (round (* (+ ?*offset-ver* y1) ?*scale-ver*))
                  x2 (round (* (+ ?*offset-hor* x2) ?*scale-hor*))
                  y2 (round (* (+ ?*offset-ver* y2) ?*scale-ver*)))
        (zl::send wdw-stream :draw-filled-in-circle x2 y2 2 2)    ;erase circle area
        (zl::send wdw-stream :draw-circle x2 y2 2 7)              ;draw outer circle
        (cond (solid
                (zl::send wdw-stream :draw-line x1 y1 x2 y2 7))
              (t (zl::send wdw-stream :draw-dashed-line x1 y1 x2 y2 7 5)))))
)

;;;
;;;
;;;
(defun 1ascii-to-window0 (filename wdw n)
    ;
    (let ((instring (make-string 100)) (pix) (x))
        (zl::send wdw :expose)
        (with-open-file (infile filename)

(do ((i 0 (+ i 1))) ((or (null instring) (>= i n)))
                (setq instring (read-line infile nil nil nil)
                      pix 0)

(do ((j 0 (+ j 1))) ((or (>= j 86) (null instring)))
                    (setq x (- (char-code (char instring j)) 48))

(do ((b 0 (+ b 1))) ((>= b 6))
                        (when (logbitp b x)
                            ;(point (+ b (* j 6)) i 1 7 wdw))

(zl::send wdw :draw-point (+ b (* j 6)) i
                                                      tv:alu-seta ))))))))

)
;
;;;
(defun transfer-edge-images (first last)
    (let ((wdw) (arr)
          (help-file
            (format nil "FRODO:>burger>DRIVE>data>sequ2>edge>fxxx.txt")))
                ;"frodo:>hatem>edge-test.txt")))

;create window
    (setq wdw (create-frame-window "TWO-CAR SEQUENCE" 0 0 512 512))
    (setq arr (create-shadow-array wdw))

(do ((i first (+ i 1))) ((> i last))
        (let
            ((srcsip-file
                (format nil
                    ;"srcsip://dyno1//drive//data//twocar//time2100//f~0//edge.txt"
                    ;"altura://mnt1//users//burger//edge"
                        "isavax://n//altura//mnt1//users//jming//temp.asc"
                    ))
```

```
              (local-file
                 (format nil "FRODO:>jming>temp.wdw"))
              (label
                 (format nil "TEST IMAGE")))

(clear-zl-window wdw)
        (zl::send wdw ':draw-string
                  (zl::string (format nil "TEST IMAGE")) 60 40)

;get edge-file from SRCSIP
        (zl::copyf srcsip-file help-file)

;(zl::send wdw ':set-label
        ;     (list ':string
        ;           (zl::string (format nil "SEQUENCE 2    FRAME ~D" i))))

;display it in window
        (ascii-to-window help-file wdw 512)

;dump window to local edge.wdw file
        (copy-window-to-array wdw arr)
        (dump-shadow-array arr local-file)

;delete help-file
        ;(zl::deletef help-file)
        )))
)
;;;
(defun redisplay-edge-images (first last)
    (let ((wdw) (arr))

;create window
    (setq wdw (create-frame-window "TWO-CAR SEQUENCE" 0 0 512 512))
    (setq arr (create-shadow-array wdw))

(do ((i first (+ i 1))) ((> i last))
      (let
           ((local-file (make-edge-file-name i)))
             ;(format nil "FRODO:>burger>DRIVE>data>sequ2>edge>f~D.wdw" i)))

;retrieve image from local edge.wdw file
        (setq arr (load-shadow-array local-file))
        (copy-array-to-window wdw arr)
        )))
)
;;;
(defun redisplay-marked-edge-images (first last)
    (let ((wdw1) (wdw2) (arr) (snapshot) (local-file))

;create window
    (setq wdw1 (create-frame-window "TWO-CAR SEQUENCE" 10 10 512 512))
    (setq wdw2 (create-frame-window "TWO-CAR SEQUENCE" 540 10 512 512))
    (setq arr (create-shadow-array wdw1))

(do ((i first (+ i 1))) ((> i last))
      (let ((wdw
              (cond ((oddp i) wdw1) (t wdw2))))
        (setq local-file (make-edge-file-name i))
        ;retrieve image from local edge.wdw file
        (setq arr (load-shadow-array local-file))
        (copy-array-to-window wdw arr)
        (setq snapshot
            (read-back-snapshot i))
        (mark-list-of-points snapshot i wdw))
        ))
)
;;;
;;;========================
;;;
(defun trace-points (start end first-point)
   (zl::pkg-goto 'au)
   (let ((wdw) (arr) (image-file)
         (frame)
```

```
             (point-list '()) (snapshot '()))

(setq wdw (create-frame-window "TWO-CAR SEQUENCE" 0 0 512 512)
              arr (create-shadow-array wdw))
        (zl::send wdw :expose)
        (tv:with-mouse-and-buttons-grabbed-on-sheet (wdw)
            (tv:mouse-set-blinker-definition
                ':character 2 6 ':on ':set-character 20 'fonts:mouse)
            (setq tv:who-line-mouse-grabbed-documentation
                "IMAGE: L:forward  M:skip  R:backward        CORNER: L:next point  M:exit
R:delete this point")
    ;trace point after point (do ((point first-point (+ point 1)) (done nil)) (done)         ;loop thru points
        (setq point-list '())
        (setq frame start)

(do ((new-point nil))
            ((or done new-point))              ;loop through frames ;retrieve image from local edge.wdw file
        (setq image-file
            (make-edge-file-name frame))
            ;(zl::string-append
            ;*edge-directory* "f"(zl::format nil "~D" frame) ".wdw"))

(setq arr (load-shadow-array image-file))
        (copy-array-to-window wdw arr)
        (display-point-number wdw point)

;retrieve previous point marks in this frame
        (setq snapshot
            (read-back-snapshot frame))

;display previous point marks
        (mark-list-of-points snapshot frame wdw)
        ;display current marks (if any)
        (mark-list-of-points point-list frame wdw)

(multiple-value-bind (code x y) (tv:wait-for-mouse-button-down)
            (case tv:mouse-last-buttons
                ((1)  ;left button
                 (cond
                  ((in-number-field x y)              ;clicked inside point-number
                   (cond ((endp point-list)
                          (write-line (format nil "*** NO TRACE SO FAR ***")))
                         (t
                          ;forward to new point
                          (write-out-list-of-points point-list)
                          (setq new-point t))))
                  (t
                   (unless (endp point-list)
                     (when (= (third (car point-list)) frame)
                       (pop point-list)))     ;remove point for previous mark
                   ;mark point
                   (push (list 'ip point frame x y) point-list)
                   (mark-single-point point x y wdw)
                   (write-line (format nil "~A" point-list))
                   (cond ((< frame end)
                          ;go forward to next frame
                          (setq frame (+ frame 1)))
                         (t
                          (write-out-list-of-points point-list)
                          (setq new-point t))))))
                ((2)  ;middle button
                 (cond
                  ((in-number-field x y)              ;clicked inside point-number
                   ;terminate from point-tracking
                   (unless (endp point-list)          ;first save last point
                     (write-out-list-of-points point-list))
                   (setq done t))
                  (t
```

```
                    ;if point has not been marked yet, just go forward
                    (cond ((and (endp point-list) (< frame end))
                           (setq frame (+ frame 1)))
                    ;else give error message
                          (t (write-line (format nil "*** NO SKIPPING NOW ***")))))))))

((4)   ;right button
              (cond
               ((in-number-field x y)              ;clicked inside point-number
                ;delete this point
                (setq point-list '())
                (setq frame start))
               (t
                ;step one frame back
                (unless (<= frame start)
                    (setq frame (- frame 1))))))))

))))))
)
(defun in-number-field (x y)
       (and (> x 470) (< y 30))
)
;;;
(defun display-point-number (wdw pn)
  (let ((xl 40) (yl 30))
    (zl::send wdw ':draw-rectangle xl yl (- 512 xl) yl tv:alu-andca)
    (zl::send wdw ':draw-line (- 512 xl) 0 (- 512 xl) yl)
    (zl::send wdw ':draw-line (- 512 xl) yl 512 yl)
    (zl::send wdw ':draw-string
         (zl::string (format nil "P~D" pn)) (+ (- 512 xl) 5) (- yl 5)))
)
;;;
(defun write-out-list-of-points (point-list)
        ;append to frame-file
    (let ((snapshot))

(dolist (point point-list)
       (multiple-value-bind (ip pid frame x y)
               (values-list point)
          (setq snapshot
                (read-back-snapshot frame))          ;pass filename here
          (cond
            ((null snapshot)
             (write-out-snapshot (list 'assert point) frame))
            (t
             (write-out-snapshot (cons 'assert (cons point snapshot)) frame))))))
)
;;;
(defun write-out-snapshot (snapshot frame)
   (let ((snap-file
          (make-snap-file-name frame)))
     (with-open-file
            (outfile snap-file :direction :output
                     :if-exists :new-version
                     :if-does-not-exist :create)
            (format outfile "~A ~%" snapshot)))
)
;;;
(defun read-back-snapshot (frame)
   (let ((frame-file (make-snap-file-name frame))
         (exist) (old-snapshot nil))
     (setq exist (probe-file frame-file))
     (cond
      ( exist
         (with-open-file
              (infile frame-file :direction :input
                :if-does-not-exist nil)
             (setq old-snapshot (read infile)))
         (cdr old-snapshot))             ;eliminate "assert" from beginning of list
      (t nil)))
)
```

```
;;;
(defun mark-single-point (pt x y wdw)
    (let ((X (floor (* x ?*scale-hor*))) (Y (floor (* y ?*scale-ver*))))
      (cond ((< pt 100)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 10) (+ Y -10) 10 tv:alu-andca)
             (zl::send wdw ':draw-circle           (+ X 10) (+ Y -10) 10 tv:alu-ior)
             (multiple-value-bind (txt xc yc)
                (center-text X (+ Y -20) (+ X 20) Y (format nil "~D" pt) 'cptfont)
                (zl::send wdw ':draw-string txt xc yc)))
            ((< pt 1000)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 15) (+ Y -15) 15 tv:alu-andca)
             (zl::send wdw ':draw-circle           (+ X 15) (+ Y -15) 15 tv:alu-ior)
             (multiple-value-bind (txt xc yc)
                (center-text X (+ Y -30) (+ X 30) Y (format nil "~D" pt) 'cptfont)
                (zl::send wdw ':draw-string txt xc yc)))
            ((< pt 10000)
             (zl::send wdw ':draw-triangle X Y  (+ X 10) Y  X (+ Y -10)  tv:alu-andca)
             (zl::send wdw ':draw-line X Y X (+ Y -10) tv:alu-ior)
             (zl::send wdw ':draw-line X Y  (+ X 10) Y tv:alu-ior)

(zl::send wdw ':draw-filled-in-circle (+ X 20) (+ Y -20) 20 tv:alu-andca)
             (zl::send wdw ':draw-circle           (+ X 20) (+ Y -20) 20 tv:alu-ior)
             (multiple-value-bind (txt xc yc)
                (center-text X (+ Y -40) (+ X 40) Y (format nil "~D" pt) 'cptfont)
                (zl::send wdw ':draw-string txt xc yc)))))
)
;;;
(defun mark-list-of-points (point-list frame wdw)
    (dolist (assertion point-list)
      (multiple-value-bind (ip pid fr x y) (values-list assertion)
        (when (= frame fr) (mark-single-point pid x y wdw)))))
)
;;;

(defun relabel-snapshots (first-frame)
    (let ((N 1) (old-snapshot) (new-snapshot) (old-label-list '())
          (new-label) (old-new))

(do ((frame first-frame (+ frame 1)) (done nil ()))
          ((or (> frame (+ first-frame 100)) done))

(setq old-snapshot (read-back-snapshot frame))
        (write-line (format nil "~%reading frame ~D  ~A" frame old-snapshot))
        (cond
          ((consp old-snapshot)                    ;does exist (setq
             old-snapshot (reverse old-snapshot)
             new-snapshot '())
           (dolist (point old-snapshot)
             (multiple-value-bind (ip old-label time x y)
                                  (values-list point)

(setq old-new (find old-label old-label-list :key 'car))
               (cond                               ;this is a new label
                 ((null old-new)
                   (setq new-label N
                         N (+ N 1))
                   (push (list old-label new-label) old-label-list)
                   (write-line (format nil "new ~D -> ~D" old-label new-label)))
                 (t                               ;this is an old label
                   (setq new-label (second old-new))
                   (write-line (format nil "old ~D -> ~D" old-label new-label))))

(push (list ip new-label time x y) new-snapshot)))
```

```
(write-out-snapshot (cons 'assert new-snapshot) frame))

(t (setq done t)))))          ;does not exist
)

; #|(zl::load "FRODO:>burger>DRIVE>z-windows.lisp" 'au nil);
; #L(art-load "FRODO:>burger>DRIVE>data>sequ2>trace>point1.art")
```

We claim:

1. An imaging device capable of determining its own self-motion from its imaging, comprising:
   imaging means for detecting a sequence of images in a field of view;
   token tracking means, connected to said imaging means, for determining two-dimensional displacement vectors of selected tokens for each consecutive pair of images, and wherein said token tracking means tracks stationary parts of a visual environment in the images, using two-dimensional, references such as corner points, contour segments, region boundaries as references, from image to image, wherein the two-dimensional displacement vectors are the result of camera motion;
   seeker means, connected to said token tracking means, for selecting candidate locations for focus of expansion under forward translation of said imaging means and for focus of contraction under backward translation of said imaging device, for forming a connected image region of the candidate locations and a range of corresponding rotations, and for outputting focus of expansion or contraction and image rotation estimates; and
   optimal rotation means, connected to said token tracking means and to said seeker means, for determining optimal three-dimensional rotation angles plus an error value for a selected candidate location for focus of expansion or contraction.

2. Apparatus of claim 1 wherein:
   said seeker means receives signals conveying the two-dimensional displacement vectors from said token tracking means; and
   said optimal rotation means receives signals conveying the two-dimensional displacement vectors from said token tracking means and signals conveying a single focus of expansion or contraction location from said seeker means, and sends the determined optimal three-dimensional rotation angles (pan and tilt) plus the error value for the single focus of expansion or contraction location, to said seeker means.

3. Apparatus of claim 2 wherein said optimal rotation means determines the optimal three-dimensional rotation angles (an and tilt) for the single focus of expansion (direction of heading) or contraction location, by simulating the effects of reverse imaging means rotations upon a given set of displacement vectors from said token tracking means, and thus virtually rotating said sensing device until a modified displacement field approaches closest to a radial expansion pattern relative to the selected candidate location for focus of expansion or contraction, the optimal three-dimensional (pan and tilt) rotation angles indicating needed reverse rotation of said imaging means and the error value, wherein said error value is a deviation from a radial displacement field.

4. Apparatus of claim 3 wherein said optimal rotation means determines velocity of said imaging device.

5. An imaging system capable of determining its self-motion from its imaging, comprising:
   derotation means for derotating two-dimensional displacement vectors from consecutive pairs of two-dimensional images to remove rotational effects of said imaging system;
   first computing means, connected to said derotation means, for computing a fuzzy focus of expansion (FOE) from the two-dimensional displacement vectors, wherein the fuzzy FOE is a two-dimensional region of possible focus-of-expansion locations on a two-dimensional image; and
   second computing means, connected to said derotation means, for computing self-motion parameters of said imaging system, from the fuzzy FOE.

6. System of claim 5 further comprising:
   sensing means for acquiring the two-dimensional images; feature detection means, connected to said sensing means, for detecting, extracting and tracking features in the two-dimensional images; and
   third computing means, connected to said feature detection means, for computing the two-dimensional displacement vectors from the features.

7. An imaging system in an environment, capable of determining its self-motion from its imaging, comprising:
   computing means for computing possible focus of expansion (FOE) locations within images of said imaging system, from two-dimensional displacement vectors;
   combining means, connected to said computing means, for combining possible FOE locations, thereby resulting in a fuzzy FOE that indicates approximate direction of heading and amount of rotation in space of said imaging system; and
   derotation means, connected to said computing means, for removing rotation of said imaging system from the images so as to output derotated two-dimensional displacement vectors to said computing means.

8. System of claim 7 further comprising:
   acquisition means for acquiring the successive images of the environment of said imaging system;
   selecting means, connected to said acquisition means, for selecting features from the images; and
   matching means, connected to said selecting means and to said computing means, for matching the features of the successive images, thereby resulting in the two-dimensional displacement vectors between distinct features of the successive images.

9. A method for determining self-motion of an imaging system in an environment, comprising:
   computing a focus of expansion (FOE) location from two-dimensional displacement vectors of successive two-dimensional images;
   computing a fuzzy FOE region that is a qualitative indication the FOE location, wherein the fuzzy FOE region is an area of possible FOE locations for each image;
   determining an approximate direction of heading and amount of rotation of said imaging system, relative to its own reference coordinate system, from the fuzzy FOE; and removing the effects of rotation of said imaging system from the displacement vectors.

10. Method of claim 9 further comprising:
acquiring the successive two-dimensional images of the environment of said imaging system;
selecting features in the images; and
determining the two-dimensional displacement vectors for the features of each pair of the successive images.

* * * * *

UNITED STATES PATENT AND TRADEMARK OFFICE
CERTIFICATE OF CORRECTION

PATENT NO. : 4,969,036
DATED : November 6, 1990
INVENTOR(S) : Bir Bhanu and Wilhelm Burger It is certified that error appears in the above-identified patent and that said Letters Patent is hereby corrected as shown below:

Column 79, line 54, after "angles" delete "an" and substitute with --pan--.

Column 80, line 25, after "images;" make "feature" a new paragraph.

Signed and Sealed this

Twenty-first Day of July, 1992

Attest:

DOUGLAS B. COMER

Attesting Officer

Acting Commissioner of Patents and Trademarks